United States Patent
Fukuda et al.

(10) Patent No.: US 12,437,584 B2
(45) Date of Patent: Oct. 7, 2025

(54) TELEMATICS SERVICE SYSTEM

(71) Applicant: KUBOTA CORPORATION, Osaka (JP)

(72) Inventors: Yuji Fukuda, Sakai (JP); Ryota Hamamoto, Sakai (JP); Joshua James Skanderup, Grapevine, TX (US); Landon Roland Rosenboom, Grapevine, TX (US)

(73) Assignee: KUBOTA CORPORATION, Osaka (JP)

( * ) Notice: Subject to any disclaimer, the term of this patent is extended or adjusted under 35 U.S.C. 154(b) by 252 days.

(21) Appl. No.: 18/380,804

(22) Filed: Oct. 17, 2023

(65) Prior Publication Data

US 2025/0124745 A1   Apr. 17, 2025

(51) Int. Cl.
*G07C 5/00* (2006.01)
*E02F 9/24* (2006.01)
(Continued)

(52) U.S. Cl.
CPC .............. *G07C 5/008* (2013.01); *E02F 9/24* (2013.01); *E02F 9/26* (2013.01); *E02F 9/267* (2013.01);
(Continued)

(58) Field of Classification Search
CPC ... G07C 5/008; G07C 5/04; E02F 9/24; E02F 9/26; E02F 9/267; E02F 3/96; H04Q 9/00; H04Q 2209/40
See application file for complete search history.

(56) References Cited

U.S. PATENT DOCUMENTS 9,854,209 B2 * 12/2017 Aich ..................... B60W 10/18
2012/0054035 A1   3/2012 Nam et al.
(Continued)

FOREIGN PATENT DOCUMENTS

JP    2012-047741 A   3/2012
WO   2018/070393 A1   4/2018

OTHER PUBLICATIONS

Fukuda et al., "Telematics Service System", U.S. Appl. No. 19/257,721, filed Jul. 2, 2025.

*Primary Examiner* — Aryan E Weisenfeld
(74) *Attorney, Agent, or Firm* — Keating & Bennett, LLP

(57) ABSTRACT

A telematics service system includes a transmitter provided in or on an attachment mountable to and demountable from a working vehicle to transmit a wireless signal, a first communicator to receive the wireless signal transmitted from the transmitter, a second communicator to transmit attachment information including identification information about the attachment, a server to receive the attachment information to manage telematics information, and a controller to acquire the identification information from the wireless signal received by the first communicator, include the identification information into the attachment information, and cause the second communicator to transmit the attachment information to the server. The controller causes the second communicator to transmit, to the server, information relating to the state of the attachment that has changed in response to an operation to mount the attachment to the working vehicle and/or an operation to demount the attachment from the working vehicle.

27 Claims, 22 Drawing Sheets

(51) Int. Cl.
  *E02F 9/26* (2006.01)
  *G07C 5/04* (2006.01)
  *H04Q 9/00* (2006.01)
  *E02F 3/96* (2006.01)
(52) U.S. Cl.
  CPC ............... *G07C 5/04* (2013.01); *H04Q 9/00* (2013.01); *E02F 3/96* (2013.01); *H04Q 2209/40* (2013.01)

(56) References Cited

U.S. PATENT DOCUMENTS

2019/0130662 A1\* 5/2019 Okamura ............... B60K 35/22
2022/0412040 A1 12/2022 Zitterbart et al.

\* cited by examiner

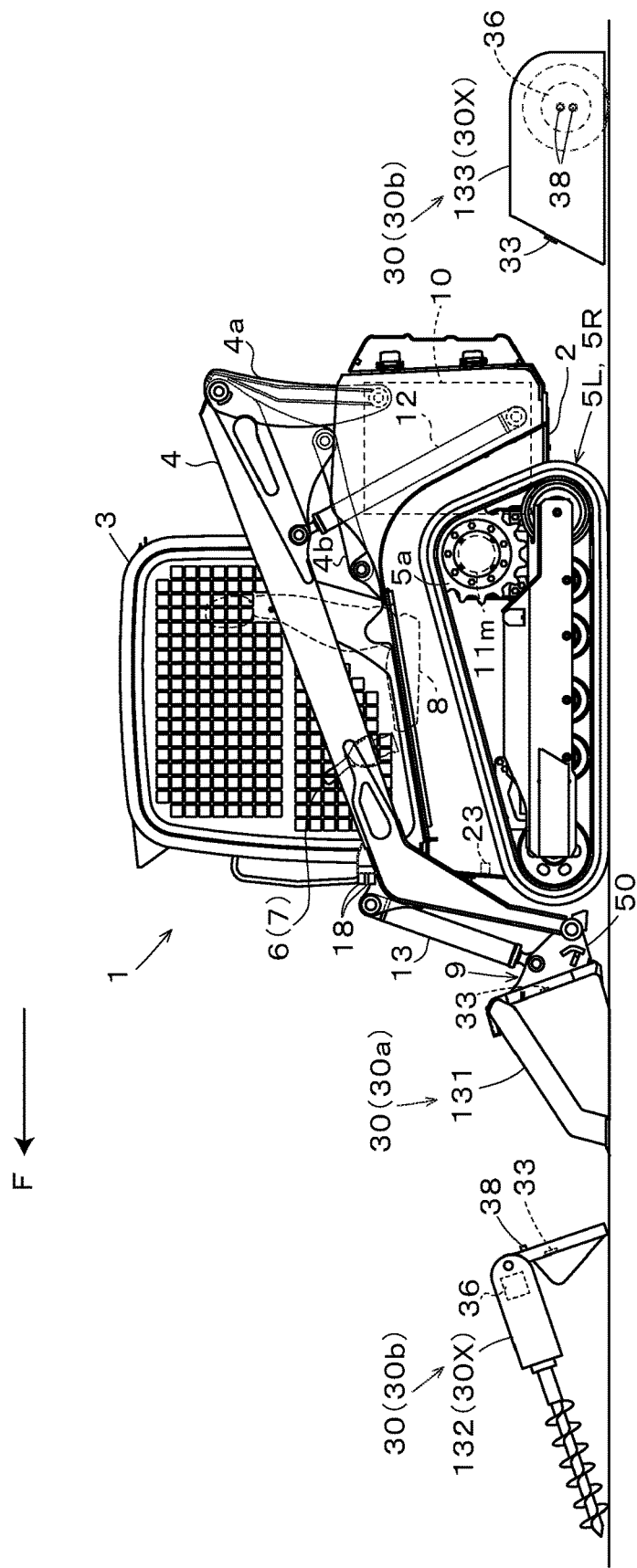

Fig.5

| Attachment list | | |
|---|---|---|
| Name of attachment | Attachment ID | Image information (icon) |
| Bucket | Model number, serial number, including no AUX etc. | |
| Earth auger | Model number, serial number, including AUX etc. | |
| Breaker | Model number, serial number, including AUX etc. | |

Fig. 20

| 300A Per-attachment telematics information | 311b(223) Attachment usage history | | | | 313 Demounted attachment whereabouts information | |
|---|---|---|---|---|---|---|
| Name of attachment | 311 Mount history 1 | | | | 314 Demount history 1 | |
| | 311a Mount date -and-time | Name of working vehicle | 311c(230) Mount location | 311d Total mount time | 314a Demount date-and-time | 314b(230) Demount location |
| Bucket | Mi/H/D/M/Y | CTL | | Mi/H/D | Mi/H/D/M/Y | |
| 224 Attachment ID of bucket | 312 Action history | | | | | |
| | 312a Action start date-and-time | 312b(230) Action start location | 312c Action end date-and-time | 312d(230) Action end location | 312e Total time | |
| 315 Image data of bucket | Mi/H/D/M/Y | | Mi/H/D/M/Y | | Mi/H/D/M/Y | |
| | Mi/H/D/M/Y | | Mi/H/D/M/Y | | Mi/H/D/M/Y | |
| | Mi/H/D/M/Y | | Mi/H/D/M/Y | | Mi/H/D/M/Y | |
| | Mount history 2 | | | | Demount history 2 | |
| | Mount date -and-time | Name of working vehicle | Mount location | Total mount time | Demount date-and-time | Demount location |
| | Mi/H/D/M/Y | SSL | | Mi/H/D | Mi/H/D/M/Y | |
| | Action history | | | | | |
| | Action start date-and-time | Action start location | Action end date-and-time | Action end location | Total time | |
| | Mi/H/D/M/Y | | Mi/H/D/M/Y | | Mi/H/D/M/Y | |
| | Mi/H/D/M/Y | | Mi/H/D/M/Y | | Mi/H/D/M/Y | |
| | Mi/H/D/M/Y | | Mi/H/D/M/Y | | Mi/H/D/M/Y | |

| Per-working-vehicle telematics information | | | | | | | | | | |
|---|---|---|---|---|---|---|---|---|---|---|
| Name of working vehicle | | | | | | | | | | |
| CTL 223 | Vehicle ID of CTL | Attachment usage history 320 | | | | | | Demounted attachment whereabouts information 323 | | |
| | | 321 Mount history 1 321b(224) | | | | | | Demount history 1 324 | | |
| | | Mount date -and-time 321a | Name of attachment | Mount location 321c(230) | Mount time 321d | | | Demount date-and-time | Demount location | |
| | | Mi/H/D/M/Y | Bucket | | Mi/H/D | | | Mi/H/D/M/Y | | 324b (230) |
| | | 322a Action history | | | | | | | | 324a |
| | | Action start date-and-time | Action start location 322b(230) | Action end date-and-time | Action end location 322c | Total time | | | | |
| | | Mi/H/D/M/Y | | Mi/H/D/M/Y | | Mi/H/D/M/Y | 322d (230) | | | |
| | | Mi/H/D/M/Y | | Mi/H/D/M/Y | | Mi/H/D/M/Y | 322e | | | |
| | | Mi/H/D/M/Y | | Mi/H/D/M/Y | | Mi/H/D/M/Y | | | | |
| | Image data of CTL | Mount history 2 | | | | | | Demount history 2 | | |
| | | Mount date -and-time | Name of attachment | Mount location | Mount time | | | Demount date-and-time | Demount location | |
| | | Mi/H/D/M/Y | Earth auger | | Mi/H/D | | | Mi/H/D/M/Y | | |
| | | Action history | | | | | | | | |
| | | Action start date-and-time | Action start location | Action end date-and-time | Action end location | Total time | | | | |
| | | Mi/H/D/M/Y | | Mi/H/D/M/Y | | Mi/H/D/M/Y | | | | |
| | | Mi/H/D/M/Y | | Mi/H/D/M/Y | | Mi/H/D/M/Y | | | | |
| | | Mi/H/D/M/Y | | Mi/H/D/M/Y | | Mi/H/D/M/Y | | | | |

Fig.21

TELEMATICS SERVICE SYSTEM

BACKGROUND OF THE INVENTION

1. Field of the Invention

The present invention relates to a telematics service system relating to an attachment for work mountable to a working vehicle.

2. Description of the Related Art

For example, the specification of U.S. Patent Application Publication No. 2022/412040 discloses a system to automatically determine the positions of attachments in the vicinity of a working vehicle. In the system, an attachment such as a bucket is provided with a first communication unit (tool module) including a first acceleration sensor, a working vehicle (excavator) is provided, at the distal end of its boom, a hitch to and from which the attachment is quickly and readily mountable and demountable (quick hitch or quick changer), the quick changer is provided with a second communication unit (receiver module) including a second acceleration sensor, and the working vehicle is provided with an identification module and a controller.

For example, the specification of PCT International Publication No. 2018/070393 discloses a communication system structure in which: a controller in a working vehicle receives a broadcast signal transmitted from an attachment mounted to the working vehicle to acquire identification information of the attachment; and, if the received signal strength (RSSI) of the broadcast signal is equal to or higher than a predetermined value, the controller determines that the attachment is mounted to the working vehicle, and transmits, to a server, information about the action time of the attachment which is the period for which the controller continues to receive the identification information of the attachment.

For example, Japanese Unexamined Patent Application Publication No. 2012-47741 (specification of U.S. Patent Application Publication No. 2012/0054035) discloses a telematics service system to provide content relating to position information, travel route, and the like of vehicles.

The telematics service system provides position information of vehicles. However, there have been no telematics service systems relating to attachments mountable to working vehicles. Constructing such a telematics service system may trigger new demand and contribute to the development of industry.

SUMMARY OF THE INVENTION

In a first aspect, a telematics service system includes a working vehicle, an attachment mountable to and demountable from the working vehicle, a transmitter provided in or on the attachment to transmit a wireless signal compliant with a near field communication standard, a first communicator to receive the wireless signal transmitted from the transmitter, a second communicator to transmit attachment information including identification information about the attachment, a server to receive the attachment information transmitted from the second communicator and manage the attachment information as telematics information, and a controller to acquire the identification information from the wireless signal received by the first communicator, include the identification information into the attachment information, and cause the second communicator to transmit the attachment information to the server. The controller is configured or programmed to, in response to an operation to mount the attachment to the working vehicle, determine whether or not the attachment is in a mounted state in which the attachment is considered mounted to the working vehicle, and, upon determining that the attachment is in the mounted state, prepare a mount notification indicating that the attachment is in the mounted state and cause the second communicator to transmit the mount notification to the server. The controller is configured or programmed to, in response to an operation to demount the attachment from the working vehicle, determine whether or not the attachment is in a demounted state in which the attachment is considered demounted from the working vehicle, and, upon determining that the attachment is in the demounted state, prepare a demount notification indicating that the attachment is in the demounted state and cause the second communicator to transmit the demount notification to the server.

The controller may be configured or programmed to cause the second communicator to transmit the attachment information to the server at one or more predetermined intervals. The controller may be configured or programmed to, upon preparing the mount notification or the demount notification, cause the second communicator to transmit the mount notification or the demount notification to the server independently of the one or more predetermined intervals.

The server may be operable to, upon receipt of (i) the mount notification or the demount notification not indicating the identification information about the attachment and (ii) the attachment information not including the mount notification or the demount notification, associate the mount notification or the demount notification with the identification information about the attachment included in the attachment information if identification information about a working vehicle indicated by the mount notification or the demount notification is determined to match identification information about a working vehicle indicated by the attachment information, and include the mount notification or the demount notification into the telematics information and manage the telematics information including the mount notification or the demount notification.

The controller may be configured or programmed to, upon determining that the attachment is in the mounted state, cause the second communicator to transmit mounted attachment information to the server, the mounted attachment information being the attachment information that includes the mount notification and the identification information about the attachment determined as being in the mounted state. The controller may be configured or programmed to, upon determining that the attachment is in the demounted state, cause the second communicator to transmit demounted attachment information to the server, the demounted attachment information being the attachment information that includes the demount notification and the identification information about the attachment determined as being in the demounted state.

The controller may be configured or programmed to periodically determine, during a period from when the mount notification is prepared to when the demount notification is prepared, whether or not the attachment determined as being in the mounted state is in action to perform work, prepare in-action/not-in-action information indicating that the attachment determined as being in the mounted state is in action or not in action, and cause the second communicator to transmit in-action/not-in-action attachment information to the server, the in-action/not-in-action attachment information being the attachment information that includes the in-action/not-in-action information and the identification information about the attachment determined as being in the mounted state.

The attachment may include a vibration detector. The transmitter may be operable to transmit the wireless signal including vibration information which is information about vibration of the attachment detected by the vibration detector. The controller may be configured or programmed to determine whether or not the attachment is in action to perform work based on the vibration information included in the wireless signal received by the first communicator.

The attachment may include an actuator. The telematics service system may further include an actuator operator to be operated to control a drive state of the actuator when the attachment is in the mounted state. The controller may be configured or programmed to determine whether or not the attachment is action to perform work, based on an operation state of the actuator operator.

The server may be operable to prepare and/or update an action history relating to one or more acting points in time and/or one or more acting periods at and/or during which the attachment was acting, by collecting one or more pieces of the in-action/not-in-action attachment information received from the second communicator, and include the action history into the telematics information.

The server may be operable to manage one or more of the action histories of respective one or more of the attachments. The server may be operable to store one or more pieces of working vehicle information relating to one or more registered working vehicles, and manage the one or more action histories of the one or more attachments on a per piece of working vehicle information basis.

The telematics service system may further include an input interface to be operated by an operator to change identification information about the attachment included in the wireless signal received by the first communicator. The controller may be configured or programmed to, in response to an operation to change the identification information via the input interface, modify the identification information about the attachment included in the wireless signal so that the modified identification information is included in the attachment information.

The telematics service system may further include a memory and/or a storage to store a list of one or more of the attachments and one or more pieces of the identification information about the one or more attachments included in the list, and an input interface to be operated to select one of the one or more attachments and a corresponding one of the one or more pieces of identification information from the list stored in the memory and/or the storage. The controller may be configured or programmed to, if the first communicator has not received any wireless signals including identification information about an attachment, cause the second communicator to transmit, to the server, attachment information including identification information about one of the one or more attachments selected from the list by an operation via the input interface.

The telematics service system may further include a display. The controller may be configured or programmed to, if the first communicator has not received any wireless signals including identification information about an attachment, cause the display to output a prompt asking for an operation of the input interface and a selection of one of the one or more attachments from the list.

The telematics service system may further include a display. The memory and/or the storage may store pieces of image data of a plurality of the attachments. The controller may be configured or programmed to read a piece of image data of the attachment corresponding to the identification information included in the attachment information from the memory and/or the storage, and cause the display to display an image based on the read piece of image data.

The telematics service system may further include a terminal device to receive the telematics information transmitted from the server. The working vehicle may include the first communicator and the second communicator. The server may be operable to store pieces of image data of a plurality of the attachments, select, from the pieces of image data of the plurality of attachments, a piece of image data of the attachment corresponding to the identification information included in the attachment information received from the second communicator, and include the selected piece of image data into the telematics information. The terminal device may be operable to display an image based on the piece of image data included in the telematics information transmitted from the server.

In a second aspect, a telematics service system includes a working vehicle including a position detector to detect a position of the working vehicle, an attachment mountable and demountable to and from the working vehicle, a transmitter provided in or on the attachment to transmit a wireless signal compliant with a near field communication standard, a first communicator to receive the wireless signal from the transmitter, a second communicator to transmit attachment information including identification information about the attachment, a server to receive the attachment information from the second communicator and manage the attachment information as telematics information, and a controller to acquire the identification information from the wireless signal received by the first communicator, include the identification information into the attachment information, and cause the second communicator to transmit the attachment information to the server. The controller is configured or programmed to, in response to an operation to demount the attachment from the working vehicle, determine whether or not the attachment is in a demounted state in which the attachment is considered demounted from the working vehicle, and, upon determining that the attachment is in the demounted state, prepare a demount notification indicating that the attachment is in the demounted state, and cause the second communicator to transmit, to the server, (i) demounted attachment information which is the attachment information that includes the demount notification and the identification information about the attachment determined as being in the demounted state and (ii) vehicle position information relating to a position of the working vehicle that was determined by the position detector at a first point in time at which the attachment was determined as being in the demounted state or a second point in time near the first point in time. The server is operable to, upon receipt of the demounted attachment information and the vehicle position information, associate the vehicle position information with the identification information about the attachment included in the demounted attachment information, and include the vehicle position information, as whereabouts information of the attachment determined as being in the demounted state, into the telematics information.

The server may be operable to manage one or more demount histories of respective one or more of the attachments based on the demounted attachment information and the vehicle position information received from the second communicator, each of the one or more demount histories including a point in time at which a corresponding one of the one or more attachments was placed in the demounted state and/or the whereabouts information of the corresponding one of the one or more attachments. The server may be operable to manage the one or more demount histories of the respective one or more attachments on a per piece of working vehicle information basis, the piece of working vehicle information relating to a registered working vehicle.

The controller may be configured or programmed to, in response to an operation to mount the attachment to the working vehicle, determine whether or not the attachment is in a mounted state in which the attachment is considered mounted to the working vehicle, and, upon determining that the attachment is in the mounted state, prepare a mount notification indicating that the attachment is in the mounted state and cause the second communicator to transmit mounted attachment information to the server, the mounted attachment information being the attachment information that includes the mount notification and the identification information about the attachment determined as being in the mounted state. The server may be operable to, upon receipt of mounted attachment information about a certain attachment which is the same as the attachment determined as being in the demounted state and identified by the identification information included in the demounted attachment information associated with the vehicle position information as the whereabouts information of the attachment determined as being in the demounted state, dissociate the vehicle position information from the identification information of the attachment determined as being in the demounted state in the telematics information.

In a third aspect, a telematics service system includes a working vehicle, an attachment mountable to and demountable from the working vehicle, a transmitter provided in or on the attachment to transmit a wireless signal compliant with a near field communication standard, a first communicator to receive the wireless signal transmitted from the transmitter, a second communicator to transmit attachment information including identification information about the attachment, a server to receive the attachment information transmitted from the second communicator and manage the attachment information as telematics information, and a controller to acquire the identification information from the wireless signal received by the first communicator, include the identification information into the attachment information, and cause the second communicator to transmit the attachment information to the server. The controller is configured or programmed to, in response to an operation to mount the attachment to the working vehicle, determine whether or not the attachment is in a mounted state in which the attachment is considered mounted to the working vehicle, and, upon determining that the attachment is in the mounted state, cause the second communicator to transmit a mount notification indicating that the attachment is in the mounted state to the server. The controller is configured or programmed to, in response to an operation to demount the attachment from the working vehicle, determine whether or not the attachment is in a demounted state in which the attachment is considered demounted from the working vehicle, and, upon determining that the attachment is in the demounted state, cause the second communicator to transmit a demount notification indicating that the attachment is in the demounted state to the server. The controller is configured or programmed to, during a period from when the mount notification is transmitted to when the demount notification is transmitted, cause the second communicator to transmit, to the server, the attachment information including the identification information of the attachment determined as being in the mounted state. The server is operable to, upon receipt of the mount notification, prepare an action history about the attachment in the mounted state, and update the action history based on the attachment information received during a period from when the mount notification is received to when the demount notification is received.

The controller may be configured or programmed to cause the second communicator to transmit, to the server at one or more predetermined intervals, the attachment information including the identification information of the attachment determined as being in the mounted state, during the period from when the mount notification is transmitted from the second communicator to the server to when the demount notification is transmitted from the second communicator to the server.

The controller may be configured or programmed to, during the period from when the mount notification is transmitted from the second communicator to the server to when the demount notification is transmitted from the second communicator to the server, check an action state of the attachment determined as being in the mounted state, and, upon recognizing a change in a state of the attachment, prepare state change information relating to the change in the state and cause the second communicator to transmit the state change information to the server independently of the one or more predetermined intervals, the change in the state being a change in which the attachment in action stopped acting or the attachment not in action started acting. The server may be operable to update the action history based on the attachment information and the state change information received from the second communicator.

In a fourth aspect, a telematics service system includes a working vehicle, an attachment mountable to and demountable from the working vehicle, a transmitter provided in or on the attachment to transmit a wireless signal compliant with a near field communication standard, a first communicator to receive the wireless signal transmitted from the transmitter, a second communicator to transmit first information including vehicle identification information about the working vehicle, a server to receive the first information transmitted from the second communicator and manage the first information as telematics information, and a controller to cause the second communicator to transmit the first information to the server. The controller is configured or programmed to prepare a mount notification or a demount notification in response to an operation to mount the attachment to the working vehicle or an operation to demount the attachment from the working vehicle, and cause the second communicator to transmit, to the server, (i) the first information with the mount notification or the demount notification therein or thereon and (ii) attachment identification information about the attachment acquired from the wireless signal received by the first communicator. The server is operable to associate the mount notification or the demount notification in or on the received first information with the vehicle identification information and the attachment identification information, and include the mount notification or the demount notification into the telematics information.

The controller is configured or programmed to cause the second communicator to transmit, to the server at one or more predetermined intervals, the first information with no mount notifications or demount notifications. The controller is configured or programmed to, upon preparing the mount notification or the demount notification, cause the second communicator to transmit the first information with the mount notification or the demount notification therein or thereon to the server independently of the one or more predetermined intervals.

The controller may be configured or programmed to, in response to an operation to mount the attachment to the working vehicle, determine whether or not the attachment is in a mounted state in which the attachment is considered mounted to the working vehicle, and, upon determining that the attachment is in the mounted state, prepare the mount notification indicating that the attachment is in the mounted state and cause the second communicator to transmit the first information with the mount notification therein or thereon to the server.

The controller may be configured or programmed to, upon preparing the mount notification in response to the operation to mount the attachment to the working vehicle, cause the second communicator to transmit, to the server, the first information with the mount notification and the attachment identification information therein or thereon.

The controller may be configured or programmed to, in response to an operation to demount the attachment from the working vehicle, determine whether or not the attachment is in a demounted state in which the attachment is considered demounted from the working vehicle, and, upon determining that the attachment is in the demounted state, prepare the demount notification indicating that the attachment is in the demounted state and cause the second communicator to transmit the first information with the demount notification therein or thereon to the server.

The controller may be configured or programmed to, upon preparing the demount notification in response to the operation to demount the attachment from the working vehicle, cause the second communicator to transmit, to the server, the first information with the demount notification and the attachment identification information therein or thereon.

The controller may be configured or programmed to cause the second communicator to transmit the first information with the demount notification therein or thereon to the server, the first information including vehicle position information relating to a position of the working vehicle that was determined at a first point in time at which the attachment was determined as being in the demounted state or a second point in time near the first point in time. The server may be operable to associate the vehicle position information included in the received first information with the attachment identification information associated with the demount notification, and include the vehicle position information as whereabouts information of the attachment in the demounted state into the telematics information and manage the telematics information including the vehicle position information.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2 is a side view of a working vehicle and attachments in the vicinity of the working vehicle.

FIG. 5 schematically illustrates an attachment list.

FIG. 20 schematically illustrates history information for each attachment included in telematics information.

FIG. 21 schematically illustrates history information for each working vehicle included in telematics information.

DETAILED DESCRIPTION OF THE PREFERRED EMBODIMENTS

Figure 1A:
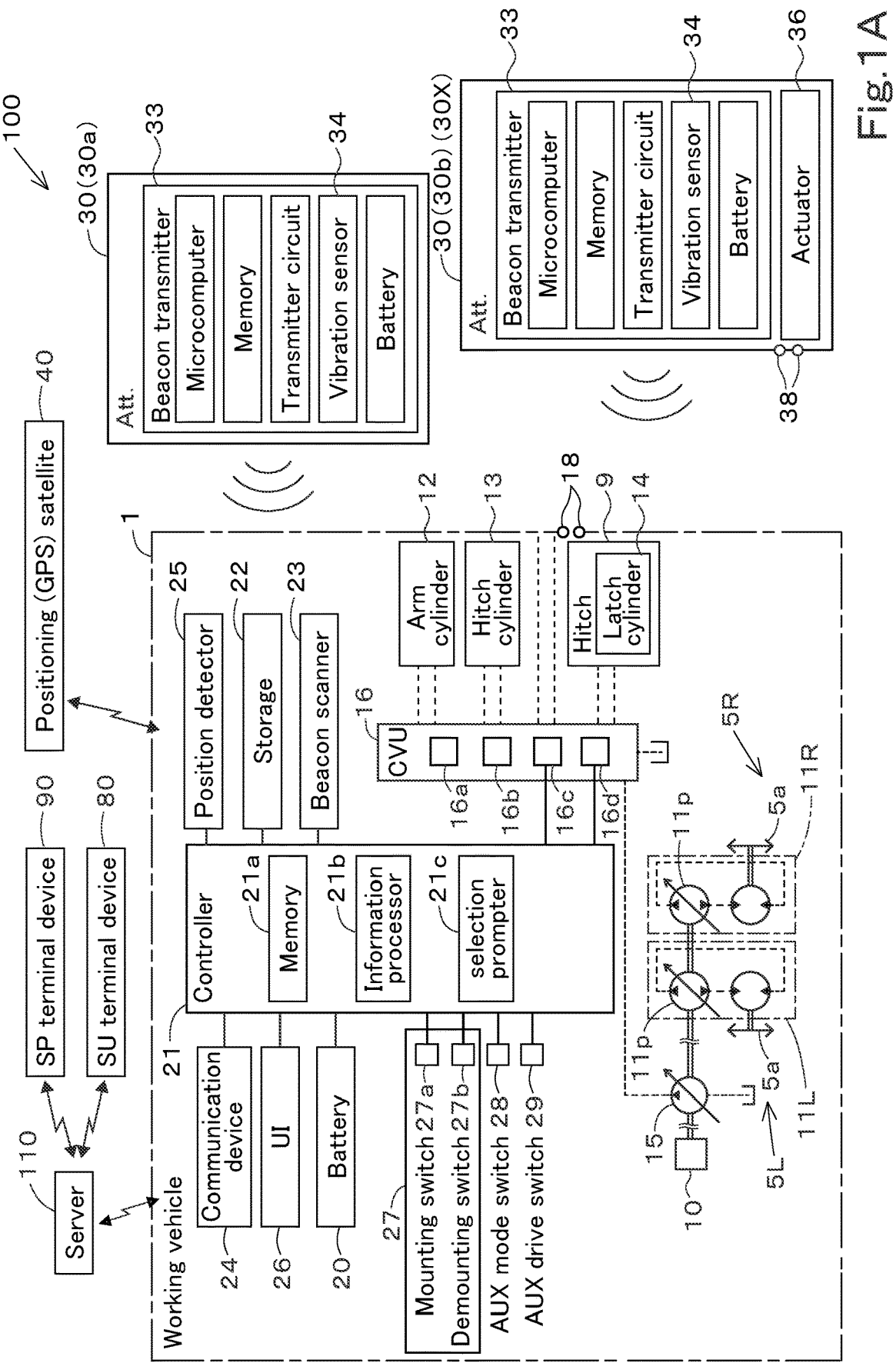
FIG. 1A is a block diagram of a telematics service system.

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 1B:
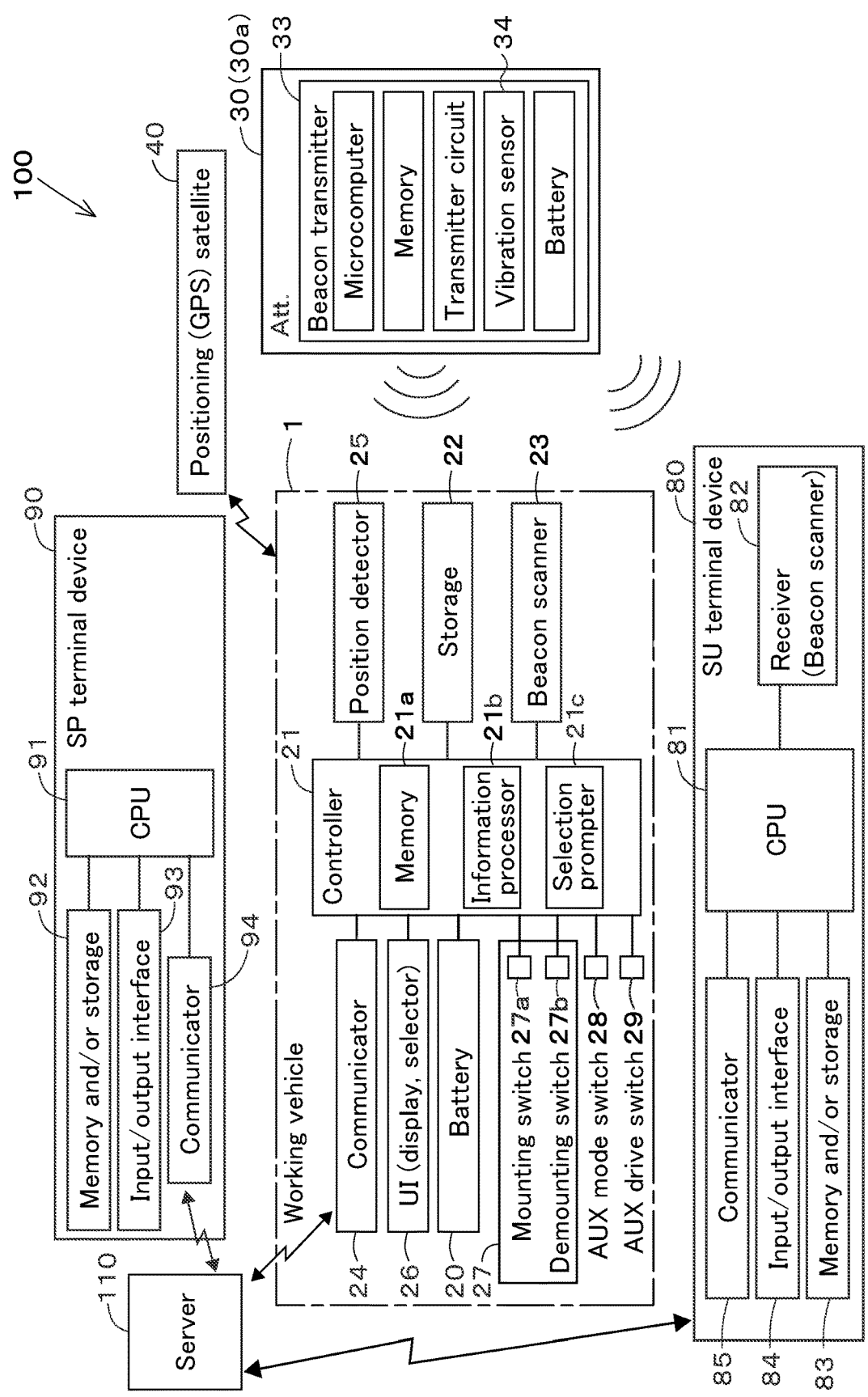
FIG. 1B is a block diagram illustrating details of structures of terminal devices of the telematics service system in FIG. 1A.
Figure 3:
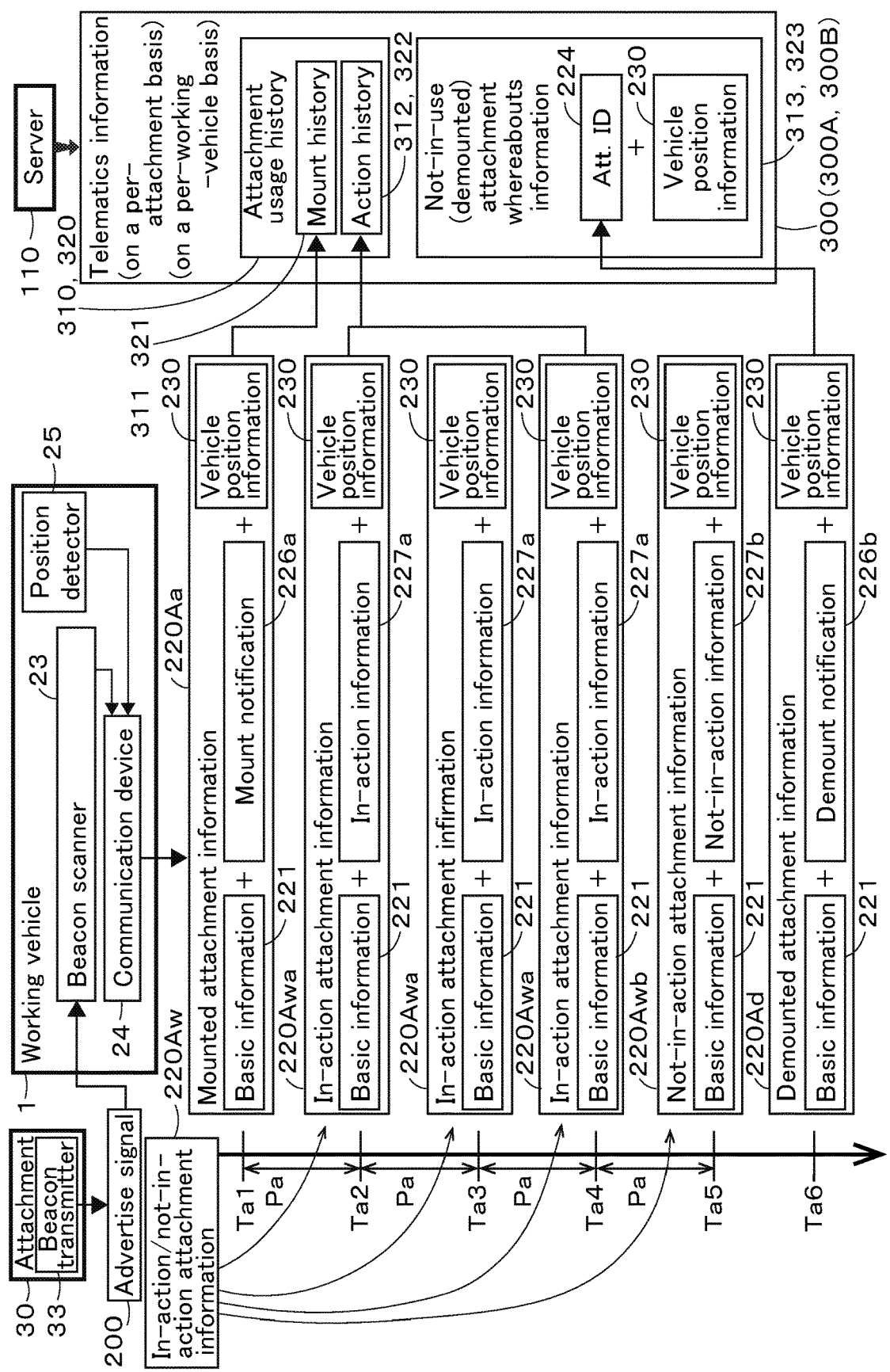
FIG. 3 schematically illustrates the manner in which attachment information is communicated over time, including transmission of in-action/not-in-action attachment information during a period from when an attachment is mounted to the working vehicle to when the attachment is demounted from the working vehicle, in a telematics service system according to a first preferred embodiment of the present invention.

FIG. 1A is a block diagram of a telematics service system (hereinafter referred to as "TSS") 100. FIG. 1B is a block diagram illustrating details of structures of terminal devices 80 and 90 of the TSS 100 in FIG. 1A. FIG. 2 is a side view of a working vehicle 1 and attachments 30 in the vicinity of the working vehicle 1. FIG. 3 schematically illustrates the manner in which information is communicated in the TSS 100. Note that, in FIG. 1B, the elements of the working vehicle 1 illustrated in FIG. 1A are simplified or not shown. The following schematically describes a configuration of the TSS 100 with reference to FIGS. 1A, 1B, 2, and 3.

The TSS 100 according to the present preferred embodiment is configured such that telematics information, which is information about one or more working vehicles 1 for use by operator(s) (service user(s)), the location of one or more work attachments 30 mountable to the one or more working vehicles 1, and/the like, is managed and provided to, for example, the service user(s).

The TSS 100 includes a server 110. The server 110 is operable to acquire information relating to working vehicle(s) 1 and information relating to attachment(s) 30 (attachment information), prepare (or update) telematics information based on the acquired information, and store the telematics information. The server 110 may be owned by a telematics service provider and may be owned by a service user and managed by a telematics service provider.

Referring to FIGS. 1A and 1B, among the pieces of equipment (elements) included in the TSS 100, the equipment handled (operated) by service user(s) includes one or more working vehicles 1, one or more attachments 30, terminal device(s) for service user(s) (hereinafter "SU terminal device") 80, and the like. The equipment handled by (operated by) service provider(s) include terminal device(s) for service provider(s) (hereinafter "SP terminal device") 90 and the like.

The SU terminal device 80 may be a mobile terminal device, e.g., a terminal device in the form of a mobile phone such as a smartphone, a terminal device in the form of a tablet, a laptop computer, or the like.

Alternatively, the SU terminal device 80 may be a desktop computer. The SU terminal device 80 may be configured such that, in the case where an operator uses the SU terminal device 80 to remotely control a working vehicle 1, the SU terminal device 80 executes a special application program for remote control and includes, for example, special manual operator(s) (such as joystick(s) and/or switch(es)) for remote control.

It is noted here that, as described later in detail, in order to transmit, to the server 110, attachment information 220A (see FIG. 3) including information based on the advertise signal 200A (see FIG. 3) received from each attachment 30, the working vehicle 1 includes a controller 21 (including a memory 21a, an information processor 21b such as CPU, processor(s) and/or the like, and a selection prompter 21c such as CPU, processor(s), and/or the like), a storage 22, a beacon scanner 23 (first communicator), a communicator 24 (second communicator), a user interface 26 (represented by "UI" in FIGS. 1A and 1B) (display, selector), and/or the like.

On the other hand, the SU terminal device 80 also includes features and/or functions corresponding the above elements of the working vehicle 1, and is capable of transmitting, to the server 110, attachment information 220A including information based on the advertise signal 200 (see FIG. 3) received from each attachment 30, instead of the working vehicle 1.

Specifically, as illustrated in FIG. 1B, the SU terminal device 80 includes electrical device(s), electronic component(s), and/or the like such as a receiver (or beacon scanner) 82 (first communicator) to receive advertise signals 200 which are wireless signals transmitted (advertised) by beacon transmitter(s) 33 (transmitter) of attachment(s) 30, a CPU 81 as an information processor to prepare attachment information 220A based on (from) the advertise signal(s) 200, a storing unit (a memory and/or a storage) 83 to temporarily store the received advertise signal(s) 200 and/or pre-store an attachment list 210, an input/output interface 84 such as a touchscreen (output interface (display), input interface (selector)), and/or a communicator 85 (second communicator) to transmit and receive signals to and from the server 110.

Note that information about attaching/detaching the attachment 30 to/from the working vehicle 1 (such information is referred to as "mount/demount information 226") and/or the like (described later) is prepared by the controller 21 of the working vehicle 1 in response to an operation of a latch operator 27 (described later) of the working vehicle 1. Therefore, the SU terminal device 80 receives, at the communicator 85, a signal including the mount/demount information 226 and/or the like from the communicator 24 of the working vehicle 1, and the CPU 81 includes the mount/demount information 226 and/or the like into the attachment information 220A.

As illustrated in FIG. 1B, the SP terminal device 90 includes electrical device(s), electronic component(s), and/or the like such as a CPU 91, a storing unit (a memory and/or a storage) 92, an input/output interface 93 such as a touchscreen (output interface (display), input interface (selector)), a communicator 94 (second communicator) to transmit and receive signals to and from the server 110, and/or the like.

The server 110 manages telematics information 300 (see FIG. 3) based on the attachment information 220A and/or the like received from the working vehicle 1 or the SU terminal device 80, and transmits the telematics information 300 to the SU terminal device 80 and/or the SP terminal device 90, for example, in response to a request.

Thus, as described above, similarly to the working vehicle 1, the SU terminal device 80 includes features(s) and/or function(s) of preparing attachment information based on advertise signal(s) 200 from attachment(s) 30 and transmitting it to the server 110. The SU terminal device 80 additionally includes features(s) and/or function(s) of providing the telematics information 300 from the server 110 to a telematics service user.

Specifically, in the SU terminal device 80, the communicator 85 receives the telematics information 300 from the server 110, the CPU 81 processes the received telematics information 300, the storing unit 83 stores the telematics information 300, and the input/output interface 84, for example, displays the telematics information 300 in response to the telematics service user's operation.

The telematics service user can operate the input/output interface 84 of the SU terminal device 80 to, for example, modify the telematics information 300. The CPU 81, in response to the telematics service user's operation, modifies the telematics information 300, causes the storing unit 83 to store the modified telematics information 300, and causes the communicator 85 to transmit the telematics information 300 to the server 110.

In the SP terminal device 90, the communicator 94 receives the telematics information 300 from the server 110, the CPU 91 processes the received telematics information 300, the storing unit 92 stores the telematics information 300, and the input/output interface 93, for example, displays the telematics information 300 in response to the telematics service provider's operation.

The telematics service provider can operate the input/output interface 93 of the SP terminal device 90 to, for example, modify the telematics information 300. The CPU 91, in response to the telematics service provider's operation, modifies the telematics information 300, causes the storing unit 92 to store the modified telematics information 300, and causes the communicator 94 to transmit the telematics information 300 to the server 110.

As illustrated in FIG. 2, an attachment 30 is detachably mounted to the working vehicle 1. The attachment 30 is, for example, a bucket 131 illustrated in FIG. 2. Other examples of the attachment 30 include pallet forks, skid cutters, crushers, breakers, angle brooms, earth augers (including an earth auger 132 in FIG. 2), grapples, sweepers (including a sweeper 133 in FIG. 2), mowers, snow blowers, and spreaders.

In the present preferred embodiment, for convenience of description, the one or more attachments 30 are a plurality of attachments 30 including a mounted attachment 30a mounted to the working vehicle 1 (such a state may be hereinafter referred to as a "mounted state") and a demounted attachment 30b not mounted to the working vehicle 1 (such a state may be hereinafter referred to as a "demounted state").

It should be noted that, in the following description about determining whether the attachment 30 is mounted or demounted to or from the working vehicle 1 (described later), the "mounted state" is a state in which the attachment 30 is considered mounted to the working vehicle 1, whereas the "demounted state" is a state in which the attachment 30 is considered demounted from the working vehicle 1.

Therefore, the "mounted attachment 30a" which is an attachment 30 in the mounted state may refer to either an attachment 30 actually mounted to the working vehicle 1 or an attachment 30 having been determined as being in the state in which the attachment 30 is considered mounted to the working vehicle 1, depending on the context.

The "demounted attachment 30b" which is an attachment 30 in the demounted state may refer to either an attachment 30 actually demounted from the working vehicle 1 or an attachment 30 having been determined as being in the state in which the attachment 30 is considered demounted from the working vehicle 1, depending on the context.

Note that examples of the one or more attachments 30 mountable to the working vehicle 1 include attachments 30 including an auxiliary (AUX) actuator 36 which is its own hydraulic actuator differing from hydraulic actuator(s) of the working vehicle 1, such as an earth auger 132 including a hydraulic motor and a sweeper 133 including a hydraulic motor to drive a rotary brush. Such a kind of attachment 30 may be hereinafter referred to specifically as the "AUX attachment 30X".

Specifically, an AUX attachment 30X is an attachment 30 including an AUX actuator 36 and hydraulic fluid port(s) 38 through which hydraulic fluid supplied from the working vehicle 1 to the AUX actuator 36 is introduced and discharged (see FIGS. 1A and 2).

The working vehicle 1 is structured to perform work using a work attachment 30 mounted thereto, and is, for example, a construction machine, an agricultural machine, or the like such as a compact track loader (CTL) illustrated in FIG. 2. Alternatively, the working vehicle 1 may be a skid-steer loader, an excavating working machine (backhoe), a tractor, or the like.

The working vehicle 1 may be directly and manually controlled by an operator (service user) in the working vehicle 1 to act (e.g., travel, work). Alternatively, the working vehicle 1 may be remotely controlled by an operator to act. Alternatively, the working vehicle 1 may be an autonomously acting working vehicle.

The following schematically describes a configuration of the working vehicle 1 with reference to FIGS. 1A and 2. Note that the direction indicated by arrow F in FIG. 2 is the forward direction from the working vehicle 1, and the left and right sides and the like of the working vehicle 1 are defined based on the forward direction. With regard to each attachment 30, when the attachment 30 is mounted to a hitch 9 (described later) of the working vehicle 1, the portion of the attachment 30 that is mounted to the hitch 9 is a rear portion of the attachment 30, and the portion on the opposite side of the attachment 30 from the rear portion in the front-rear direction of the working vehicle 1 is a front portion of the attachment 30.

The working vehicle 1 includes a vehicle body (chassis) 2, a cabin 3, a pair of left and right lift arms 4, and a pair of left and right traveling devices 5L and 5R.

The cabin 3 is provided on the vehicle body 2. The cabin 3 includes therein an operator's seat 8 and manual operators (operation members) to be operated by an operator seated on the operator's seat 8. The operation members include a travel operation member 6 to be operated to operate the traveling devices 5L and 5R and a work operation member 7 to be operated to operate the lift arms 4 and the hitch 9 provided at the distal ends of the lift arms 4. The travel operation member 6 and/or work operation member 7 may be, for example, lever(s), joystick(s), and/or the like.

The working vehicle 1 includes a travel drive system and a work drive system. Such systems may be, for example, hydraulic drive system(s) and/or electric drive system(s). The working vehicle 1 according to the present preferred embodiment includes a hydraulic travel drive system and a hydraulic work drive system based on power from the prime mover 10.

The following schematically describes the travel hydraulic drive system of the working vehicle 1 with reference to drawings such as FIGS. 1A and 2. The pair of left and right traveling devices 5L and 5R are provided on the left and right portions of the vehicle body 2. In FIG. 2, the traveling devices 5L and 5R are crawler traveling devices because the working vehicle 1 is a CTL. Note, however, that, for example, in the case where the working vehicle 1 is a skid-steer loader (SSL) or the like, the traveling devices 5L and 5R may be wheel traveling devices.

The vehicle body 2 is provided with the prime mover 10 and a pair of hydraulic continuously variable transmissions (hydrostatic transmissions, HSTs) 11L and 11R to drive the respective left and right traveling devices 5L and 5R independently. The prime mover 10 is an internal combustion engine (engine), an electric motor, and/or the like. The HSTs 11L and 11R are driven by a driving force from the prime mover 10 to drive driving wheels 5a of the respective left and right traveling devices 5L and 5R to rotate.

Upon the operator's operation of the travel operation member 6, the speed and direction of output rotation of the left and right HSTs 11L and 11R are controlled, so that the travel of the working vehicle 1 is controlled (e.g., switching between forward and rearward traveling is achieved, and/or travel speed, turn direction, turn angle, and/or the like are controlled).

The following discusses drive elements for work included in the working vehicle 1. The pair of left and right lift arms 4 have their rear portions supported by left and right portions of the vehicle body 2 via a pair of left and right lift links 4a and a pair of left and right control links 4b such that the pair of left and right lift arms 4 are pivotable up and down. The left and right lift arms 4 are connected to each other, and the left and right lift arms 4 are pivotable together relative to the vehicle body 2. The hitch 9 is pivotally supported on front end portions of the left and right lift arms 4 via a pivot 61 (see FIGS. 7 and 8) extending in the horizontal direction from left to right.

The hitch 9 is provided on the working vehicle 1 to which the attachment 30 is removably mounted. That is, the hitch 9 is a linkage to mount and demount the attachment 30 to and from the working vehicle 1.

The following discusses the work hydraulic drive system of the working vehicle 1 with reference to FIGS. 1A and 2. There are a pair of left and right lift arm swinging cylinders (arm cylinders) 12 which are hydraulic actuators between rear portions of the pair of left and right lift arms 4 and the vehicle body 2. There are a pair of left and right hitch swinging cylinders (hitch cylinders) 13 which are hydraulic actuators between front portions of the pair of left and right lift arms 4 and the hitch 9.

One of the left and right lift arms 4 has, at an intermediate portion thereof, auxiliary (AUX) port(s) 18 for supply and discharge of hydraulic fluid. In the case where the attachment 30 mounted to the hitch 9 is an AUX attachment 30X including AUX actuator(s) 36 and hydraulic fluid port(s) 38, the hydraulic fluid port(s) 38 of the AUX attachment 30X is/are fluidly connected to the AUX port(s) 18 via, for example, hose(s).

The hitch 9 includes latching mechanisms 51 (described later), and includes a latch cylinder 14 which is a hydraulic actuator to switch the latching mechanisms 51 between the latching state and the unlatching state.

As illustrated in FIG. 1A, the working vehicle 1 includes a hydraulic pump 15 to deliver hydraulic fluid to be supplied to the arm cylinders 12, the hitch cylinders 13, and the latch cylinder 14 (and the AUX actuator 36 if the AUX attachment 30X is connected to the hitch 9) which are hydraulic actuators for work. The hydraulic pump 15, together with hydraulic pumps 11p for the HSTs 11L and 11R, is driven by the prime mover 10.

The working vehicle 1 includes a control valve unit (CVU) 16. The CVU 16 is a group including an arm control valve 16a, a hitch control valve 16b, an AUX control valve 16c, and a latch control valve 16d. The fluid delivered by the hydraulic pump 15 is supplied to the pair of arm cylinders 12 via the arm control valve 16a, supplied to the pair of hitch cylinders 13 via the hitch control valve 16b, supplied to the AUX actuator 36 via the AUX control valve 16c, the AUX port(s) 18, and the hydraulic fluid port 38, and supplied to the latch cylinder 14 via the latch control valve 16d.

Of the control valves 16a, 16b, 16c and 16d included in the CVU 16, the arm control valve 16a and the hitch control valve 16b (specifically, the spools of these control valves) are positionally controlled by the operation of the work operation member 7. The arm control valve 16a and the hitch control valve 16b are, for example, pilot control valves positionally controlled in response to pilot fluid having a flow direction and flow rate changed by the operation of the work operation member 7.

Specifically, upon the operator's operation of the work operation member 7, the direction and flow rate of the fluid from the arm control valve 16a to the pair of left and right arm cylinders 12 are controlled, the arm cylinders 12 extend or retract, and the pair of left and right lift arms 4 swing up or down relative to the vehicle body 2. Additionally or alternatively, the direction and flow rate of the fluid from the hitch control valve 16b to the pair of left and right hitch cylinders 13 are controlled, the hitch cylinders 13 extend or retract, and the hitch 9 swings diagonally upward and forward (dumping direction) or diagonally rearward and downward (shoveling direction) relative to the left and right lift arms 4. That is, upon the operation of the work operation member 7, the heightwise position and the attitude (tilt) of the attachment 30 mounted to the hitch 9 are controlled.

The AUX control valve 16c of the CVU 16 is positionally controlled by the operation of, for example, an auxiliary (AUX) drive switch 29. The latch control valve 16d of the CVU 16 is positionally controlled by the operation of a mounting switch 27a or a demounting switch 27b of the latch operator 27.

The following discusses an electric/electronic structure of the working vehicle 1 including the latch operator 27, the AUX drive switch 29, and the like with reference to FIGS. 1A and 1B. The working vehicle 1 includes a battery 20. The working vehicle 1 includes electrical component(s) supplied with electricity from the battery 20 such as the controller 21, the storage (storing unit) 22, the beacon scanner (first communicator) 23, the communicator (second communicator) 24, the position detector 25, the user interface (output interface (display), input interface (selector)) 26, the latch operator (operating device) 27, the auxiliary mode switch (AUX mode switch) 28, and/or the auxiliary output switch (AUX output switch) 29.

The controller 21 of the working vehicle 1 includes, for example, an electronic control unit (ECU) as an information processor 21b to process information acquired from the beacon scanner 23, the user interface 26, the latch operator 27, and/or the like and prepare attachment information 220A (described later).

The controller 21 also includes the selection prompter 21c such as an ECU to store, for example, program(s) to ask for the operator to operate the user interface (output interface (display), input interface (selector)) 26 to select an attachment 30 when the working vehicle 1 (the beacon scanner 23 of the working vehicle 1) does not receive any advertise signals 200 form attachment(s) 30.

Note that the information processor 21b and the selection prompter 21c may be integral with each other in a single ECU.

The controller 21 of the working vehicle 1 may include ECUs and/or the like for various purposes such as controlling elements of the working vehicle 1 and/or the attachment 30 mounted to the working vehicle 1, e.g., for engine control, transmission (HST) control, and/or controlling raising/lowering etc. of the mounted attachment, and such ECUs and/or the like may be connected to each other over an in-vehicle network.

Alternatively, the controller 21 may be a single ECU, and the information processor 21b, the selection prompter 21c, and the like may be electronic circuits of the controller 21 that are programmed to achieve their purposes and/or the portions of the controller 21 where such program(s) are stored.

The memory 21a of the controller 21 is, for example, a volatile or nonvolatile random access memory (RAM) and/or EEPROM. The controller 21 uses a predetermined storage area of the memory 21a as a buffer to temporarily store information and data.

In particular, in the TSS 100, the memory 21a is used as a storing unit to temporarily store advertise signals 200 from attachments 30 received by the working vehicle 1 (by the beacon scanner 23 of the working vehicle 1).

Note that the memory 21a may be integral with ECU(s) and/or the like of the information processor 21b and/or selection prompter 21c.

The storage 22 is a nonvolatile memory. In FIGS. 1A and 1B, the storage 22 is illustrated outside the controller 21, i.e., illustrated as if it were provided outside the ECU and/or the like of the controller 21. Note, however, that the location of the storage 22 may be inside or outside the controller 21.

In particular, in the present preferred embodiment, the storage 22 is used as a storing unit to store an attachment list 210 (see FIG. 5) which is a list of attachment IDs 211 of attachments 30 which may be mounted to the working vehicle 1 (described later in detail). The storage 22 may store image (such as icon) data 212 of the attachments 30 included in the attachment list 210.

The storage 22 may be used as, for example, a storing unit to store attachment information 220A and/or the like prepared by the controller 21 and/or the like.

Note that, in the present preferred embodiment, it is only necessary that the working vehicle 1 include one or more storing units to store an attachment list 210 of attachments 30 (including the attachment IDs 211 of the respective attachments 30 and/or pieces of image data 212 of the respective attachments 30 included in the attachment list 210).

That is, the configuration of such storing units is not limited to that including the memory 21a and the storage 22 as illustrated in FIGS. 1A and 1B, and may be various configurations. For example, the one that functions both as the memory 21a and the storage 22 may be provided in any of the ECU(s) of the controller 21 or outside the controller 21.

The beacon scanner 23 of the working vehicle 1 is a receiver to receive wireless signals (beacon signals) compliant with Bluetooth (registered trademark) Low Energy which is a near field communication standard. In the TSS 100, the beacon scanner 23 is provided as a first communicator to receive advertise signals 200 which are wireless signals (beacon signals) transmitted from beacon(s) 33 of attachment(s) 30.

The beacon scanner 23 measures the received signal strength indicator (RSSI, received signal strength) of the received wireless signal. The information processor 21b in the TSS 100 measures the RSSI of advertise signals 200 received by the beacon scanner 23 to determine (identify) an attachment 30 of the plurality of attachments 30 in the vicinity of the working vehicle 1 that is located at a position so close to the working vehicle 1 (to the hitch 9 of the working vehicle 1) that the attachment 30 can be mounted to the working vehicle 1 (to the hitch 9 of the working vehicle 1). (such a position may be hereinafter referred to as "mountable/demountable location")

Note that, in order to determine whether or not an attachment 30 is located at a mountable/demountable location close to the hitch 9 using the above method, it is preferable that the beacon scanner 23 and each beacon transmitter 33 be arranged such that the RSSI of the advertise signal 200 received by the beacon scanner 23 increases as the attachment 30 approaches the hitch 9.

An example of such an arrangement of the beacon scanner 23 and the beacon transmitters 33 is such that, as illustrated in FIG. 2, the rear portion of the attachment 30 that is mounted to (hooked on) the hitch 9 is provided with a beacon transmitter 33 such that the beacon transmitter 33 transmits an advertise signal 200 rearward, whereas the beacon scanner 23 is provided on the front portion of the vehicle body 2 of the working vehicle 1 that is closest to the hitch 9.

The communicator 24 communicates with the server 110 via, for example, the Internet or wireless LAN. In the present preferred embodiment, the information processor 21b of the controller 21 causes the communicator 24 to transmit, to the server 110, attachment information 200A including the identification information (attachment ID 224, described later) of attachment(s) 30 acquired based on advertise signal(s) 200 and/or the like, vehicle position information 230 obtained by determining position by a position detector 25 (described later), and/or the like.

The position detector 25 is a global positioning system (GPS) receiver to receive radio waves from GPS satellite(s) 40 to determine (calculate) the current position of the working vehicle 1. The result of determination (calculation) by the position detector 25 is inputted as vehicle position information 230 (see FIG. 3) into the controller 21, and the controller 21 causes the user interface 26 (as a display) to display the vehicle position based on the vehicle position information 230.

In the TSS 100, the vehicle position information 230 based on the result of determination by the position detector 25 is periodically transmitted from the working vehicle 1 to the server 110. The information processor 21b of the controller 21 causes the communicator 24, which transmits the attachment information 220A, to also transmit the vehicle position information 230 acquired by the position detector 25 to the server 110. More specifically, the information processor 21b of the controller 21 causes the communicator 24 to transmit the attachment information 220A including the vehicle position information 230 to the server 110, as illustrated in FIG. 3.

In the present preferred embodiment, the user interface 26 includes a display as an output interface and a selector as an input interface. The user interface 26, as the display (output interface), displays a list 210 of one or more attachments 30 stored in the storage 22 (attachment list 210) and one or more pieces of identification information (attachment IDs) 211 of the respective one or more attachments 30 on a display screen. The display screen of the user interface 26 is provided on, for example, a dashboard of the working vehicle 1 and is visually recognizable to an operator seated on the operator's seat 8 of the working vehicle 1.

The user interface 26, as the selector (input interface), is to be operated by the operator to select, from the attachment list 210 and the attachment IDs 211 of the attachments 30 stored in the storage 22, one attachment 30 and the attachment ID 211 of the one attachment 30.

Upon operation of the user interface 26 (as the selector) by the operator to select one attachment 30, the user interface 26 as the display displays an image of the selected attachment 30 based on a corresponding piece of image data 212 stored in the storage 22.

The user interface 26 displays the image of the selected attachment 30 based on the corresponding piece of image data 212 stored in the storage 22 upon the operation of the user interface 26 (as the selector) by the operator to select the attachment 30 from the attachment list 210. Additionally or alternatively, the user interface 26 may display, as the display, upon determination of the attachment ID 224 to be included in attachment information 220A based on the attachment ID 203 etc. included in the advertise signal 200, the image of the attachment 30 based on a piece of image data 212 corresponding to the attachment ID 224.

The user interface 26 may be, for example, a touchscreen which can function both as an input interface (selector) and an output interface (display). Alternatively, the user interface 26 may be a combination of manual operator(s) (such as switch(es)) as an input interface (selector) and a display panel or the like as an output interface (display).

The latch operator 27 includes an attaching (latch) switch 27a and a detaching (unlatch) switch 27b. The mounting switch 27a is to be operated to mount (latch) an attachment 30 to the hitch 9. The demounting switch 27b is to be operated to allow the attachment 30 to be demounted (unlatched) from the hitch 9.

The mounting switch 27a and the demounting switch 27b of the latch operator 27 are each a momentary switch which turns ON only while being pressed by the operator's finger (i.e., returns to OFF position when released).

While the mounting switch 27a is being pressed (while in ON position), latching mechanisms 51 (described later) of the hitch 9 continue to act in order to mount the attachment 30 to the working vehicle 1 (to the hitch 9). Note that the pressing (turning ON) of the mounting switch 27a may be hereinafter referred to as the operation to mount the attachment 30 (or "mounting operation").

While the demounting switch 27b is being pressed (turned ON), the latching mechanisms 51 of the hitch 9 continue to act in order to demount the attachment 30 from the working vehicle 1 (from the hitch 9). Note that the pressing (turning ON) of the demounting switch 27b may be hereinafter referred to as the operation to demount the attachment 30 (or "demounting operation").

The auxiliary (AUX) mode switch 28 is to be operated to set an auxiliary (AUX) mode in which the AUX attachment 30X is allowed to be used. The AUX mode is a mode in which, for example, the AUX control valve 16c is unlocked from a position in which the supply of hydraulic fluid to the AUX port(s) 18 is stopped, and the AUX control valve 16c is allowed to move to a position in which the supply of hydraulic fluid to the AUX port(s) 18 is allowed.

After the AUX mode is achieved by operation of the AUX mode switch 28, the auxiliary (AUX) drive switch 29 is operated to supply hydraulic fluid to the AUX actuator 36. The position of the AUX control valve 16c is controlled according to the degree to which the AUX drive switch 29 is operated (which hereinafter may be referred to as "operation amount") and the position of the AUX drive switch 29, the direction and/or flow rate of fluid flow between the AUX port(s) 18 and the hydraulic fluid port(s) 38 is/are controlled, and, for example, the rotation direction, the rotation speed, and/or the like of the hydraulic motor as the AUX actuator 36 of the attachment 30X are controlled.

Figure 14:
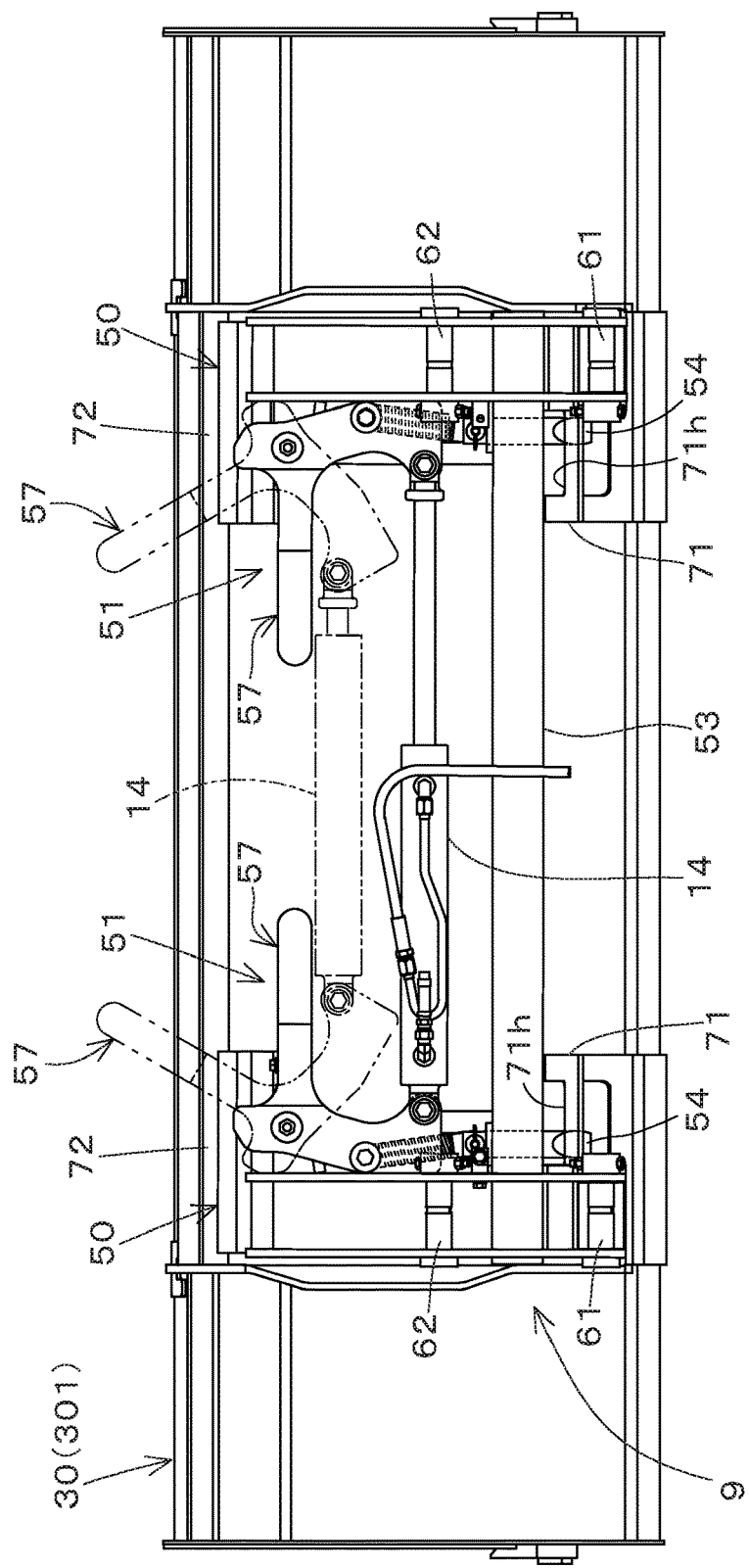
FIG. 14 is a rear view of a hitch and an attachment (bucket).
Figure 15:
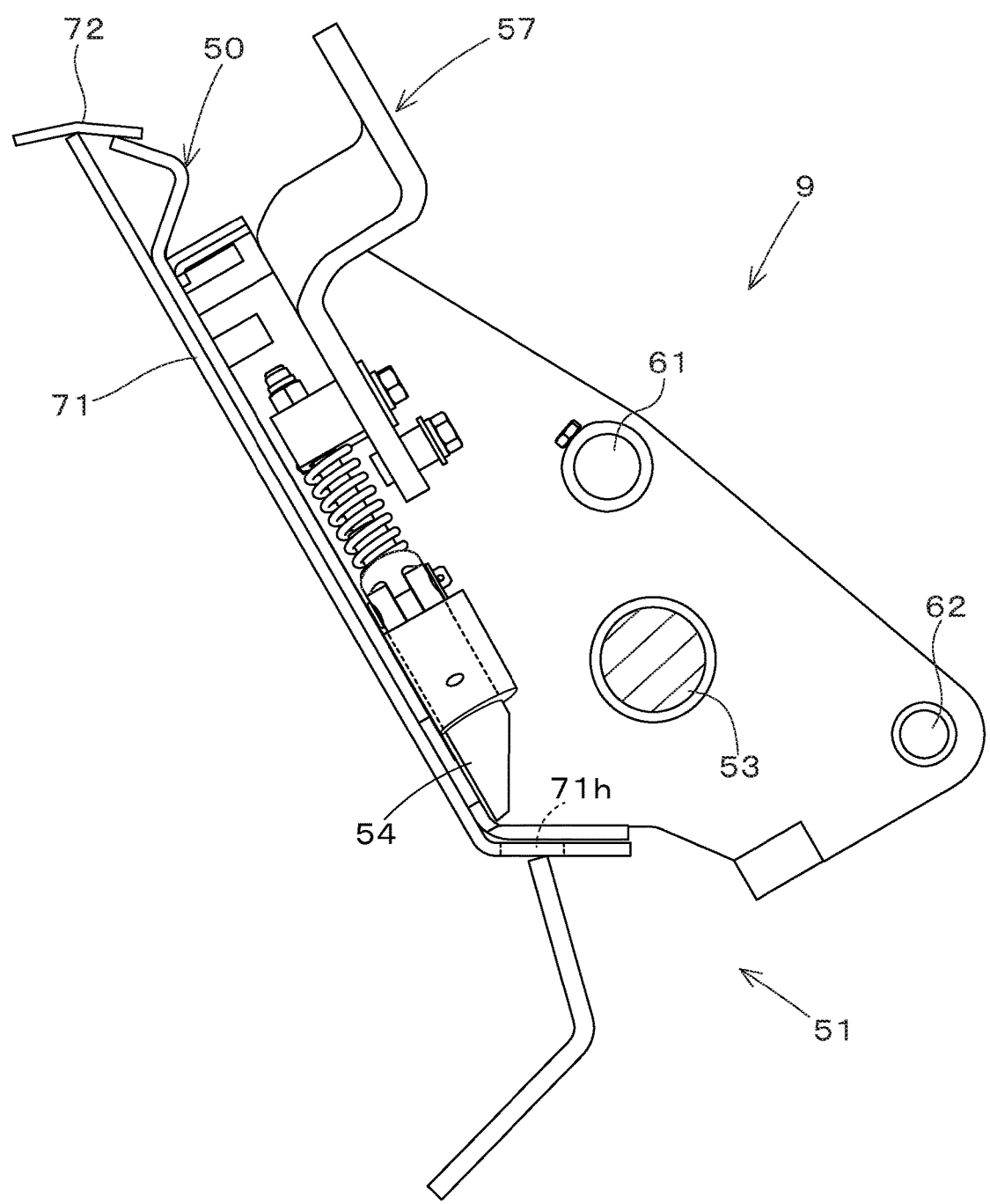
FIG. 15 is a side view of the hitch.

The following description discusses, with reference to FIGS. 14 and 15, the structure of the hitch 9 as a linkage to mount and demount an attachment 30, the actions of hydraulic actuators (hitch cylinders 13, latch cylinder 14) of the hitch 9, and the like.

FIG. 14 is a rear view of the hitch 9. Specifically, FIG. 14 illustrates the hitch 9 and an attachment 30 located forward of the hitch 9 as seen from the vehicle body 2 of the working vehicle 1. FIG. 15 is a side view illustrating the hitch 9.

The hitch 9 includes a pair of left and right brackets 50, a pair of left and right latching mechanisms 51, a latch cylinder 14, and the like. The left and right brackets 50 hold the attachment 30. The latching mechanisms 51 are operable selectively in a latching state in which the attachment 30 is secured to the brackets 50 (quick hitch 16) and an unlatching state in which the attachment 30 is allowed to be demounted from the brackets 50. The latch cylinder 14 is an extendable/retractable actuator to place the latching mechanisms 51 selectively in the latching state and the unlatching state.

Each bracket 50 is provided with a pivot 61 and a pivot 62 each having an axis extending in the lateral direction of the working vehicle 1. The pivots 61 have the distal ends of the left and right lift arms 4 mounted thereto. The pivots 62 have ends (rod heads) of the left and right hitch cylinders 13 mounted thereto.

The left and right lift arms 4 and the left and right hitch cylinders 13 are pivotally supported on the left and right brackets 50 in such a manner. The angle between the lift arms 4 and the brackets 50 connected via the pivots 61 changes as the hitch cylinders 13 extend or retract.

The pair of left and right brackets 50 are connected together by a beam 53 to define the hitch 9. The left and right brackets 50 pivot together relative to the left and right lift arms 4 as the left and right hitch cylinders 13 extend or retract in a synchronized manner.

The attachment 30 includes a base plate 71 at a rear portion thereof, and includes, at a position above the base plate 71, a top plate 72 which is bent downward.

The upper portions of the left and right brackets 50 are inserted between the base plate 71 and the top plate 72 of the attachment 30 and engage with the back surface of the top plate 72, and lower portions of the left and right brackets 50 engage with the lower portion of the base plate 71, so that the attachment 30 is held by the left and right brackets 50. That is, the attachment 30 is hooked on (hitched to) the hitch 9.

As illustrated in FIG. 14, the left and right latching mechanisms 51 are provided between the left and right brackets 50. The latching mechanisms 51 each include a latch pin 54 extending downward, a latch lever 57 substantially in the letter L shape in rear view, and/or the like. The latch cylinder 14 is positioned laterally above the beam 53. The left and right ends of the latch cylinder 14 are pivotally connected to the corresponding left and latch levers 57.

In the present preferred embodiment, the latch cylinder 14 is a hydraulic cylinder. Note, however, that the latch cylinder 14 may be an air cylinder or the like or a threaded rod and/or the like. An electric motor may be provided instead of the latch cylinder 14 and the latch levers 57 may be pivoted by rotation of the electric motor.

As indicated by dot-dot dash line in FIG. 14, as the latch cylinder 14 retracts, the latch levers 57 pivot upward. With this, the latch pins 54 move upward, and eventually, the latch pins 54 come off through-holes 71h in the lower portion of the base plate 71 of the attachment 30 (the state shown in FIG. 15). With this, the latching mechanisms 51 are brought into the unlatching state (which may also be referred to as "unlock state") in which the latching mechanisms 51 do not hold the attachment 30, and the attachment 30 is allowed to be demounted from the attachment 30 (i.e., the attachment 30 that was hooked on the attachment 30 is now allowed to be demounted from the hitch 9).

On the contrary, as indicated by solid line in FIG. 14, as the latch cylinder 14 extends, the latch levers 57 pivot downward and the latch pins 54 are inserted into the through-holes 71h in the lower portion of the base plate 71 of the attachment 30. With this, the latching mechanisms 51 are brought into the latching state (which may also be referred to as "lock state") in which the latching mechanisms 51 hold the attachment 30, and the attachment 30 is completely mounted to the hitch 9. That is, the brackets 50 engage with the base plate 71 and the hitch 9 having the attachment 30 hooked thereon (hitched to) is brought into the latching state, so that the attachment 30 is mounted to the hitch 9 (to the working vehicle 1).

The latch cylinder 14 extends or retracts as the attaching (latch) switch 27a or the detaching (unlatch) switch 27b (latch operator 27) is operated. The relationship between the operation of the latch operator 27 and the action of the latch cylinder 14 will be described later in detail when describing how the information processor 21b of the working vehicle 1 determines whether or not the attachment 30 is in a state in which the attachment 30 is considered mounted to the working vehicle 1 (to the hitch 9) (i.e., in the mounted state) and how the information processor 21b determines whether or not the attachment 30 is in a state in which the attachment 30 is considered demounted from the working vehicle 1 (from the hitch 9) (i.e., in the demounted state).

Figure 4:
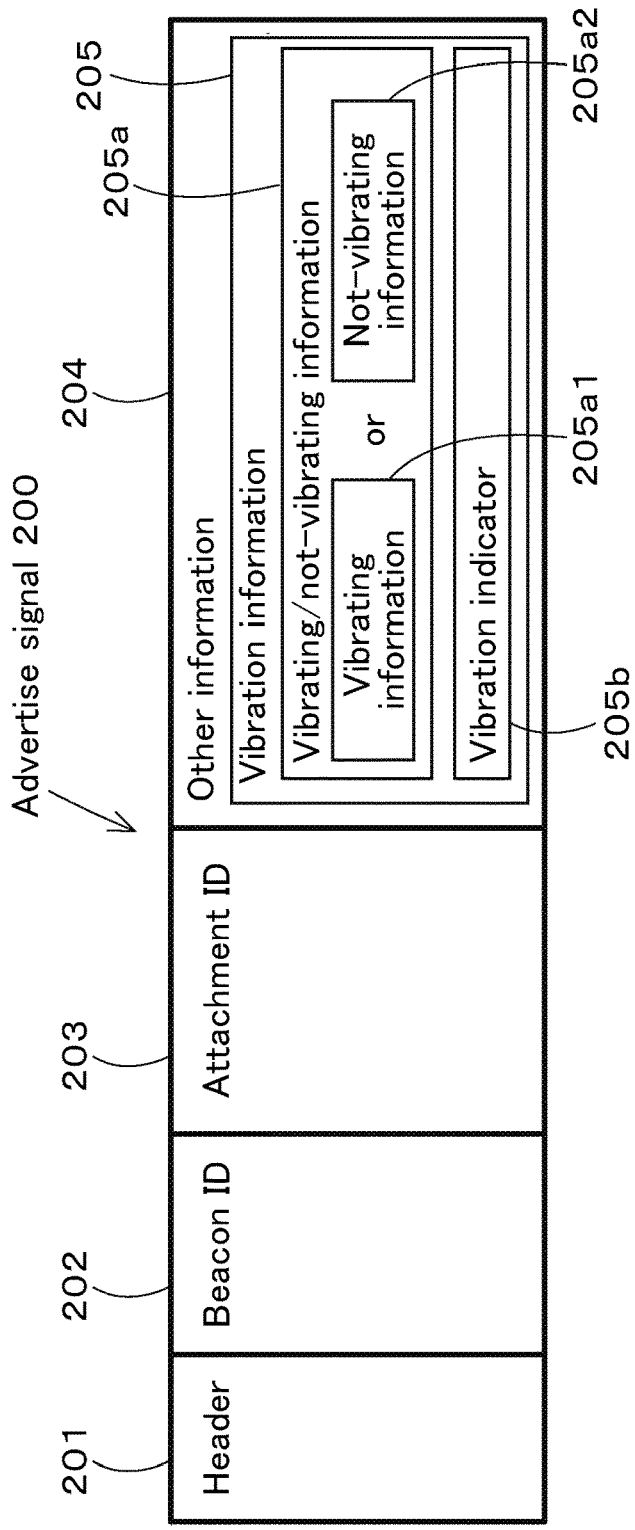
FIG. 4 schematically illustrates an advertise signal.
Figure 6:
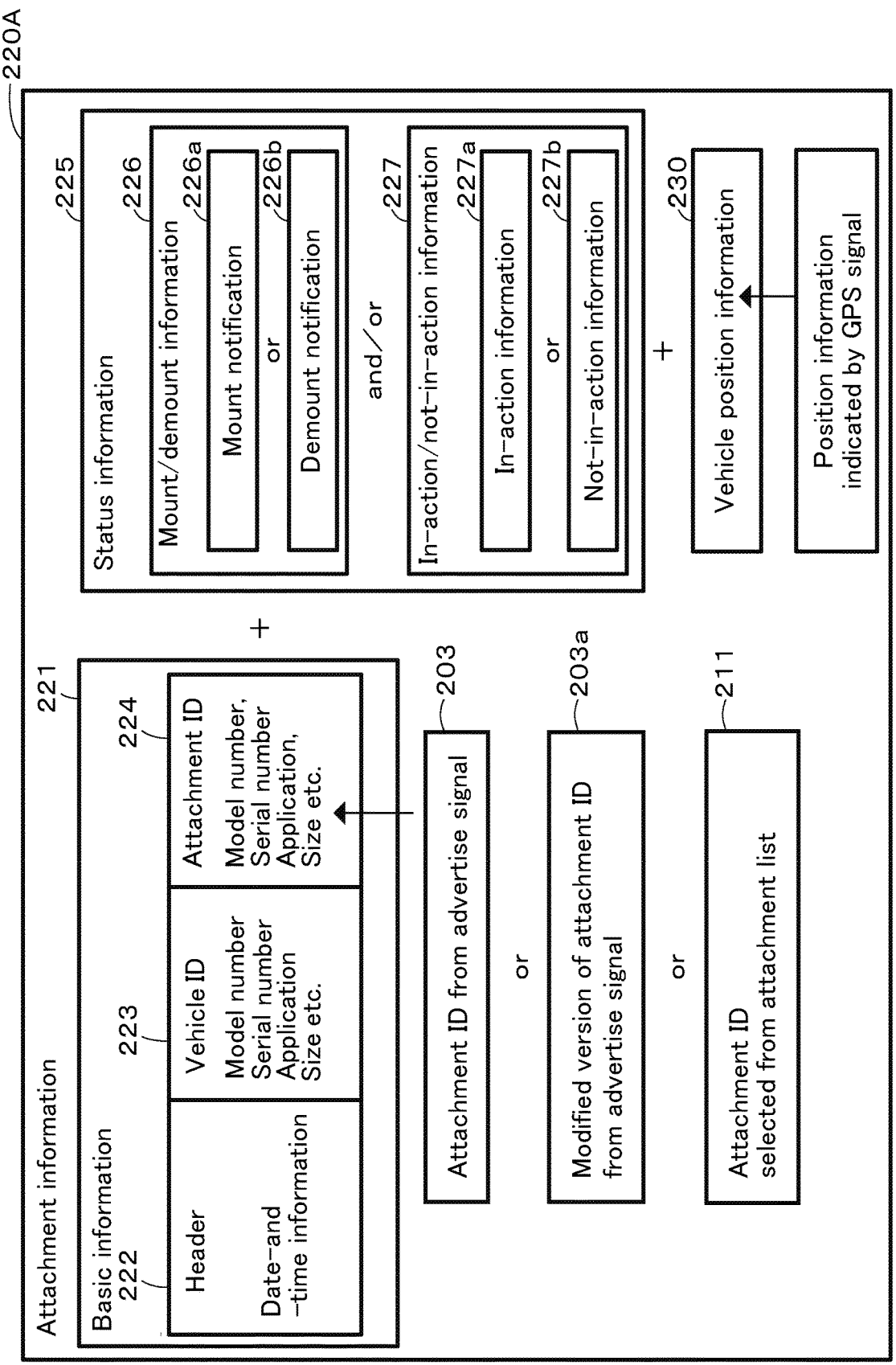
FIG. 6 schematically illustrates attachment information.
Figure 7:
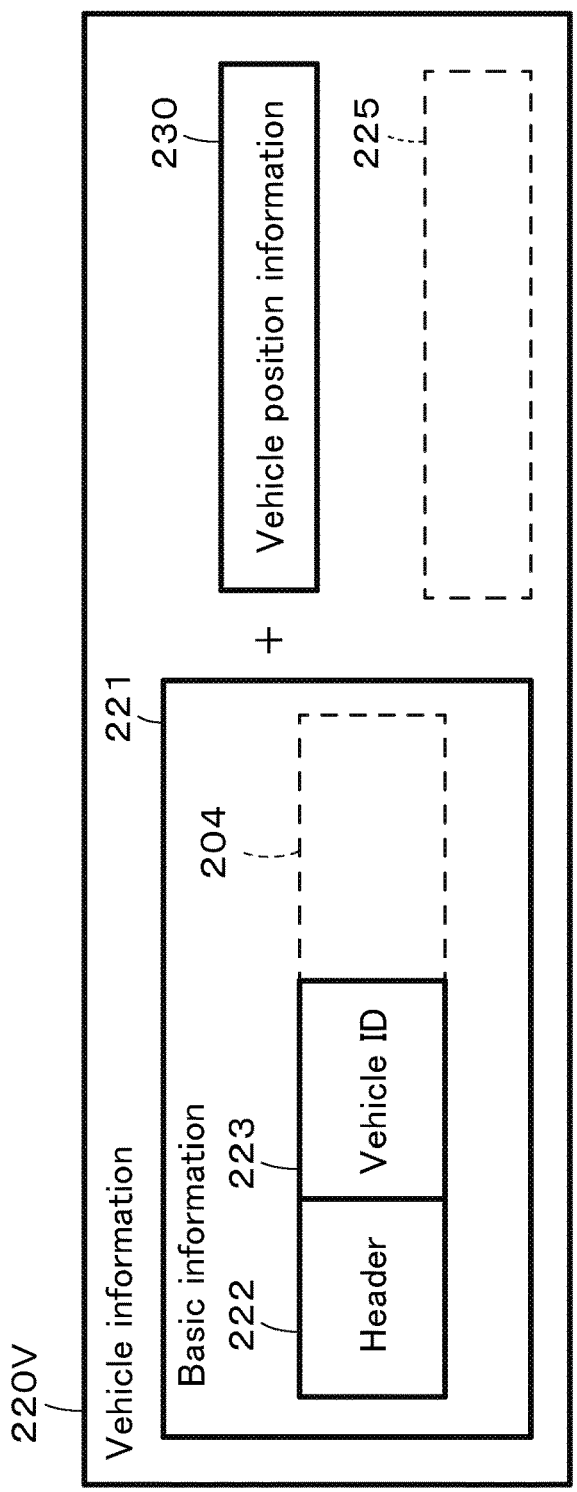
FIG. 7 schematically illustrates vehicle information
Figure 8:
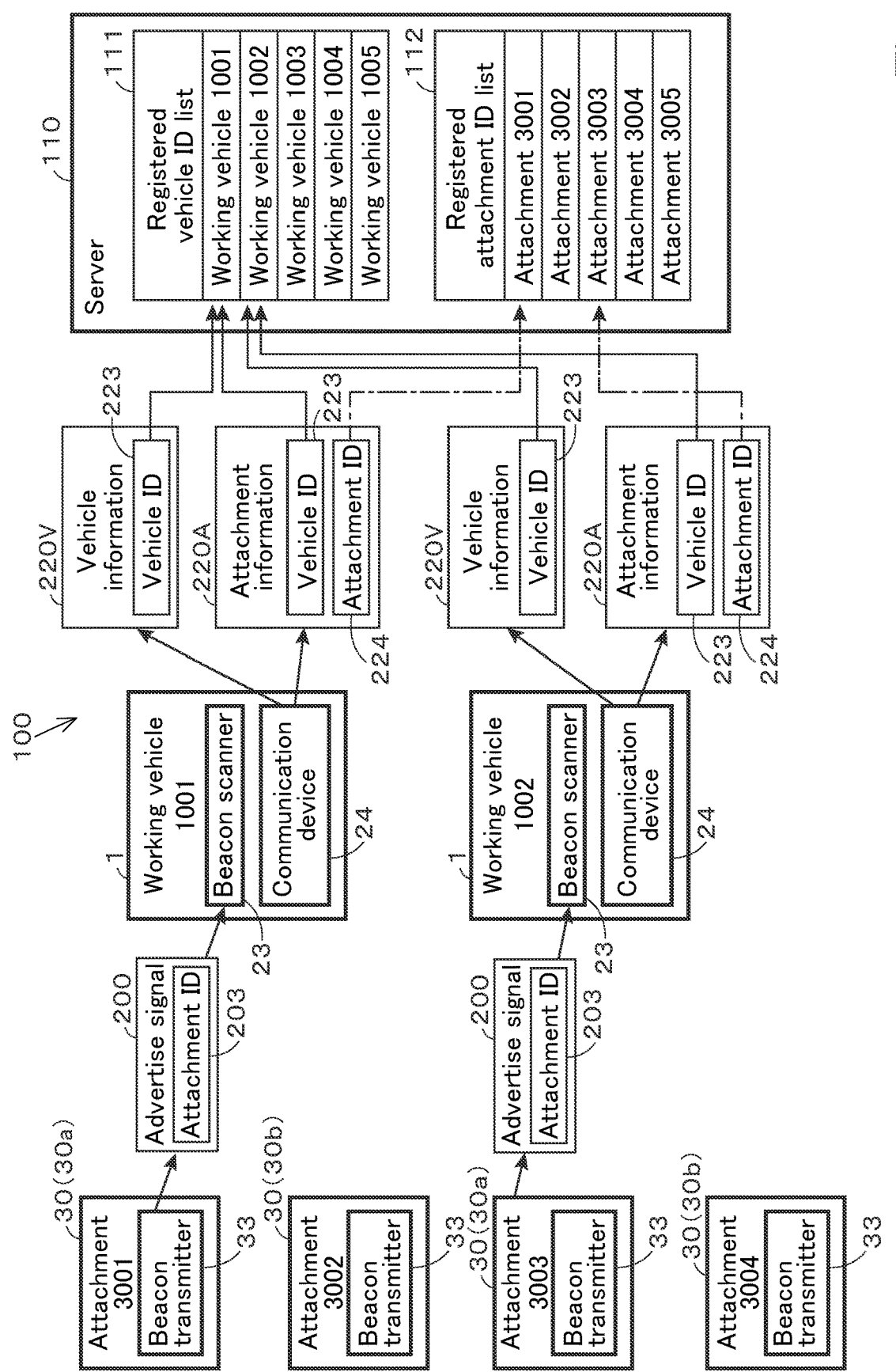
FIG. 8 schematically illustrates relationships between one or more attachments, one or more working vehicles, and a server via transmission of signals and information, in the telematics service system.

The following description discusses, with reference to FIGS. 3 to 8, the manner in which signals and information are communicated and the content of the signals and information, in the TSS 100. FIG. 3 schematically illustrates the manner in which signals and information are communicated in the TSS 100 according to a first preferred embodiment. FIG. 4 schematically illustrates an advertise signal 200. FIG. 5 schematically illustrates an attachment list 210. FIG. 6 schematically illustrates attachment information 220. FIG. 7 schematically illustrates vehicle information 220V not including information relating to an attachment. FIG. 8 schematically illustrates relationships between one or more attachments 30, one or more working vehicles 1, and the server 110 via transmission of signals and information, in the TSS 100.

The following description first discusses transmission of wireless signal(s) form attachment(s) 30. As illustrated in FIGS. 1A to 3, each attachment 30 (including the AUX attachment 30X) is provided with a beacon transmitter 33. The beacon transmitter 33 is a transmitter to periodically transmit an advertise signal (which may also be referred to as "beacon signal") 200 which is a wireless signal compliant with Bluetooth (registered trademark) Low Energy (BLE). The beacon transmitter 33 looks like a small tag, and therefore is also called a "BLE tag".

The beacon transmitter 33 includes a microcomputer, a memory, a transmitter circuit, a battery, a vibration sensor (vibration detector) 34, and/or the like. The elements of the beacon transmitter 33 are driven by electricity from the battery. The beacon transmitter 33 transmits the advertise signal 200 at interval(s) of, for example, about 1 to 3 seconds. Note, however, that the intervals are not limited as such, and may be set appropriately.

As illustrated in FIG. 4, the advertise signal 200 includes a header 201, beacon identification information (hereinafter "beacon ID") 202, attachment identification information (hereinafter "attachment ID") 203, and other information 204.

The beacon ID 202 is identification information of the beacon transmitter 33 from which the advertise signal 200 is transmitted. The attachment ID 203 is identification information of the attachment 30 provided with the beacon transmitter 33 from which the advertise signal 200 is transmitted. The attachment ID 203 may include, for example, the name of the attachment type, model number, unique identification number, the date of manufacture, and/or the like of the attachment 30.

The other information 204 of the advertise signal 200 includes vibration information 205 relating to the vibration state detected by the vibration sensor 34 of the beacon transmitter 33 from which the advertise signal 200 is transmitted, i.e., the vibration information 205 relating to the vibration state of the attachment 30 provided with the beacon transmitter 33.

The vibration information 205 may include vibrating/not-vibrating information 205a indicating whether or not the attachment 30 is vibrating (whether there is vibration or not). The vibrating/not-vibrating information 205a is switched between vibrating information 205a1 indicating that there is vibration (the attachment 30 is vibrating) and not-vibrating information 205a2 indicating that there is no vibration (the attachment 30 is not vibrating).

For the purpose of including the vibrating/not-vibrating information 205a switchable between the vibrating information 205a1 and the not-vibrating information 205a2 into the advertise signal 200, for example, the beacon transmitter 33 may be provided with an ON/OFF switch to be switched according to the amplitude and/or the like of the vibration detected by the vibration sensor 34.

An example would be a configuration in which the ON/OFF switch (softswitch) is electrically connected to the vibration sensor 34, and, upon detection of, for example, the amplitude equal to or greater than a predetermined amplitude by the vibration sensor 34, a detection signal from the vibration sensor 34 causes the ON/OFF switch to turn ON and output a signal relating to vibrating information 205a1, and the signal is included into the advertise signal 200.

Alternatively, the vibration sensor 34 may be the ON/OFF switch which turns ON upon sensing the amplitude equal to or greater than a predetermined amplitude and outputs a signal relating to the vibrating information 205a1.

In such a case, the ON/OFF switch may turn ON if it can be determined that the attachment 30 is vibrating based on the amplitude etc. of the vibration detected by the vibration sensor 34, and the state in which the ON/OFF switch is ON may be used as the state in which the vibrating/not-vibrating information 205a is the vibrating information 205a1. On the contrary, the state in which the ON/OFF switch is OFF can be used as the state in which the vibrating/not-vibrating information 205a is the not-vibrating information 205a2.

Note that the state in which the vibrating/not-vibrating information 205a is the vibrating information 205a1 (the state in which "the attachment 30 is vibrating" or "there is vibration in the attachment 30") has different meanings technically depending on the purpose of use of the vibration information 205.

When the vibrating/not-vibrating information 205a is used to determine whether or not the attachment 30 is hooked on the hitch 9 (described later), the vibration of the attachment 30 for the vibrating/not-vibrating information 205a to be the vibrating information 205a1 refers to the state in which the attachment 30 is vibrating with a magnitude and/or pattern that is/are sufficient to determine that the attachment 30 is hooked on (hitched to) the hitch 9 of the working vehicle 1 in terms of amplitude, frequency, duration and/or the like of the vibration.

On the contrary, when the vibrating/not-vibrating information 205a is used to determine whether or not the attachment 30 mounted on the working vehicle 1 (to the hitch 9) is in the acting state (described later), the vibration of the attachment 30 for the vibrating/not-vibrating information 205a to be the vibrating information 205a1 refers to the state in which the attachment 30 is vibrating with a magnitude and/or pattern that is/are sufficient to determine that the vibration of the working vehicle 1, resulting from the driving of the prime mover 10 for work using the attachment 30 by the working vehicle 1, travel of the working vehicle 1, and/or the extension/retraction of the arm cylinders 12 and/or the hitch cylinders 13 etc. is transmitted to the attachment 30, in terms of amplitude, frequency, duration and/or the like of the vibration.

In the case where the attachment 30 is an AUX attachment 30X, the vibration based on which whether the AUX attachment 30 is in the acting state is determined may refer to the state in which the attachment 30 is vibrating with a magnitude and/or pattern that is/are sufficient to determine that the AUX actuator 36 is in action.

In consideration of the above, the vibration sensor 34 may be configured to be capable of adjusting the amplitude, frequency, and/or the like of vibration based on which whether the vibrating/not-vibrating information 205a is to be switched to the vibrating information 205a1 is determined.

The vibration information 205 may include a vibration indicator (numeric value) 205b indicating the magnitude of the vibration detected by the vibration sensor 34, instead of or in addition to the vibrating/not-vibrating information 205a.

Specifically, the advertise signal 200 transmitted from the beacon transmitter 33 of the attachment 30 may only include a value indicating the magnitude of vibration of the attachment 30, and the information processor 21b (described later) etc. of the working vehicle 1 etc. having received the advertise signal 200 may determine, based on the value, whether or not the attachment 30 is vibrating (whether or not the attachment 30 is hooked on the hitch 9).

The vibration indicator 205b may be, for example, at least one of the displacement, velocity, or acceleration of the vibration of the attachment 30 detected by the vibration sensor 34. Inertial sensor(s) such as an acceleration sensor and/or a gyroscope sensor may be used as the vibration sensor 34.

As illustrated in FIG. 3, in the working vehicle 1, the beacon scanner 23 is configured to receive advertise signal(s) 200 from beacon transmitter(s) 33 of attachment(s) 30. The communicator 24 of the working vehicle 1 is configured to transmit, to the server 110, attachment information 220A including status information 225 relating to mounting/demounting the attachment 30 to/from the working vehicle 1, the action state of the attachment 30, and/or the like, based on basic information 221 based on the attachment ID 203 and the like included in the advertise signal 200, the detection of the state of the hitch (quick hitch) 9 as a linkage provided on the working vehicle 1, and/or the like.

Note that there may be cases in which the attachment 30 does not transmit any advertise signals 200 including an attachment ID 203 and/or the like because, for example, the attachment 30 is not provided with a beacon transmitter 33 or the beacon transmitter 33 has run out of battery. For the purpose of preparing attachment information 220A (in which the identification information of the attachment 30 mounted to the working vehicle 1 is associated with information relating to the mounted/demounted state, the action state, and/or the like) and transmitting it to the server 110 also in such cases, the storage 22 of the working vehicle 1 stores the attachment list 210 as shown in FIG. 5.

The attachment list 210 includes a collection of one or more attachment IDs 211 each of which is a piece of identification information of a corresponding one of one or more attachments 30 which may be mounted to the working vehicle 1. When the beacon scanner 23 does not receive any advertise signals 200, the user interface 26 functions as a display (output interface) to display the attachment list 210 and a selector (input interface) for the operator to check the displayed content and select one of the attachment IDs 211. This allows the communicator 24 of the working vehicle 1 to transmit, to the server 110, attachment information 220A including the attachment ID 211 selected by the operator via the user interface 26.

The storage 22 stores one or more pieces of image data 212 of the respective one or more attachments 30 included in the attachment list 210. The manner in which the image of the attachment 30 is displayed based on each piece of image data 212 may be an icon (pictogram), but may be a photographic image or the like.

When one of the one or more attachments 30 is to be selected via the user interface 26, the user interface 26 as a display displays, on its screen, the image(s) (icon(s) or the like) of the one or more attachments 30 included in the attachment list 210 based on the respective pieces of image data 212. In the case where the screen of the user interface 26 is a screen of the touchscreen, the operator may touch one of the image(s) displayed to select the attachment ID 211 of the attachment 30 that corresponds to that image.

Attachment information 220A is discussed with reference to FIGS. 3 and 6. Attachment information 220A is a combination of basic information 221 including identification information and/or the like, status information 225 relating to the mounted/demounted state and/or the action state of the attachment 30, and vehicle position information 230 relating to the position of the working vehicle 1 determined by the position detector 25.

Note that the attachment information 220A at least includes the basic information 221, but does not need to include both the status information 225 and the vehicle position information 230. The attachment information 220A may include only either the status information 225 or the vehicle position information 230, or may include neither the status information 225 nor the vehicle position information 230.

The basic information 221 includes a header 222 including date-and-time information and/or the like, a vehicle ID 223, an attachment ID 224, and/or the like. The date-and-time information of the header 222 includes the date and time of creation of the attachment information 220A, the date and time of transmission of the attachment information 220A, and/or the like. The vehicle ID 223 is identification information of the working vehicle 1 to which the attachment 30 is mounted. The attachment ID 224 is identification information of the attachment 30 corresponding to the attachment information 220A.

The information processor 21b acquires the attachment ID 224 to be included into the attachment information 220, based on (from) the attachment ID 203 included in the advertise signal 200 received by the beacon scanner 23 or based on (from) the attachment ID 211 of the attachment 30 selected from the attachment list 210 by the operator via the user interface 26.

The information processor 21b may use the attachment ID 203 included in the advertise signal 200 or the attachment ID 211 of the attachment 30 selected from the attachment list 210 "as-is" as the attachment ID 224 of the attachment information 220.

Alternatively, the information processor 21b may modify the attachment ID 203 or the attachment ID 211 to obtain the attachment ID 224 to be included in the attachment information 220A, according to the operation of the user interface 26 by the operator or automatically without receiving the operator's operation.

For example, in the case where the attachment ID 203 included in the advertise signal 200 is a several-digit number and one of the digits represents the type of attachment, the information processor 21b may change the digit into a character representing the type of the attachment 30. Additionally or alternatively, the information processor 21b may add a nickname inputted by the operator via the user interface 26 to the attachment ID 203 to obtain the attachment ID 224 to be included in the attachment information 220A.

The attachment information 220A includes mount/demount information 226 and/or in-action/not-in-action information 227, which are included in status information 225 associated with the basic information 221.

The mount/demount information 226 includes a mount notification 226a or a demount notification 226b. The attachment information 220A that includes the mount notification 226a as the mount/demount information 226 is referred to as mounted attachment information 220Aa. The attachment information 220A that includes the demount notification 226b as the mount/demount information 226 is referred to as demounted attachment information 220Ad.

The in-action/not-in-action information 227 is information indicating whether or not the attachment 30 is in action to perform work. The in-action/not-in-action information 227 can be in-action information 227a indicating that the attachment 30 is in action or not-in-action information 227b indicating that the attachment 30 is not in action (or indicating that it is impossible to determine that the attachment 30 is in action). Alternatively, the in-action/not-in-action information 227 includes the in-action information 227a or the not-in-action information 227b.

The attachment information 220A that includes the in-action/not-in-action information 227 (regardless of whether the in-action/not-in-action information 227 is the in-action information 227a or the not-in-action information 227b) is referred to as in-action/not-in-action attachment information 220Aw. Note that the in-action/not-in-action attachment information 220Aw that includes the in-action information 227a may be referred to as in-action attachment information 220Awa, whereas the in-action/not-in-action attachment information 220Aw that includes the not-in-action information 227b may be referred to as not-in-action attachment information 220Awb.

Note that information transmitted from the communicator 24 of the working vehicle 1 to the server 110 may be the attachment information 220A in which the basic information 221 includes both the vehicle ID 223 and the attachment ID 224 as described above, and may be vehicle information 220V in which the basic information 221 includes the vehicle ID 223 but does not include the attachment ID 224 as shown in FIG. 7.

That is, information transmitted from the communicator 24 of the working vehicle 1 to the server 110 always includes, in the basic information 221, the vehicle ID 223 which identifies the working vehicle 1 (the sender). Of such information, those including the attachment ID 224 in the basic information 221 is the attachment information 220A, and those including no attachment ID 224 in the basic information 221 is the vehicle information 220V. In other words, if the attachment ID 224 is added to the vehicle information 220V, such vehicle information 220V can be referred to as attachment information 220A.

The controller 21 (information processor 21b) of the working vehicle 1 may transmit, to the server 110, the vehicle information 220V accompanied by mount/demount information 226 (mount notification 226a, demount notification 226b) and/or in-action/not-in-action information 227 (in-action information 227a, not-in-action information 227b) as the status information 225.

Figure 17:
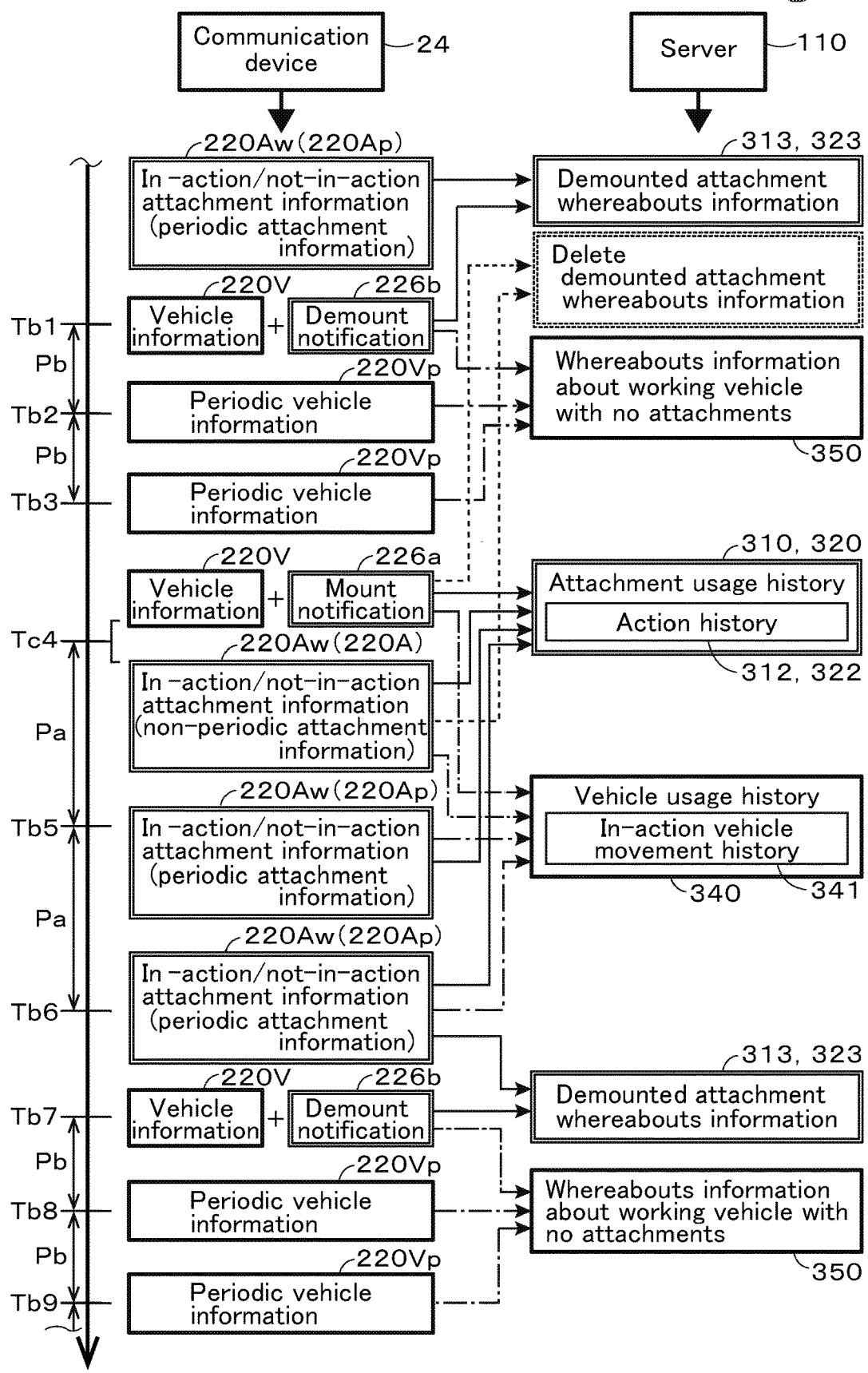
FIG. 17 schematically illustrates the manner in which information is communicated between the communicator of the working vehicle and the server over time, in a telematics service system according to a variation of the preferred embodiment shown in FIG. 16.

For example, in the preferred embodiment as illustrated in FIG. 17, the information processor 21b causes the communicator 24 to transmit, to the server 110, a combination of the mount notification 226a and the vehicle information 220V, instead of the mounted attachment information 220Aa (i.e., the attachment information 220A including the mount notification 226a). The information processor 21b also causes the communicator 24 to transmit, to the server 110, a combination of the demount notification 226b and the vehicle information 220V instead of the demounted attachment information 220Ad (i.e., the attachment information 220A including the demount notification 226b). The preferred embodiment as illustrated in FIG. 17 will be described later in detail.

The following discusses a structure of the TSS 100 as illustrated in FIG. 8. Note that, in FIG. 8, the elements and the like assigned identical reference signs with those in FIGS. 3, 4, 6, and 7 have the same functions and features as those in FIGS. 3, 4, 6, and 7, and the descriptions therefor are omitted here.

As illustrated in FIG. 8, the server 110 stores a registered vehicle ID list 111 which is a list of vehicle ID(s) of one or more registered working vehicles 1, and a registered attachment ID list 112 which is a list of attachment ID(s) of one or more registered attachments 30.

Specifically, the one or more working vehicles 1 (working vehicles 1001, 1002, etc. in FIG. 8) relating to the TSS 100 are each identified by a corresponding vehicle ID included in the registered vehicle ID list 111, and the one or more attachments 30 (attachments 3001 to 3004 etc. in FIG. 8) relating to the TSS 100 are each identified by a corresponding attachment ID included in the registered attachment ID list 112.

At each working vehicle 1, the information processor 21b of the controller 21 causes the communicator 24 to transmit, to the server 110, the vehicle information 220V including the vehicle ID 223 about the working vehicle 1, and/or the attachment information 220A including the vehicle ID 223 and the attachment ID 224, based on the attachment ID 203 etc. included in the advertise signal 200 transmitted from the beacon transmitter 33 on the attachment 30 mounted to and demounted from the working vehicle 1.

The server 110 stores the attachment information 220A and/or the vehicle information 220V received from each of the communicator(s) 24 of the one or more working vehicles 1, upon each receipt of the information.

The server 110 associates the vehicle position information 230 and/or the like included in the vehicle information 220V with the working vehicle 1 identified by checking the vehicle ID 223 included in the received or stored vehicle information 220V against the registered vehicle ID list 111.

The server 110 associates the vehicle position information 230, the status information 225, and/or the like included in the attachment information 220A with the working vehicle 1 identified by checking the vehicle ID 223 included in the received or stored attachment information 220A against the registered vehicle ID list 111, and associates the vehicle position information 230, the status information 225, and/or the like included in the attachment information 220A with the attachment 30 identified by checking the attachment ID 224 included in the attachment information 220A against the registered attachment ID list 112.

In such a manner, the server 110 associates information included in (or accompanying) the received and stored attachment information 220A and/or the vehicle information 220V with each attachment 30 and/or each working vehicle 1, thus preparing, as attachment-related telematics information 300, (i) per-attachment telematics information 300A (see FIGS. 3, 20, and the like) including a history of mounting/demounting of the attachment 30 to/from one or more working vehicles 1, an action history obtained while the attachment 30 was mounted to the working vehicle 1, the whereabouts information about the attachment 30 obtained while the attachment 30 was not mounted to the working vehicle 1 (not in use), and/or the like and (ii) per-working-vehicle telematics information 300B (see FIGS. 3, 21, and the like) including a history of mounting/demounting of one or more attachments 30 to/from the working vehicle 1, an action history of the mounted attachment(s) 30 obtained while each attachment 30 was mounted to the working vehicle 1, the whereabouts information obtained while the attachment 30 was not mounted to the working vehicle 1 (not in use), and/or the like. The server 110 manages such information, and is operable to provide such telematics information 300A, 300B to the SU terminal device 80, the SP terminal device 90, and/or the like.

Specific examples of the per-attachment telematics information 300A and the per-working-vehicle telematics information 300B included in the attachment-related telematics information 300 will be described later in detail with reference to FIGS. 20 and 21.

The server 110 may prepare, separately from the attachment-related information, telematics information for each of the one or more working vehicles 1 based on the received or stored attachment information 220A and/or the like. That is, the server 110 may prepare telematics information including no attachment-related information.

In this regard, for example, the server 110 can prepare a usage history 340 of the working vehicle 1 (see FIG. 16 etc.) by associating, with the working vehicle 1, information such as the vehicle position information 230 included in the attachment information 220A etc. received during a period during which the working vehicle 1 is provided with the attachment 30.

The server 110 can also prepare vehicle-without-attachment whereabouts information 350 (see FIG. 16 etc.) which is the whereabouts information of the working vehicle 1 with no attachment mounted thereto by associating, with the working vehicle 1, information such as the vehicle position information 230 included in the vehicle information 220V etc. received during a period during which the working vehicle 1 is not provided with the attachment 30.

The server 110 can also provide such telematics information relating to the working vehicle 1 to the SU terminal device 80, the SP terminal device 90, and/or the like.

The following description discusses when the mounted attachment information 220Aa, the demounted attachment information 220Ad, and the in-action/not-in-action attachment information 220Aw are prepared and transmitted, in the preferred embodiment illustrated in FIG. 3.

The information processor 21b determines, in response to an operation to mount the attachment 30 to the working vehicle 1, whether or not the attachment 30 is in the state in which the attachment 30 is considered mounted to the working vehicle 1 (considered having been mounted to the working vehicle 1) (i.e., whether or not the attachment 30 is in the mounted state). If the information processor 21b determines that the attachment 30 is in the mounted state, the information processor 21b prepares a mount notification 226a indicating that the attachment 30 is in the mounted state.

Note, however, that in the case of an attachment 30 completely demounted from the working vehicle 1 and placed on the ground, the information processor 21b may need to go through several determining steps to determine that such an attachment 30 has been brought into the mounted state in which the attachment 30 is considered mounted to the working vehicle 1. The following discusses such steps with reference to the flowcharts in FIGS. 9 and 10.

Figure 9:
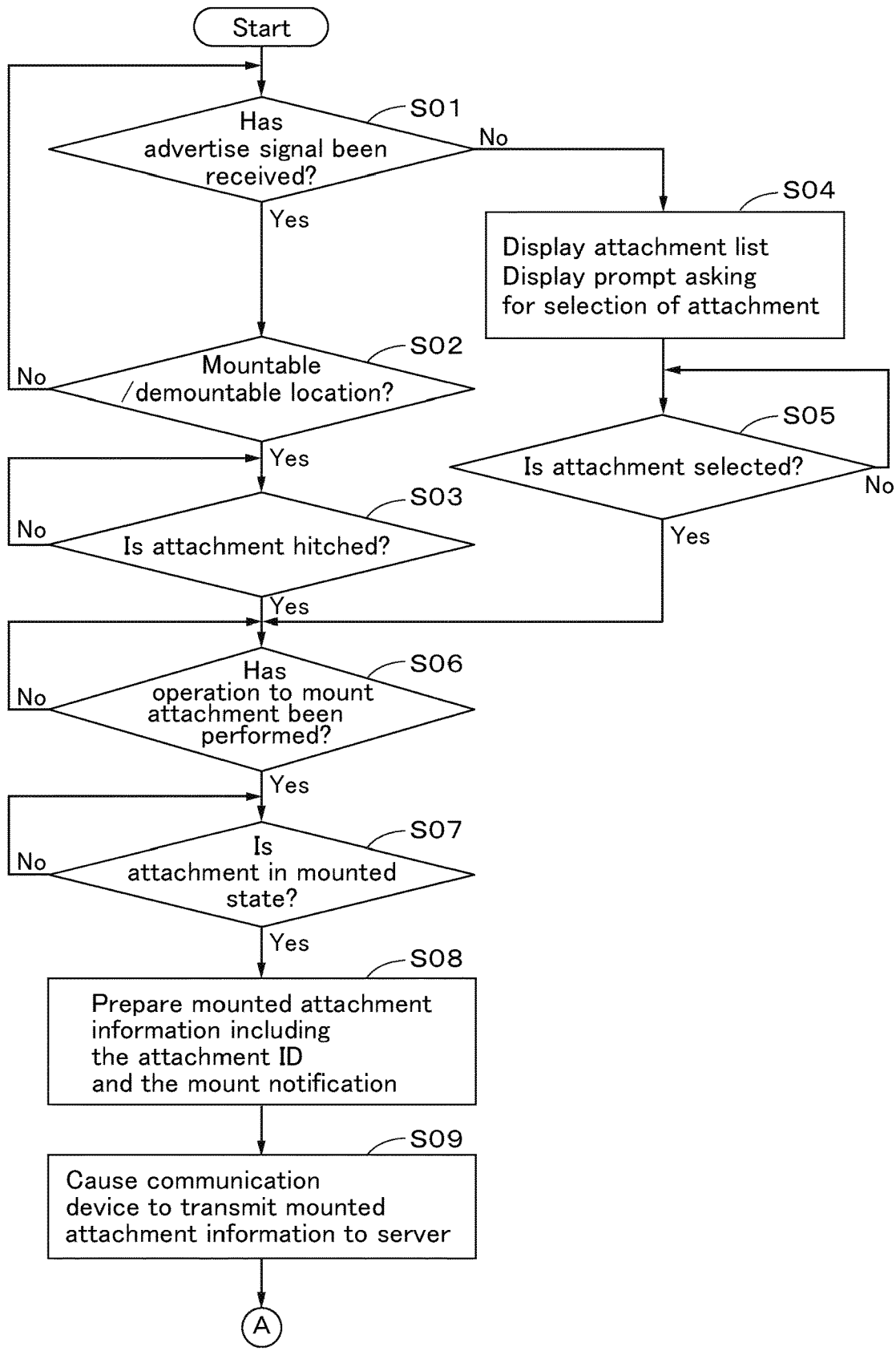
FIG. 9 is a basic flowchart showing a process performed by a working vehicle and/or the like to transmit mounted attachment information based on an advertise signal and/or the like to the server.
Figure 10:
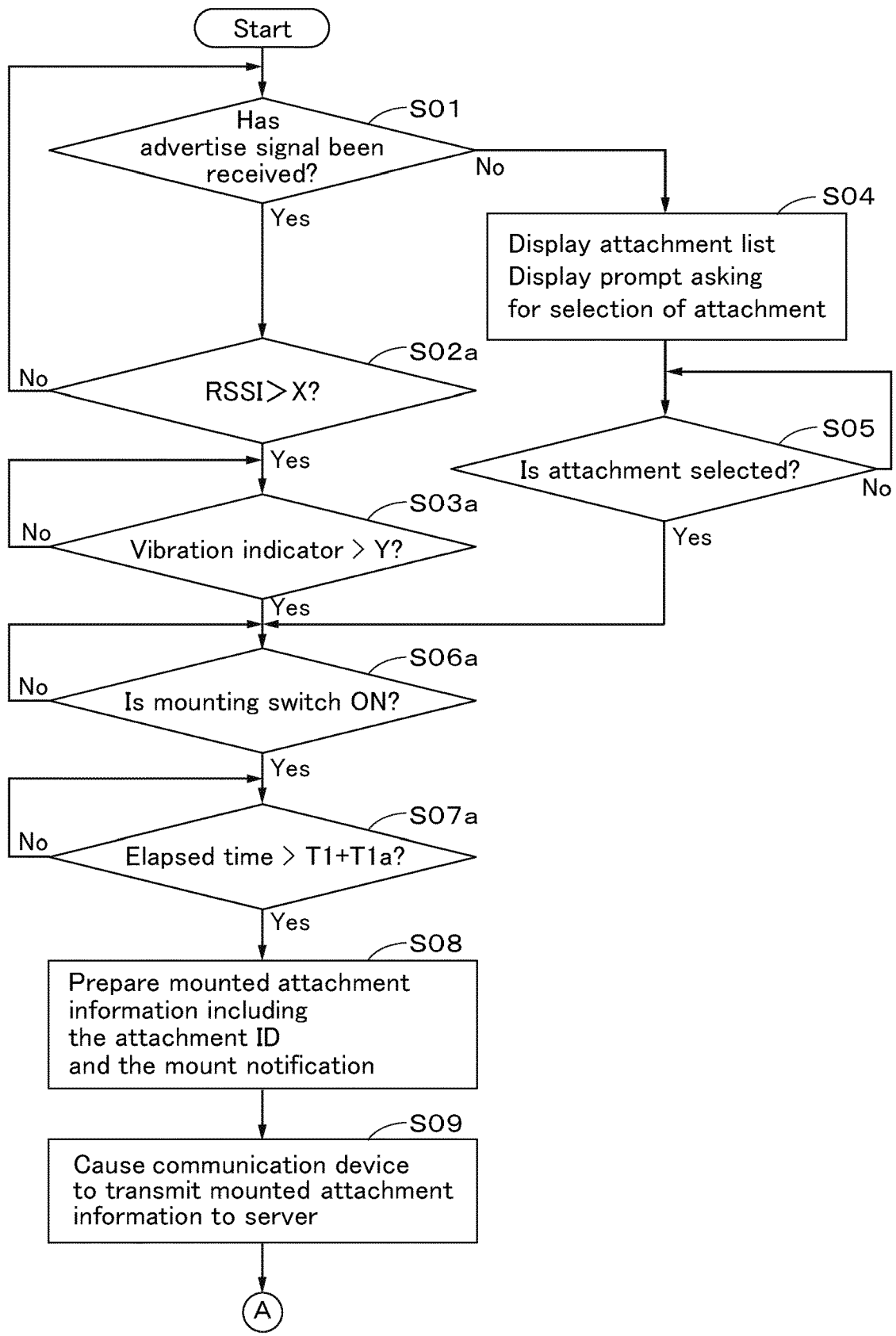
FIG. 10 is a flowchart showing an applied example of the basic flowchart in FIG. 9.

FIG. 9 is a basic flowchart showing a process performed at the working vehicle 1 from when whether an advertise signal has been received is determined to when mounted attachment information is transmitted. FIG. 10 is a flowchart showing an applied example of the basic flowchart in FIG. 9.

Referring to FIG. 9, if the information processor 21b determines that the beacon scanner 23 has received an advertise signal 200 (YES in S01), the information processor 21b determines whether or not the attachment 30 in the demounted state that has transmitted the advertise signal 200 is at a mountable/demountable location at which the attachment 30 can be hooked by the hitch 9 (i.e., at a position very close to the hitch 9) (S02).

If the information processor 21b determines that the attachment 30 is at a mountable/demountable location (or the attachment 30 is closest to the hitch 9) (YES in S02), the information processor 21b determines whether or not the attachment 30 is hooked (hitched) on the hitch 9 (S03).

After determining that the attachment 30 is in the hitched state (YES in S03), upon the operation to attach the attachment 30 to the working vehicle 1 (upon the start of the operation) (YES in S06), the information processor 21b determines whether or not the attachment 30 is in the mounted state in which the attachment 30 is considered mounted to the working vehicle 1 (S07).

If the information processor 21b determines that the attachment 30 is mounted to the working vehicle 1 (YES in S07), the information processor 21b prepares a mount notification 226a, and prepares mounted attachment information 220Aa including the mount notification 226a and the attachment ID 224 of the attachment 30 determined as being in the mounted state (mounted attachment 30a) (S08).

Upon preparing the mounted attachment information 220Aa, the information processor 21b causes the communicator 24 to transmit the mounted attachment information 220Aa to the server 110 (S09). Note that, in this regard, FIG. 3 shows that the information processor 21b causes the communicator 24 to transmit the mounted attachment information 220Aa at time Ta1.

FIG. 10 shows determining steps S02a, S03a, S06a, and S07a which are specific examples of determining steps S02, S03, S06, and S07 in FIG. 9. The following discusses such steps.

Step S02a in FIG. 10 shows that the information processor 21b determines whether or not the attachment 30 is at a mountable/demountable location based on the RSSI of the received advertise signal 200. Specifically, a threshold X is predetermined with regard to RSSI, and, if the RSSI of the advertise signal 200 is greater than the threshold X (YES in S02a), the information processor 21b determines that the attachment 30 that has transmitted the advertise signal 200 is at a mountable/demountable location (YES in S02 in FIG. 9).

Note that, if the beacon scanner 23 has received a plurality of advertise signals 200 having an RSSI greater than the threshold X, the information processor 21*b* may determine that the attachment 30 which has transmitted the advertise signal 200 having the highest RSSI is closest to the hitch 9 (located at a mountable/demountable location).

Step S03*a* in FIG. 10 shows that the information processor 21*b* determines whether or not the attachment 30 is hooked on the hitch 9 (whether or not the attachment 30 is in the hitched state) based on vibration information 205 included in the received advertise signal 200.

Specifically, once the information processor 21*b* has recognized an attachment 30 at a mountable/demountable location (or located closest to the hitch 9) (YES in S02*a*), the information processor 21*b* reads a vibration indicator 205*b* as vibration information 205 included in the advertise signal 200 from the attachment 30, and, if the vibration indicator 205*b* is greater than a threshold Y (YES in S03*a*), determines that the attachment 30 is hooked on (hitched to) the hitch 9 (YES in S03 in FIG. 9).

Note that FIG. 10 shows an example in which the vibration indicator 205*b* which is an example of the vibration information 205 is used to determine whether or not the attachment 30 is in the hitched state. Note, however, that another method of determining whether or not the attachment 30 is in the hitched state based on the vibration information 205 would be to determine whether vibrating/not-vibrating information 205*a* as the vibration information 205 is vibrating information 205*a*1 or not-vibrating information 205*a*2 and, if determining that the vibrating/not-vibrating information 205*a* is vibrating information 205*a*1, determine that the attachment 30 is in the hitched state.

The determination based on the vibrating/not-vibrating information 205*a* may be performed instead of or in addition to the determination based on the vibration indicator 205*b*.

Note that the attachment ID 203 (or the modified attachment ID 203*a*) of the attachment 30 determined to be in the hitched state may be stored in the memory 21*a*, and, upon determination by the information processor 21*b* that the attachment 30 is in the mounted state (described later), the information processor 21*b* may prepare a mount notification 226*a* associated with the attachment ID 203 (203*a*) stored in the memory 21*a* and include the attachment ID 203 (203*a*) and the mount notification 226*a* into the attachment information 220A.

Step S06*a* in FIG. 10 shows that, assuming that turning ON of the mounting switch 27*a* is the operation to mount the attachment 30 to the hitch 9 (to the working vehicle 1), the information processor 21*b* determines whether or not the mounting switch 27*a* is being turned ON (being pressed). When the mounting switch 27*a* is turned ON, an electrical signal indicating such is inputted into the controller 21. Therefore, the information processor 21*b* recognizes that the mounting operation is performed (has been started) by receiving the electrical signal.

Step S07*a* in FIG. 10 shows that the information processor 21*b* determines whether or not the attachment 30, which is being subjected to the mounting operation, is in the mounted state in which the attachment 30 is considered mounted to the hitch 9 (to the working vehicle 1) based on the time which has passed since the start of turning ON the mounting switch 27*a* (which is a momentary switch).

Assume here that the latch cylinder 14 is configured to bring the latching mechanisms 51 into the unlatching state as it retracts and bring the latching mechanisms 51 into the latching state as it extends, as described earlier. The time for which the mounting switch 27*a* needs to be pressed to cause the latch cylinder 14 to extend from the retracted state to the extended state is T1, and there is a reaction time lag T1*a* by which the reaction of the latch cylinder 14 lags behind the operation of the mounting switch 27*a*.

Under such circumstances, for example, the information processor 21*b* counts the time for which the electrical signal indicating that the mounting switch 27*a* is ON is being inputted, from when the mounting switch 27*a* started to be turned ON (if the input of the electrical signal is interrupted, counts the total time for which the electrical signal is being inputted).

Upon determining that the time for which the mounting switch 27*a* is ON is greater than Ti and the time more than the reaction time lag T1*a* has passed (YES in S07*a*), the information processor 21*b* determines that the latching mechanisms 51 of the hitch 9 on which the attachment 30 is hooked have been brought into the completely latching state, i.e., determines that the attachment 30 is in the mounted state in which the attachment 30 is considered mounted to the working vehicle 1 (YES in S07 in FIG. 9). The information processor 21*b* prepares a mount notification 226*a*, and prepares mounted attachment information 220Aa including the mount notification 226*a* and the attachment ID 224 of the attachment 30 (mounted attachment 30*a*) having been determined as being in the mounted state (S08 in FIGS. 9 and 10).

Note that, since, for example, the reaction of the latch cylinder 14 which is a hydraulic cylinder is susceptible to air temperature, atmospheric pressure, and the like, the reaction time lag T1*a* of the latch cylinder 14 and the like may be adjustable according to changes in such conditions.

Note that, as shown in FIG. 10, counting the time from when the mounting switch 27*a* started to be turned ON is an example of a method of determining whether or not the attachment 30 is in the mounted state in which the attachment 30 is considered mounted to the working vehicle 1. Assuming that the hitch 9 is structured as described earlier, another example would be to determine whether or not the attachment 30 is in the mounted state based on whether or not the latch cylinder 14 is in the extended state. Another example would be to provide the hitch 9 with a sensor to detect whether or not the latch levers 57 are in the position to bring the latching mechanisms 51 into the latching state and determine whether or not the attachment 30 is in the mounted state based on the result of detection by the sensor.

That is, FIG. 10 only shows some of specific examples of the determining steps in the basic flowchart in FIG. 9, and the determining steps in FIG. 9 may be modified in various manners.

Note that, in FIGS. 9 and 10, if it is determined that the beacon scanner 23 has not received any advertise signals 200 (NO in S01), the selection prompter 21*c* of the controller 21 causes the user interface 26 as a display (output interface) to display an attachment list 210 (e.g., icon(s) based on piece(s) of image data 212 of respective attachment(s) 30 included in the attachment list 210) as illustrated in FIG. 5, and causes the user interface 26 as a selector (input interface) to display a prompt asking the user (operator) to select one of the attachment(s) 30 from the attachment list 210 (S04).

Note that, in the present preferred embodiment, the selection prompter 21*c* is the portion of the controller 21 that defines the ECU, electronic circuit, and/or the like and that is programmed to, when it is determined that the beacon scanner 23 has not received any advertise signals 200, cause the user interface 26 to display the prompt. Note, however, that the combination of such an ECU and/or the like and the user interface 26 to display the prompt may be used as the selection prompter to ask for the user to make the selection. Alternatively, the prompt for the selection may be provided via sound. In such a case, the selection prompter may be the combination of the ECU and/or the like and an audio output device (such as a speaker) to output such sound.

Assume that, based on the prompt via such a display (or sound or the like), the operator selects, for example, one of the attachment(s) 30 by, for example, pressing one of the icon(s) of the attachment(s) 30 displayed on the screen of the user interface 26 (S05). With this, for example, the attachment ID 211 of the selected attachment 30 is stored in the memory 21a, and, in a subsequent step, upon determining that the attachment 30 is in the mounted state (YES in S07), the information processor 21b prepares a mount notification 226a and prepares attachment information 220A (mounted attachment information 220Aa) including the mount notification 226a and an attachment ID 224 which is the attachment ID 211 stored in the memory 21a.

Referring to FIG. 3, once the communicator 24 has transmitted the mounted attachment information 220Aa (at time Ta1), the communicator 24 continues to transmit in-action/not-in-action attachment information 220Aw periodically (i.e., at predetermined interval(s) Pa) (at times Ta2 to Ta5) until the communicator 24 transmits demounted attachment information 220Ad about the corresponding attachment 30 (at time Ta6).

Note that the status information 225 of the mounted attachment information 220Aa may include in-action/not-in-action information 227 (in-action information 227a or not-in-action information 227b) in addition to or instead of the mount notification 226a. The status information 225 of the in-action/not-in-action attachment information 220Aw may include a mount notification 226a in addition to or instead of the in-action/not-in-action information 227 (in-action information 227a or not-in-action information 227b).

In such a case, there is no longer any difference between the mounted attachment information 220Aa and the in-action/not-in-action attachment information 220Aw in terms of the content of the status information 225. Therefore, one of the periodically transmitted pieces of in-action/not-in-action attachment information 220Aw that was transmitted first may be used as mounted attachment information 220Aa (i.e., the attachment information 220A that was transmitted upon determination that the attachment 30 is in the mounted state in response to the mounting operation (turning ON the mounting switch 27a)).

Figure 11:
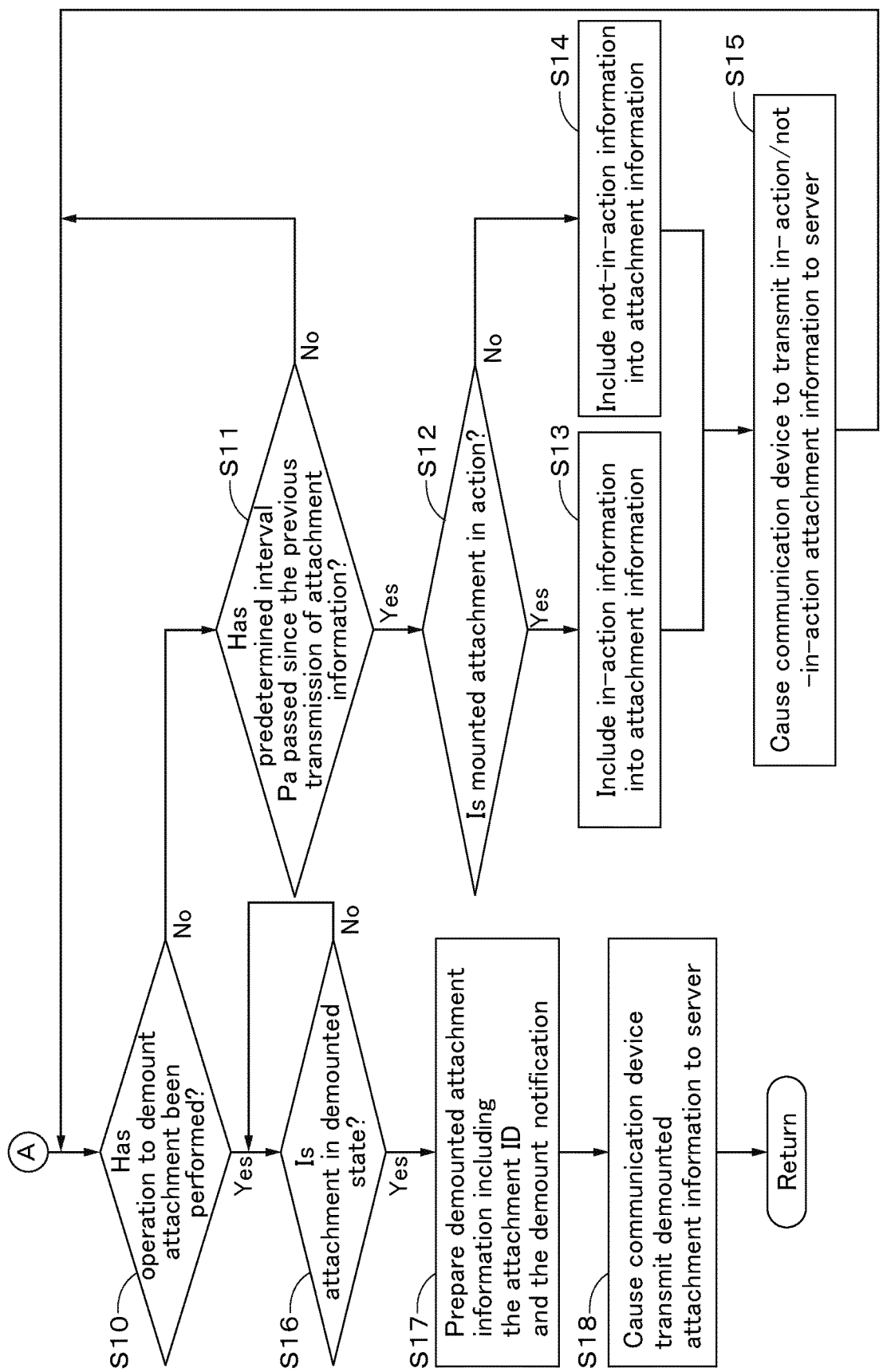
FIG. 11 is a basic flowchart showing a process performed by the working vehicle and/or the like to transmit, to the server, demounted attachment information and/or in-action/not-in-action attachment information after the transmission of mounted attachment information in FIG. 9.
Figure 12:
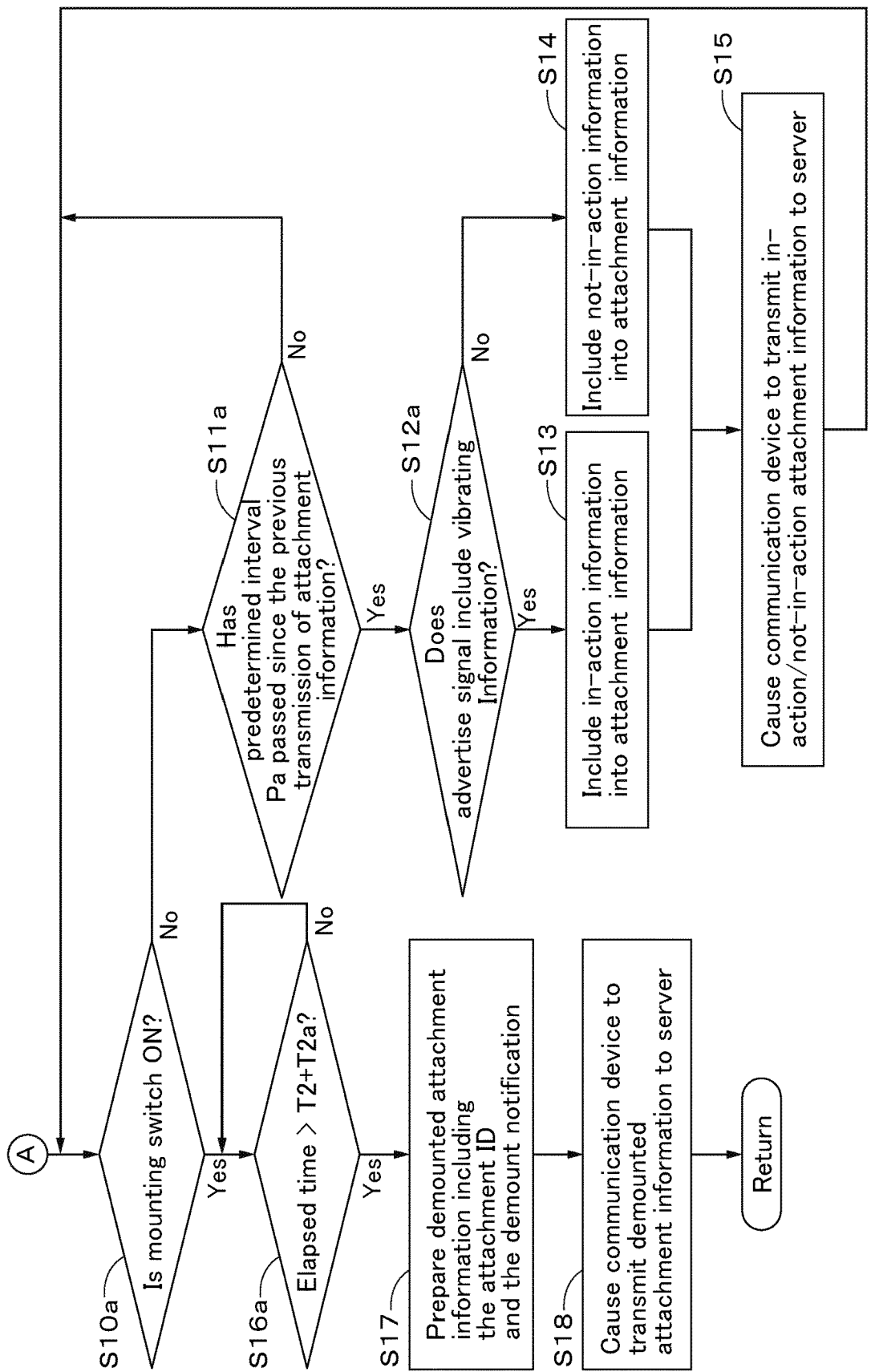
FIG. 12 is a flowchart showing an applied example of the basic flowchart in FIG. 11.

The following description discusses, with reference to the flowcharts in FIGS. 11 and 12, determining steps performed to transmit in-action/not-in-action attachment information 220Aw after the mounted attachment information 220Aa is transmitted.

FIG. 11 is a basic flowchart showing a process performed at the working vehicle 1 to transmit in-action/not-in-action attachment information and demounted attachment information. FIG. 12 is a flowchart showing an applied example of the basic flowchart in FIG. 11.

Note that FIG. 11 is a flowchart continuing from the flowchart of FIG. 9, and FIG. 12 is a flowchart continuing from the flowchart of FIG. 10.

Referring to FIG. 11, after the information processor 21b causes the communicator 24 to transmit the mounted attachment information 220Aa to the server 110 (S09 in FIG. 9), the information processor 21b determines whether or not the attachment 30 in the mounted state (i.e., mounted attachment 30a) is in action to perform work at predetermined interval(s) Pa (every time a predetermined interval Pa has passed since the previous transmission of attachment information 220A) (YES in S11), as long as the operation to demount the attachment 30 from the working vehicle 1 (from the hitch 9) is not performed (NO in S10) (S12).

If the information processor 21b determines that the mounted attachment 30a is in action (YES in S12), the information processor 21b prepares in-action information 227a and includes the in-action information 227a into the attachment information 220A to obtain in-action attachment information 220Awa (S13). If the information processor 21b determines that the mounted attachment 30a is not in action (NO in S12), the information processor 21b prepares not-in-action information 227b (the state in which the in-action information 227a is not prepared may be regarded as the state in which the not-in-action information 227b is prepared), and includes the not-in-action information 227b into the attachment information 220A to obtain not-in-action attachment information 220Awb (S14). The information processor 21b causes the communicator 24 to transmit the in-action/not-in-action attachment information 220Aw (the in-action attachment information 220Awa or the not-in-action attachment information 220Awb) (S15).

Note that, the attachment ID 224 may be included in the basic information 221 in the following manner. The attachment ID 224 included in the mounted attachment information 220Aa may be stored in, for example, the storage 22 once the communicator 24 has transmitted the mounted attachment information 220Aa and, when the communicator 24 is about to transmit the in-action/not-in-action attachment information 220Aw, the stored attachment ID 224 may be included into the basic information 221 of the in-action/not-in-action attachment information 220Aw.

In such a manner, the communicator 24 transmits, to the server 110, the in-action/not-in-action attachment information 220Aw including either the in-action information 227a or the not-in-action information 227b (S15). The transmission of the information is performed immediately upon preparation of the in-action information 227a or the not-in-action information 227b by the information processor 21b (i.e., upon preparation of the in-action attachment information 220Awa or the not-in-action attachment information 220Awb). Therefore, as shown in FIG. 3, after the transmission of the mounted attachment information 220Aa, the in-action/not-in-action attachment information 220Aw will be transmitted at predetermined intervals Pa (at times Ta2 to Ta5).

It is noted here that step S12a in FIG. 12 indicates that whether or not the mounted attachment 30a is in action is determined based on the determination of whether or not the advertise signal 200 transmitted from the beacon transmitter 33 of the mounted attachment 30a includes vibrating information 205a1.

The state in which the advertise signal 200 includes vibrating information 205a1 as the vibrating/not-vibrating information 205a refers to the state in which the mounted attachment 30a is vibrating with a magnitude and/or pattern that is/are sufficient to determine that the vibration of the working vehicle 1 resulting from, for example, the driving of the prime mover 10 by the working vehicle 1, travel of the working vehicle 1, and/or the extension/retraction of the arm cylinders 12 and/or the hitch cylinders 13 is transmitted to the mounted attachment 30a, in terms of amplitude, frequency, duration and/or the like of the vibration, as described earlier.

If the information processor 21b determines that the advertise signal 200 includes the vibrating information 205a1 (YES in S12a), the information processor 21b determines that the mounted attachment 30a is in action (YES in S12 in FIG. 11), prepares in-action information 227a, and includes the in-action information 227a into the attachment information 220A (S13). That is, the information processor 21b prepares in-action attachment information 220Awa.

If the information processor 21b determines that the advertise signal 200 does not include the vibrating information 205a1 (NO in S12a), the information processor 21b regards the vibrating/not-vibrating information 205a in the advertise signal 200 as being the not-vibrating information 205a2, prepares not-in-action information 227b (the state in which the in-action information 227a is not prepared may be regarded as the state in which the not-in-action information 227b is prepared), and includes the not-in-action information 227b into the attachment information 220A (S14). That is, the information processor 21b prepares not-in-action attachment information 220Awb.

Note that another example of a method by which the information processor 21b determines whether or not the mounted attachment 30a is in action based on the vibration information 205 included in the advertise signal 200 would be that, similarly to step S03a in FIG. 10, the information processor 21b determines whether or not the vibration indicator 205b included in the vibration information 205 is greater than a threshold (which may differ from the threshold Y for determination of whether or not an attachment is in the hitched state).

In the case where the mounted attachment 30a is an AUX attachment 30X, with regard to the determination of whether the AUX attachment 30X is in action or not in action based on the vibration information 205, a determination criterion may be defined in consideration of the manner in which vibration occurs when the AUX actuator 36 of the AUX attachment 30X is driven.

Additionally or alternatively, in the case where the mounted attachment 30a is an AUX attachment 30X, whether or not the mounted attachment 30a is in action may be determined by determining whether or not the AUX mode switch 28 or the AUX drive switch 29 is ON to drive the AUX actuator 36.

Thus, whether or not the mounted attachment 30a is in action can be determined by various methods, and such a method is not limited to that shown in step S12a in FIG. 12.

Referring to FIG. 11, if the information processor 21b determines that the operation to demount the mounted attachment 30a from the working vehicle 1 (from the hitch 9) is performed (the demounting operation has been started) (YES in S10), the information processor 21b determines whether or not the attachment 30 is in the demounted state in which the attachment 30 is considered demounted from the working vehicle 1 (from the hitch 9) (S16).

If the information processor 21b determines that the attachment 30 is in the demounted state (the attachment 30 has turned from the mounted attachment 30a to the demounted attachment 30b) (YES in S16), the information processor 21b prepares a demount notification 226b, and prepares demounted attachment information 220Ad including the demount notification 226b and the attachment ID 224 of the attachment 30 (demounted attachment 30b) determined as being in the demounted state (S17).

Immediately upon preparation of the demounted attachment information 220Ad, the information processor 21b causes the communicator 24 to transmit, to the server 110, demounted attachment information 220Ad including the demount notification 226b as status information 225 (S18). Note that the attachment ID 224 included in the demounted attachment information 220Ad may be the attachment ID 224 stored in, for example, the storage 22, as described earlier.

It is noted here that step S12a in FIG. 12 indicates that whether or not the mounted attachment 30a is in action is determined based on the determination of whether or not the advertise signal 200 transmitted from the beacon transmitter 33 on the mounted attachment 30a includes vibrating information 205a1.

Referring to FIG. 3, the demounted attachment information 220Ad is transmitted from the communicator 24 (at time Ta6) independently of the predetermined intervals Pa of transmission of in-action/not-in-action attachment information 220Aw. Upon the transmission of the demounted attachment information 220Ad, the periodic transmission of the in-action/not-in-action attachment information 220Aw which has been performed while the attachment 30 was the mounted attachment 30a ends.

After the information processor 21b causes the communicator 24 to transmit the demounted attachment information 220Ad, if the information processor 21b determines that one or more advertise signals 200 have been received from one or more nearby attachments 30 ("RETURN" in FIG. 11, S01 in FIG. 9) and determines that any of the attachment(s) 30 has been mounted to the working vehicle 1, then the information processor 21b again causes the communicator 24 to transmit mounted attachment information 220Aa about that attachment 30 to the server 110.

Note that the information processor 21b may cause the communicator 24 to transmit, to the server 110, one or more pieces of information based on one or more advertise signals 200 from one or more attachments 30 received at the beacon scanner 23 (e.g., one or more attachment IDs 203 included in the respective one or more advertise signals 200), for example, periodically, during a period from when the demounted attachment information 220Ad is transmitted to when the next mounted attachment information 220Aa is transmitted.

That is, the information processor 21b may transmit, to the server 110 during a period during which the working vehicle 1 is not provided with any attachment 30, attachment information 200A relating to the attachment ID 203 etc. acquired based on advertise signal(s) 200 received from one or more demounted attachments 30b in the vicinity of the working vehicle 1. Alternatively, the information processor 21b may transmit, to the server 110 during that period, vehicle information 220V including no attachment ID 224 (periodic vehicle information Vp) (see FIG. 16 etc., described later).

Note that the operation to demount the attachment 30 in step S10 in FIG. 11 is, in the case of the working vehicle 1 structured as illustrated in FIG. 1, turning ON (pressing) the demounting switch 27b as shown in step S10a in FIG. 12. Step S16a in FIG. 12 indicates that, as a specific example of a method by which the information processor 21b determines whether or not the attachment 30 is in the demounted state as shown in step S16 in FIG. 11, a method of performing the determination based on the time that has passed since the start of turning ON the demounting switch 27b (which is a momentary switch).

It is noted here that, as described earlier, the latch cylinder 14 is configured to place the latching mechanisms 51 in the unlatching state when in the retracted state and to place the latching mechanisms 51 in the latching state when in the extended state. Assume that the time for which the demounting switch 27b needs to be pressed to cause the latch cylinder 14 to retract from the extended state to the retracted state is T2, and there is a reaction time lag T2a by which the reaction of the latch cylinder 14 lags behind the operation of the demounting switch 27b.

Under such circumstances, for example, the information processor 21b counts the time for which the electrical signal indicating that the demounting switch 27b is ON is being inputted, from when the demounting switch 27b started to be turned ON (if the input of the electrical signal is interrupted, the total time for which the electrical signal is being inputted).

Upon determining that the time for which the demounting switch 27b is turned ON is greater than T2 and the time more than the reaction time lag T2a has passed (YES in S16a), the information processor 21b determines that the attachment 30 is in the demounted state (YES in S16 in FIG. 11), prepares a demount notification 226b, and prepares demounted attachment information 220Ad (S17 in FIGS. 11 and 12).

Note that, since, for example, the reaction of the latch cylinder 14 which is a hydraulic cylinder is susceptible to air temperature, atmospheric pressure, and the like, the reaction time lag T2a of the latch cylinder 14 and the like may be adjustable according to changes in such conditions.

Note that it takes some more time for the hitched attachment 30 to come off the hitch 9 and be completely demounted (released) from the hitch 9 after the hitch 9 is placed in the unlatching state. That is, the fact that the hitch 9 has been brought into the unlatching state does not actually mean that the attachment 30 has been demounted from the working vehicle 1 (from the hitch 9).

However, once the hitch 9 has been placed in the unlatching state, the attachment 30 is necessarily released from the hitch 9 without moving much from the location at which the attachment 30 was hooked on the hitch 9 when the hitch 9 was brought into the unlatching state. Therefore, in the case where the demounted attachment information 220Ad, as the whereabouts information of the demounted attachment 30b to be included in telematics information, is provided to the server 110 (described later), the information processor 21b may determine that the attachment 30 is in the state in which the attachment 30 is considered demounted from the hitch 9 (i.e., in the demounted state) upon determining that the hitch 9 is in the unlatching state, and the communicator 24 may transmit the demounted attachment information 220Ad to the server 110.

That is, the point in time at which the time T2+T2a set as described earlier has passed since the start of turning ON the demounting switch 27b (YES in S12a) is, in a precise sense, the point in time at which the hitch 9 with the attachment 30 hooked thereon has been brought into the completely unlatching state. Note, however, that in the present preferred embodiment, once the hitch 9 has been brought into the unlatching state (i.e., at the point in time at which it is determined that the time more than the time T2+T2a has passed), the information processor 21b determines that the attachment 30 is in the demounted state in which the attachment 30 is considered demounted from the working vehicle 1 (from the hitch 9) and prepares a demount notification 226b (i.e., prepares demounted attachment information 220Ad).

Note that, for example, the duration of the reaction time lag T2a may be set to include the period of time from when the latching mechanisms 51 are brought into the unlatching state to when the attachment 30 completely comes off the hitch 9 so that the point in time at which the information processor 21b determines that the attachment 30 is in the demounted state approaches the point in time at which the attachment 30 is actually demounted from the hitch 9 completely.

Note that counting the time that has passed since the start of turning ON the demounting switch 27b as shown in FIG. 12 is an example of a method of determining whether or not the attachment 30 is in the demounted state.

Assuming that the hitch 9 is structured as described earlier, another example would be to determine whether or not the attachment 30 is in the demounted state based on whether or not the latch cylinder 14 is in the retracted state. Another example would be to provide the hitch 9 with a sensor to detect whether or not the latch levers 57 are in positions to place the latching mechanisms 51 in the unlatching state, and determine whether or not the attachment 30 is in the demounted state based on the result of detection by the sensor.

That is, FIG. 12 only shows some of specific examples of the determining steps in the basic flowchart in FIG. 11, and the determining steps in FIG. 11 may be modified in various manners.

Figure 13:
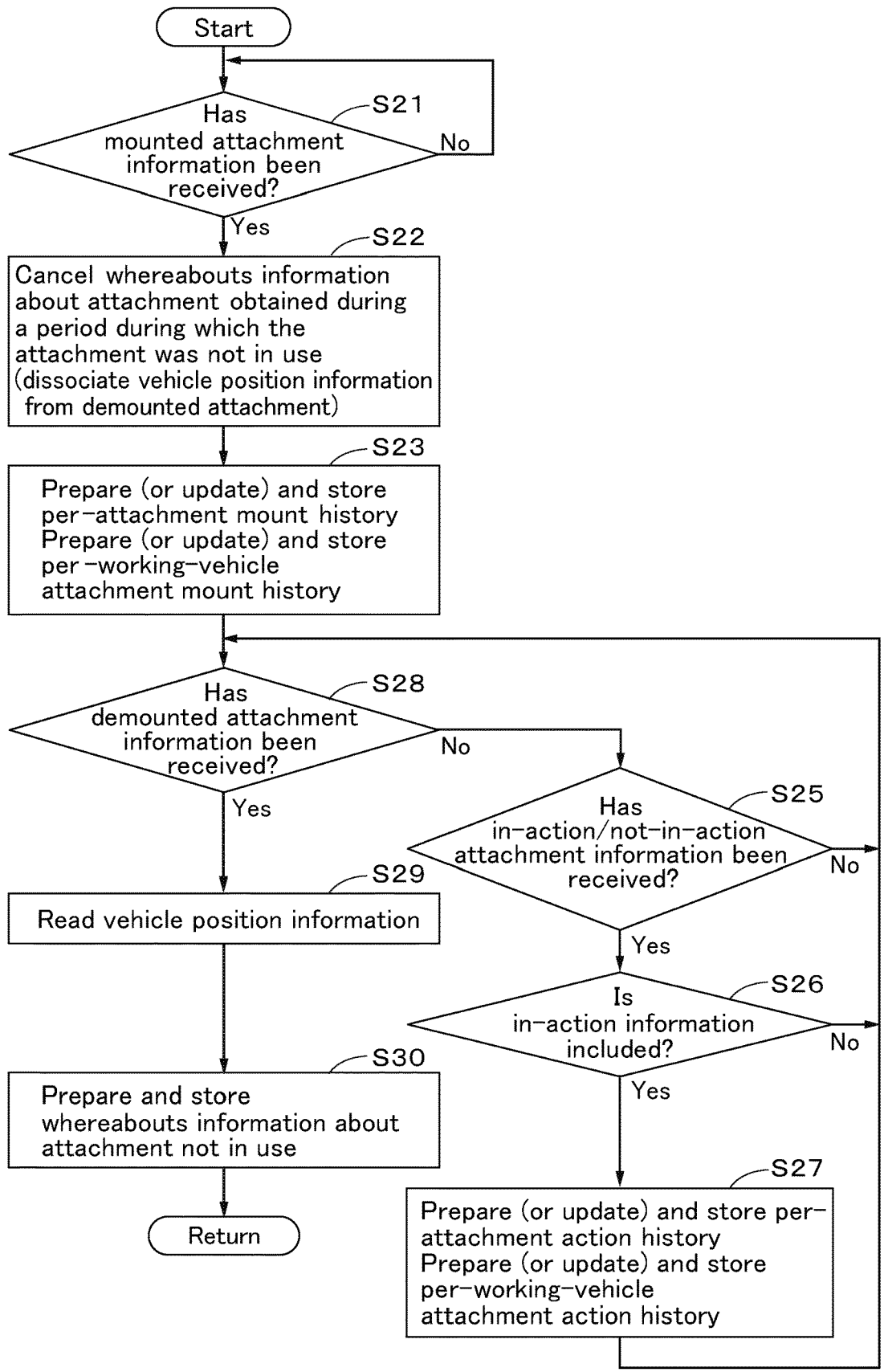
FIG. 13 is a flowchart showing a process relating to preparing (updating) and storing telematics information performed by the server.

The following description discusses, with reference to FIGS. 3 and 13, the manner in which the server 110 prepares telematics information 300 based on the attachment information 220A from the communicator 24 of the working vehicle 1 and the like and stores the telematics information 300. FIG. 13 is a flowchart showing a process performed by the server 110 to prepare and store telematics information.

Referring to FIG. 3, the server 110 receives, from the communicator 24 of the working vehicle 1, attachment information 220A (examples of the attachment information 220A include mounted attachment information 220Aa, in-action/not-in-action attachment information 220Aw, and demounted attachment information 220Ad) and vehicle position information 230 which is information relating to the current position of the working vehicle 1 determined by the position detector 25 of the working vehicle 1.

Note that, in the present preferred embodiment, as is apparent from FIG. 3 etc., the attachment information 220A includes the vehicle position information 230. Therefore, the server 110 acquires the vehicle position information 230 by receiving the attachment information 220A. Alternatively, the server 110 may acquire the vehicle position information 230 by receiving vehicle information 220V including the vehicle position information 230, like a server 110 in another preferred embodiment which will be described later with reference to FIGS. 18 and 19 etc.

Upon receipt of the mounted attachment information 220Aa about an attachment 30 (YES in S21), the server 110 cancels the whereabouts information about the attachment 30 obtained during a period during which the attachment 30 was a demounted attachment 30b (the attachment 30 was not in use) before being mounted to the working vehicle 1 (S22).

Next, the server 110, based on the received mounted attachment information 220Aa, prepares or updates, and stores, a mount history (mount history 311 (described later, see FIG. 20) or mount history 321 (see FIG. 21)) in the telematics information 300 about the attachment 30 (per-attachment telematics information 300A in FIG. 20 or per-working-vehicle telematics information 300B in FIG. 21).

After receiving the mounted attachment information 220Aa and preparing (updating, storing) the mount history 311 or 321 (S23), upon receipt of each in-action/not-in-action attachment information 220Aw (YES in S25), the server 110 determines whether or not the received in-action/not-in-action attachment information 220Aw includes in-action information 227a (S26), i.e., whether or not the in-action/not-in-action attachment information 220Aw is in-action attachment information 220Awa, as long as the server 110 does not receive demounted attachment information 220Ad (NO in S28). If the in-action/not-in-action attachment information 220Aw includes in-action information 227a (if the in-action/not-in-action attachment information 220Aw is in-action attachment information 220Awa) (YES in F26), the server 110 prepares (or updates) and stores an action history (action history 312 (described later, see FIG. 20) or action history 322 (see FIG. 21)) based on the in-action attachment information 220Awa (S27).

Upon receipt of the demounted attachment information 220Ad (YES in S28), the server 110 reads the vehicle position information 230 from the demounted attachment information 220Ad (S29), and prepares and stores whereabouts information of the attachment 30 not in use (demounted attachment 30b) (demounted attachment whereabouts information 313 (described later, see FIG. 20) or 323 (see FIG. 21)) (S30). After that, upon receipt of mounted attachment information 220Aa including the attachment ID 224 of this attachment 30 ("RETURN", YES in S21), the server 110 cancels the whereabouts information of the attachment 30 not in use (demounted attachment 30b) (demounted attachment whereabouts information 313 or 323) (S22), whereas the server 110 prepares (and stores) another mount history (mount history 311 or 321) (S23).

As described above, the server 110 processes the attachment information 220A received from the communicator 24 of the working vehicle 1 to prepare telematics information 300, and manages the telematics information 300 by, for example, storing it. The server 110 provides (transmits) the telematics information 300 to the SU terminal device 80 or the SP terminal device 90 etc. in response to, for example, a request from the SU terminal device 80 or the SP terminal device 90 etc. The SU terminal device 80 or the SP terminal device 90, as a display to display the telematics information 300, is capable of displaying the telematics information 300 provided from the server 110 (per-attachment telematics information 300A (see FIG. 20), per-work-vehicle telematics information 300B (see FIG. 21)).

Note that, as described earlier, the SU terminal device 80 also has the function of receiving advertise signal(s) 200 from attachment(s) 30. If the SU terminal device 80 further has the function of, when the mounting switch 27a or the demounting switch 27b is turned ON at the working vehicle 1, recognizing such based on an electrical signal (wireless signal) from the communicator 24 of the working vehicle 1, the SU terminal device 80 (the CPU 81 of the SU terminal device 80) is also capable of preparing mounted attachment information 220Aa, demounted attachment information 220Ad, or in-action/not-in-action attachment information 220Aw and transmitting it to the server 110. Note that the SU terminal device 80 may have the function as an operating device to mount and demount the attachment 30 to and from the working vehicle 1 (hitch 9), similarly to the mounting switch 27a and the demounting switch 27b of the working vehicle 1.

The SU terminal device 80 also has the function of storing and displaying the attachment list 210. When the SU terminal device 80 does not receive any advertise signals 200 from attachments 30, the SU terminal device 80 functions as a selector (input interface) for the operator to select an attachment 30 from the attachment list 210. The SU terminal device 80 also has the function of a selection prompter to prompt the operator to select an attachment 30 from the attachment list 210 (for example, display a notice to prompt the operator to select an attachment 30 from the attachment list 210).

Figure 16:
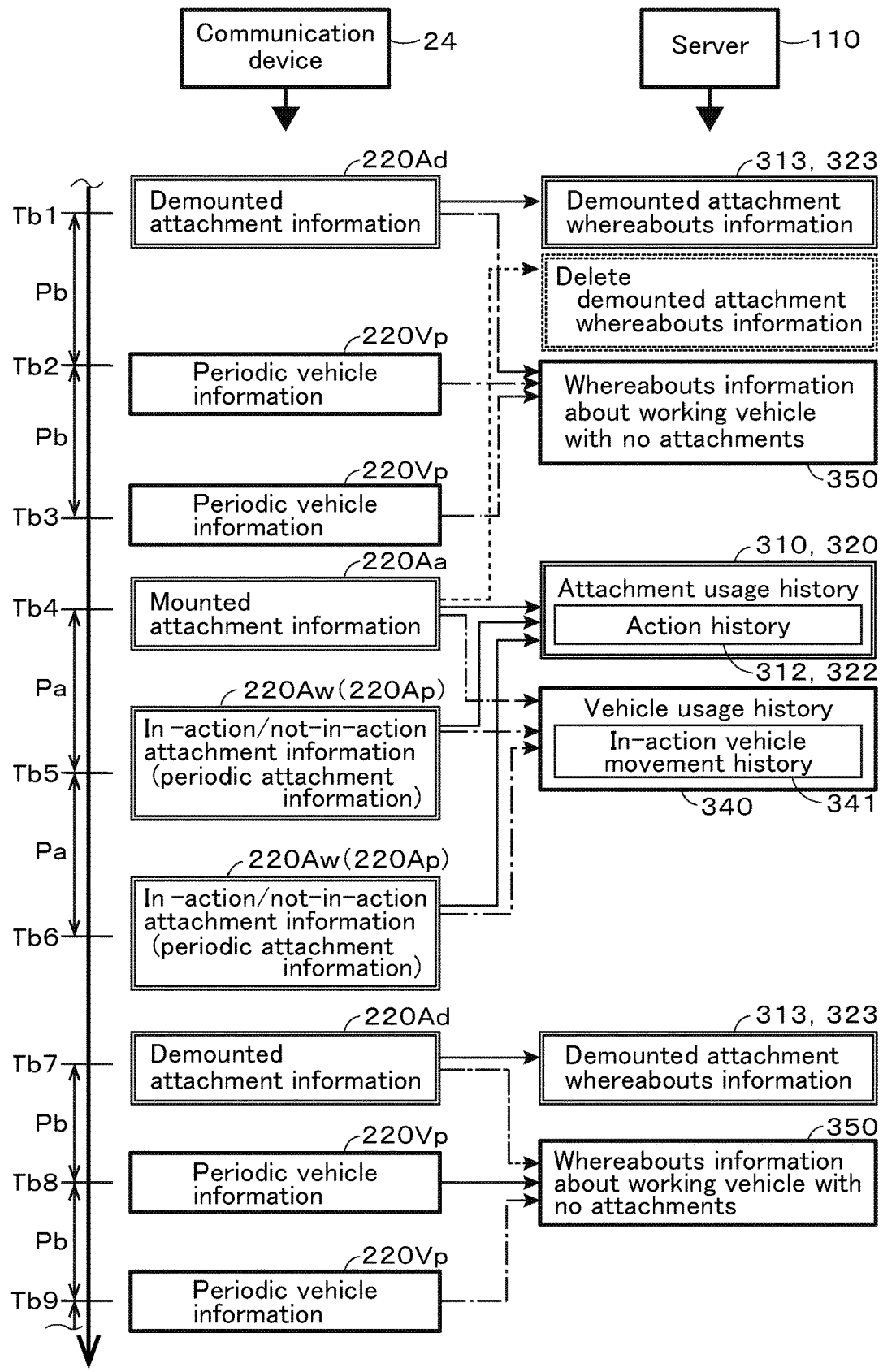
FIG. 16 schematically illustrates the manner in which information is communicated between a communicator of the working vehicle and the server over time, including transmission of attachment information as shown in FIG. 3, in the telematics service system according to the first preferred embodiment of the present invention.

The following description discusses a preferred embodiment as illustrated in FIG. 16. FIG. 16 schematically illustrates the manner in which information is communicated between the communicator 24 of the working vehicle 1 and the server 110 over time, including transmission of attachment information 220A as shown in FIG. 3 during a period during which the working vehicle is provided with an attachment and transmission of vehicle information 220V during a period during which the working vehicle is not provided with any attachment.

As illustrated in FIG. 16, the information processor 21b of the controller 21 causes the communicator 24 to transmit, periodically (at predetermined intervals Pb (at times Tb2, Tb3, Tb8, and Tb9)) to the server 110, vehicle information 220V including vehicle position information 230 during a period during which the working vehicle 1 is not provided with any attachment 30 (during which the attachment 30 is not mounted to the working vehicle 1) from when the demounted attachment information 220Ad is transmitted to when the mounted attachment information 220Aa is transmitted. In the following description, periodically transmitted vehicle information 220V may be referred to as "periodic vehicle information 220Vp".

The server 110 manages, as whereabouts information 350 of the working vehicle 1 provided with no attachments 30 (from which the attachment 30 has been demounted), the demounted attachment information 220Ad and the vehicle position information 230 included in the periodic vehicle information 220Vp received during the above period. On the other hand, the server 110 stores, for the above period, the attachment ID 224 included in the demounted attachment information 220Ad received at time Tb1 or Tb7 (start of the period) and the whereabouts information 313, 323 of the demounted attachment 30b based on the vehicle position information 230.

As illustrated in FIGS. 3 and 16, the information processor 21b of the controller 21, immediately upon determining that the working vehicle 1 which was not provided with any attachments 30 is now provided with an attachment 30 (at time Tb4), causes the communicator 24 to transmit the mounted attachment information 220Aa to the server 110, i.e. not periodically independently of the predetermined intervals Pb at which the periodic vehicle information 220Vp is transmitted. Next, during a period during which the working vehicle 1 is provided with the attachment 30 (while the attachment 30 is mounted) from when the mounted attachment information 220Aa is transmitted to when the demounted attachment information 220Ad is transmitted, the information processor 21b causes the communicator 24 to transmit, to the server 110 periodically (at predetermined intervals Pa (at times Tb5, Tb6)), the attachment information 220A including vehicle position information 230, i.e., the in-action/not-in-action attachment information 220Aw.

Note that the attachment information 220A which is periodically transmitted from the communicator 24 to the server 110 during a period during which the working vehicle 1 is provided with the attachment 30 (while the attachment 30 is mounted) does not need to include in-action/not-in-action information 227 (i.e., does not need to be in-action/not-in-action attachment information 220Aw). In the following description, periodically transmitted attachment information 220A may be referred to as the "periodic attachment information 220Ap" regardless of whether the in-action/not-in-action information 227 is included or not.

First, upon receipt of the mounted attachment information 220Aa transmitted at time Tb4 which is the start of the period, the server 110 checks the attachment ID 224 included in the mounted attachment information 220Aa against attachment ID(s) indicated by the stored demounted attachment whereabouts information 313, 323. If the server 110 determines that there is a match between attachment IDs, the server 110 deletes the stored demounted attachment whereabouts information 313, 323. Alternatively, the server 110 dissociates the attachment ID 224 from the vehicle position information 230 as the demounted attachment whereabouts information 313, 323.

Next, the server 110 manages the mounted attachment information 220Aa and the vehicle position information 230 included in periodic attachment information 220Ap (examples of which include in-action/not-in-action attachment information 220Aw) received during the period, as the whereabouts information of the working vehicle 1 provided with the attachment 30 (the working vehicle 1 with the attachment 30 mounted thereto) and as the whereabouts information of the attachment 30 mounted to the working vehicle 1 (mounted attachment 30a).

That is, the server 110, based on the vehicle ID 223 and the vehicle position information 230 etc. included in the mounted attachment information 220Aa and the periodic attachment information 220Ap (in-action/not-in-action attachment information 220Aw), manages a vehicle usage history 340 including in-action vehicle movement history (histories) 341 which indicates the record of movement of the working vehicle 1 in the action state, i.e., manages the telematics information 300 including the vehicle usage history 340.

Furthermore, the server 110, based on the attachment ID 224 and the vehicle position information 230 etc. included in the attachment information 220A, manages an attachment usage history (per-attachment attachment usage history 310 and/or per-vehicle attachment usage history 320, described later) including an action history of the mounted attachment 30a (per-attachment action history 312 and/or per-vehicle action history 322, described later), i.e., manages the telematics information 300 including the attachment usage history.

The information processor 21b of the controller 21, upon determining that the mounted attachment 30a has entered the demounted state as described earlier, prepares a demount notification 226b, and causes the communicator 24 to transmit the demounted attachment information 220Ad to the server 110 (at times Tb1, Tb7) independently of the predetermined intervals Pa at which the periodic attachment information 220Ap (in-action/not-in-action attachment information 220Aw) is transmitted.

After that, during a period during which the working vehicle 1 is provided with no attachments 30, the information processor 21b transmits the periodic vehicle information 220Vp as described earlier. Furthermore, during the period, the server 110 manages the telematics information 300 including the whereabouts information 313, 323 about the demounted attachment 30b as described earlier, and updates the vehicle-without-attachment whereabouts information 350 about the working vehicle 1 with no attachments 30 upon receipt of each periodic vehicle information 220Vp and acquisition of vehicle position information 230.

Note that, in the above preferred embodiment, a predetermined interval Pa at which the periodic attachment information 220Ap (in-action/not-in-action attachment information 220Aw) is transmitted starts at the point in time at which the mounted attachment information 220Aa is transmitted (at time Tb4), and a predetermined interval Pb at which the periodic vehicle information 220Vp is transmitted starts at the point in time at which the demounted attachment information 220Ad is transmitted (at time Tb1, Tb7). In such a case, the predetermined interval Pa and the predetermined interval Pb may be the same or different in duration.

Alternatively, the information processor 21b may transmit the periodic attachment information 220Ap (in-action/not-in-action attachment information 220Aw) and the periodic vehicle information 220Vp to the server 110 at regular intervals regardless of whether or not the working vehicle 1 is provided with an attachment 30.

For example, assuming that the regular intervals are predetermined intervals Pc (see FIG. 19), the first periodic attachment information 220Ap (in-action/not-in-action attachment information 220Aw), immediately following the transmission of the mounted attachment information 220Aa, is transmitted after a predetermined interval Pc from the last periodic vehicle information 220Vp that was transmitted before the transmission of the mounted attachment information 220Aa. The interval between the last periodic attachment information 220Ap (in-action/not-in-action attachment information 220Aw) that is transmitted before the transmission of the demounted attachment information 220Ad and the first periodic vehicle information 220Vp that is transmitted after the transmission of the demounted attachment information 220Ad) is also the predetermined interval Pc.

Next, the following description discusses a variation of the communication structure in the TSS 100 as illustrated in FIG. 16, with reference to FIG. 17. FIG. 17 schematically illustrates the manner in which information is communicated between the communicator 24 of the working vehicle 1 and the server 110 over time, including nonperiodic transmission of the mount notification 226a and the demount notification 226b, periodic transmission of the action/not-in-action attachment information 220Aw, and periodic transmission of the vehicle information 220V, in a variation of the TSS 100 in FIGS. 3 and 16.

The elements and the like in FIG. 17 assigned identical reference signs with those in FIG. 16 have the same functions and features as those in FIG. 16, and the descriptions therefor are omitted here.

The preferred embodiment illustrated in FIG. 17 differs from the preferred embodiment in FIG. 16 in that the information processor 21b of the controller 21 causes the communicator 24 to transmit, to the server 110, a combination of vehicle information 220V including no attachment ID 224 and a mount notification 226a instead of the mounted attachment information 220Aa, and causes the communicator 24 to transmit, to the server 110, a combination of vehicle information 220V and a demount notification 226b instead of the demounted attachment information 220Ad.

The information processor 21b determines whether the attachment 30 is in the mounted state or the demounted state based on the detection of the state of the latch operator 27, the time counted from the switching of the latch operator 27, and/or the like, and prepares the mount notification 226a or the demount notification 226b. That is, the information processor 21b is capable of preparing the mount notification 226a and the demount notification 226b without relying on the advertise signal 200 from the beacon transmitter 33 on the attachment 30.

Thus, the information processor 21b is capable of, immediately upon preparing the mount notification 226a or the demount notification 226b, without determining whether or not the beacon scanner 23 has received any advertise signals 200, adding the mount notification 226a or the demount notification 226b to the vehicle information 220V including the vehicle ID 223 for identification of the sender, and quickly transmitting it to the server 110. Note that the vehicle information 220V to which the mount notification 226a or the demount notification 226b is added is transmitted non-periodically independently of the predetermined intervals Pa or Pb, i.e., vehicle information 220V differing from the periodic vehicle information 220Vp.

Note, however, that neither the combination of the vehicle information 220V and the mount notification 226a nor the combination of the vehicle information 220V and the demount notification 226b includes the attachment ID 224, and therefore it is necessary for the server 110 to identify the attachment 30 corresponding to the received mount notification 226a or demount notification 226b.

In view of this, in the present preferred embodiment, the information processor 21b transmits the in-action/not-in-action attachment information 220Aw (or the first periodic attachment information 220Ap about the mounted attachment 30a) to the server 110 at substantially the same (slightly before or after) point in time as the time Tb4 at which the server 110 transmits the combination of the vehicle information 220V and the mount notification 226a.

The server 110 is capable of, by determining that the vehicle ID 223 included in the vehicle information 220V with the mount notification 226a therein or thereon matches the vehicle ID 223 included in the in-action/not-in-action attachment information 220Aw (periodic attachment information 220Ap) received at substantially the same time as the vehicle information 220V, determining that the attachment ID 224 included in the in-action/not-in-action attachment information 220Aw (periodic attachment information 220Ap) is the one that identifies the attachment 30 corresponding to the mount notification 226a. Thus, the server 110 can associate the attachment ID 224 included in the attachment information 220A received separately from the mount notification 226a with the received mount notification 226a.

Note that confirming the match between the vehicle IDs 223 as described above may be interpreted as determining that both the vehicle ID 223 included in the vehicle information 220V and the vehicle ID 223 included in the in-action/not-in-action attachment information 220Aw (periodic attachment information 220Ap) correspond to the same vehicle ID included in the registered vehicle ID list 111.

Note that the information processor 21b may transmit the in-action/not-in-action attachment information 220Aw (the first periodic attachment information 220Ap) after a predetermined interval Pa from the transmission of the mount notification 226a without transmitting, to the server 110, the in-action/not-in-action attachment information 220Aw (periodic attachment information 220Ap) at substantially the same time as (slightly before or after) the mount notification 226a in or on (accompanying) the vehicle information 220V. In such a case, the server 110 identifies the attachment 30 corresponding to the mount notification 226a based on the attachment ID 224 included in the in-action/not-in-action attachment information 220Aw (periodic attachment information 220Ap) received after a predetermined interval Pa from the receipt of the mount notification 226a.

Note that, in the present preferred embodiment illustrated in FIG. 16, the information processor 21b does not transmit the in-action/not-in-action attachment information 220Aw (periodic attachment information 220Ap) to the server 110 at substantially the same as or slightly before or after the demount notification 226b in or on the vehicle information 220V.

In such a case, the server 110 determines that the vehicle ID 223 included in the vehicle information 220V with the demount notification 226b therein or thereon matches the vehicle ID 223 included in the last in-action/not-in-action attachment information 220Aw (last periodic attachment information 220Ap) before the receipt of the demount notification 226b (or determines that both the vehicle ID 223 included in the vehicle information 220V and the vehicle ID 223 included in the last in-action/not-in-action attachment information 220Aw (periodic attachment information 220Ap) correspond to the same vehicle ID included in the registered vehicle ID list 111), and identifies the attachment 30 corresponding to the demount notification 226b based on the attachment ID 224 included in the last in-action/not-in-action attachment information 220Aw (last periodic attachment information 220Ap).

Alternatively, the information processor 21b may transmit, to the server 110, non-periodic in-action/not-in-action attachment information 220Aw (non-periodic attachment information 220A) at substantially the same as (slightly before or after) the demount notification 226b.

Note that the vehicle ID 223 included in the vehicle information 220V with the mount notification 226a or the demount notification 226b therein or thereon as described above is, in other words, "the vehicle ID 223 indicated by the mount notification 226a" or "the vehicle ID 223 indicated by the demount notification 226b". In the following description, such an vehicle ID 223 may be referred to as "the vehicle ID 223 indicated by the mount notification 226a" or "the vehicle ID 223 indicated by the demount notification 226b".

Also in cases where the status information 225 (e.g., in-action/not-in-action information 227) other than the mount notification 226a and the demount notification 226b is combined with the vehicle information 220V instead of being included in the attachment information 220A and is transmitted to the server 110, the vehicle ID 223 included in such vehicle information 220V may be hereinafter referred to as "the vehicle information 220V indicated by the status information 225".

The vehicle ID 223 and/or attachment ID 224 included in the attachment information 220A such as the mounted attachment information 220Aa may be referred to as "vehicle ID 223 and/or attachment ID 224 indicated by the attachment information 220Aa".

Note that there may be cases in which the information processor 21b, on the contrary to those illustrated in FIG. 17, includes the mount notification 226a and/or demount notification into the attachment information 220A including the attachment ID 224 and transmits it as the mounted attachment information 220Aa and/or demounted attachment information 220Ad to the server 110, whereas the information processor 21b adds the in-action/not-in-action information 227 to the vehicle information 220V (periodic vehicle information Vp) including no attachment IDs 224 and transmit it to the server 110.

In such cases, the server 110 is capable of, by determining that the vehicle ID 223 included in the vehicle information 220V (periodic vehicle information 220Vp) with the in-action/not-in-action information 227 therein or thereon (i.e., vehicle ID 223 indicated by the in-action/not-in-action information 227) matches the vehicle ID 223 included in the mounted attachment information 220Aa (i.e., vehicle ID 223 indicated by the mounted attachment information 220Aa)

(or by determining that both the vehicle ID 223 indicated by the in-action/not-in-action information 227 and the vehicle ID 223 indicated by the mounted attachment information 220Aa correspond to the same vehicle ID included in the registered vehicle ID list 111), associating the in-action/not-in-action information 227 with the mounted attachment 30*a* identified by the attachment ID 224 indicated by the mounted attachment information 220Aa.

Figure 18:
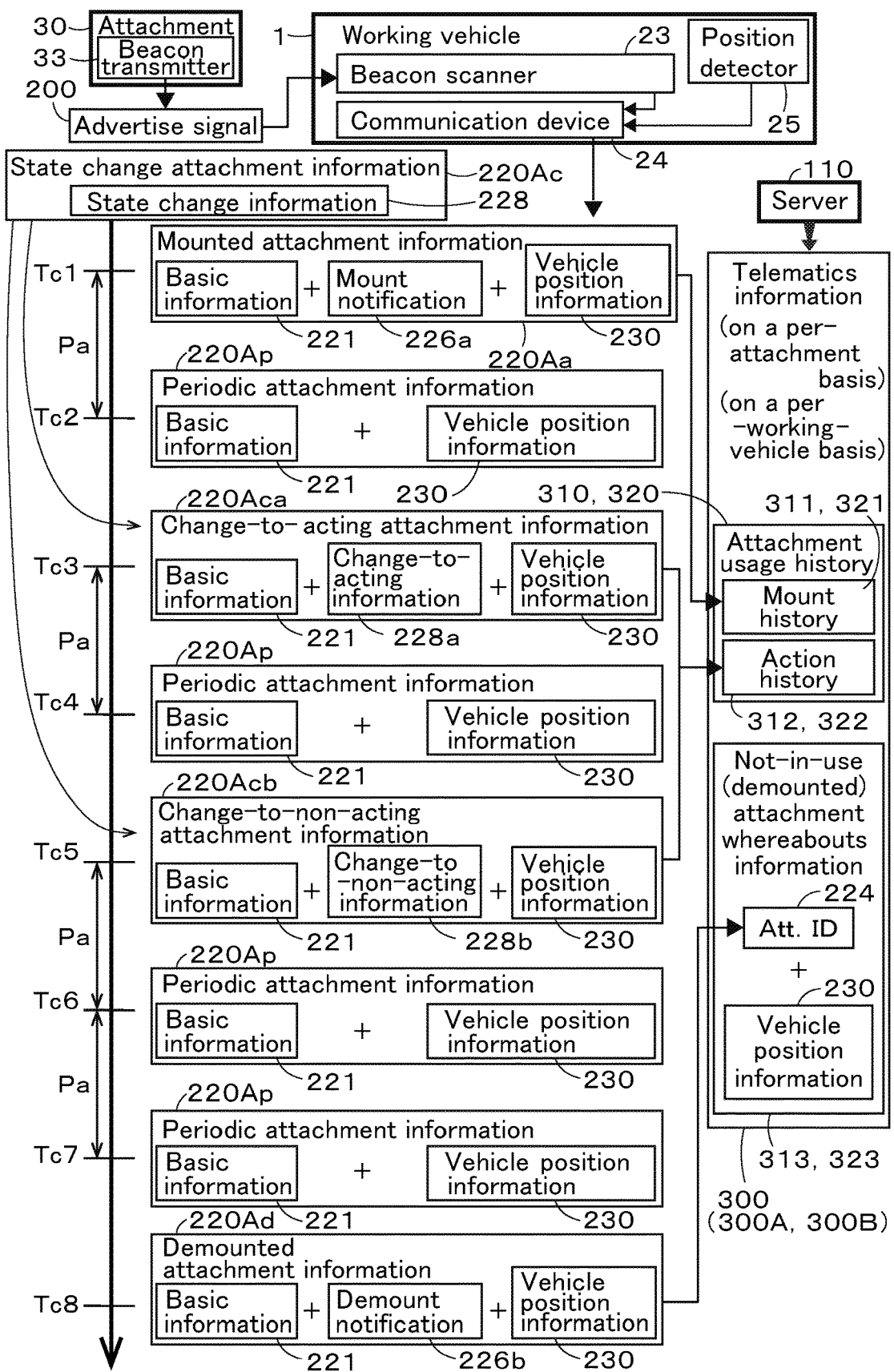
FIG. 18 schematically illustrates the manner in which attachment information is communicated over time during a period from when the attachment is mounted to the working vehicle to when the attachment is demounted from the working vehicle, in a telematics service system according to a second preferred embodiment of the present invention.

Next, the following description discusses another preferred embodiment of a communication structure relating to the action state of a mounted attachment, with reference to FIG. 18. FIG. 18 schematically illustrates the manner in which attachment information is communicated over time during a period from when the attachment 30 is mounted to the working vehicle 1 to when the attachment 30 is demounted from the working vehicle 1, including the transmission of state change attachment information 220Ac, in a TSS 100 according to another preferred embodiment.

The elements in FIG. 18 assigned identical reference signs with those in FIG. 3 have the same functions and features as those in FIG. 3, and the descriptions therefor are omitted here.

The preferred embodiment as illustrated in FIG. 18 differs from the preferred embodiment illustrated in FIG. 3 in that the information processor 21*b* of the controller 21 transmits, to the server 110 periodically (at predetermined intervals Pa), attachment information 220A (periodic attachment information 220Ap) not including in-action/not-in-action information 227 indicative of whether the mounted attachment 30*a* is in action to perform work during a period during which the working vehicle 1 is provided with the attachment 30 (30*a*), i.e., from time Tc1 when the mounted attachment information 220Aa is transmitted to time Tc8 when the demounted attachment information 220Ad is transmitted, whereas the information processor 21*b* transmits state change attachment information 220Ac non-periodically (independently of the predetermined intervals Pa) to the server 110 during that period.

The following discusses the state change attachment information 220Ac. The term "state change" refers to a change of the mounted attachment 30*a* from a non-acting state to an acting state or a change of the mounted attachment 30*a* from the acting state to the non-acting state. Note that the former change is referred to as "change-to-acting", and the latter change is referred to as "change-to-non-acting".

That is, the state change attachment information 220Ac is attachment information 220A that includes (i) basic information 221 including a header 222, a vehicle ID 223, and an attachment ID 224 as shown in FIG. 6 and (ii) state change information 228, as status information 225, indicating that there has been a "state change" (change-to-acting or change-to-non-acting) in the mounted attachment 30*a*.

Note that the state change information 228 that indicates a change-to-acting of the mounted attachment 30*a* is referred to as "change-to-acting information 228*a*", and the state change attachment information 220Ac that includes (indicates) the change-to-acting information 228*a* is referred to as "change-to-acting attachment information 220Aca". The state change information 228 that indicates a change-to-non-acting of the mounted attachment 30*a* is referred to as "change-to-non-acting information 228*b*", and the state change attachment information 220Ac that includes (indicates) the change-to-non-acting information 228*b* is referred to as "change-to-non-acting attachment information 220Acb".

An example of a method by which the information processor 21*b* determines whether there has been a "state change" (change-to-acting or change-to-non-acting) in the mounted attachment 30*a* would be to, as described earlier, read changes in vibration state of the mounted attachment 30*a* detected by the vibration sensor 34 on the mounted attachment 30*a* via advertise signal(s) 200 received by the beacon scanner 23.

For example, the information processor 21*b*, upon reading a change of the vibrating/not-vibrating information 205*a* from the not-vibrating information 205*a*2 to the vibrating information 205*a*1 (or a change from the state in which the presence of vibrating information 205*a*1 is not recognized to the state in which the presence of vibrating information 205*a*1 is recognized), determines that there has been a change-to-acting in the mounted attachment 30*a* and prepares change-to-acting information 228*a*. Upon each preparation (e.g., at time Tc3 in FIG. 18), i.e., non-periodically independently of intervals (predetermined intervals Pa) at which the periodic attachment information 220Ap is transmitted, the information processor 21*b* causes the communicator 24 to transmit the change-to-acting attachment information 220Aca including the change-to-acting information 228*a* to the server 11.

Additionally or alternatively, for example, the information processor 21*b*, upon reading a change of the vibrating/not-vibrating information 205*a* from the vibrating information 205*a*1 to the not-vibrating information 205*a*2 (or a change from the state in which the presence of vibrating information 205*a*1 is recognized to the state in which the presence of vibrating information 205*a*1 is not recognized), determines that there has been a change-to-non-acting in the mounted attachment 30*a* and prepares change-to-non-acting information 228*b*. Upon each preparation (e.g., at time Tc5 in FIG. 18), i.e., non-periodically independently of intervals (predetermined intervals Pa) at which the periodic attachment information 220Ap is transmitted, the information processor 21*b* causes the communicator 24 to transmit the change-to-non-acting attachment information 220Acb including the change-to-non-acting information 228*b* to the server 11.

Another example of a method by which the information processor 21*b* reads changes in vibration state of the mounted attachment 30*a* detected by the vibration sensor 34 on the mounted attachment 30*a* to determine whether there has been a "state change" (change-to-acting or change-to-non-acting) in the mounted attachment 30*a* would be to use a vibration indicator 205*b* included in vibration information 205.

For example, the information processor 21*b*, upon determining that the vibration indicator 205*b* indicating the amplitude etc. of vibration of the attachment 30 has changed from below a threshold to the threshold or greater, determines that there has been a change-to-acting in the mounted attachment 30*a*, and causes the communicator 24 to transmit the change-to-acting attachment information 220Aca to the server 11 non-periodically upon each determination. The information processor 21*b*, upon determining that the vibration indicator 205*b* has changed from the threshold or greater to below the threshold, determines that there has been a change-to-non-acting in the mounted attachment 30*a*, and causes the communicator 24 to transmit the change-to-non-acting attachment information 220Acb to the server 11 non-periodically upon each determination.

Alternatively, in the case where the mounted attachment 30*a* is an AUX attachment 30X, the information processor 21*b* may, upon recognizing the switching of the AUX mode switch 28 and/or AUX drive switch 29 to cause a change in drive state of the AUX actuator 36, determine that there has been a state change in the mounted attachment 30a and cause the communicator 24 to transmit the change-to-acting attachment information 220Aca or the change-to-non-acting attachment information 220Acb to the server 11 upon each determination.

As has been discussed, in the preferred embodiment illustrated in FIG. 18, the information processor 21b transmits the state change attachment information 220Ac non-periodically to the server 110 during the foregoing period, so that the information processor 21b provides the server 110 with information for use in an action history 312, 322 (which relates to the point(s) in time and/or acting period(s) at and/or during which the mounted attachment 30a was acting) included in the telematics information 300.

In the preferred embodiment in FIG. 3, during the period, the information processor 21b detects whether the mounted attachment 30a is in action to perform work at intervals corresponding to the predetermined intervals Pa, and prepares in-action/not-in-action information 227 based on the result of the detection upon each detection. In contrast, in the preferred embodiment in FIG. 18, the information processor 21b continues to monitor whether there is a state change in the mounted attachment 30a over the period, and, upon detection of a state change in the mounted attachment 30a, non-periodically transmits the state change attachment information 220Ac. This makes it possible for the server 110 to prepare the action history 312, 322 which is in more conformity with the status of the mounted attachment 30a.

Note that an example of a variation of the preferred embodiment in FIG. 18 would be that the information processor 21b adds the state change information 228 (change-to-acting information 228a and/or change-to-non-acting information 228b) to vehicle information 220V including no attachment IDs 224 and transmits it to the server 110.

In such a case, the server 110 is capable of, by determining that the vehicle ID 223 included in the non-periodic vehicle information 220V with the state change information 228 therein or thereon (i.e., vehicle ID 223 indicated by the state change information 228) matches the vehicle ID 223 included in the mounted attachment information 220Aa (i.e., vehicle ID 223 indicated by the mounted attachment information 220Aa) (or by determining that both the vehicle ID 223 indicated by the state change information 228 and the vehicle ID 223 indicated by the mounted attachment information 220Aa correspond to the same vehicle ID included in the registered vehicle ID list 111), associating the state change information 228 with the mounted attachment 30a identified by the attachment ID 224 indicated by the mounted attachment information 220Aa.

Figure 19:
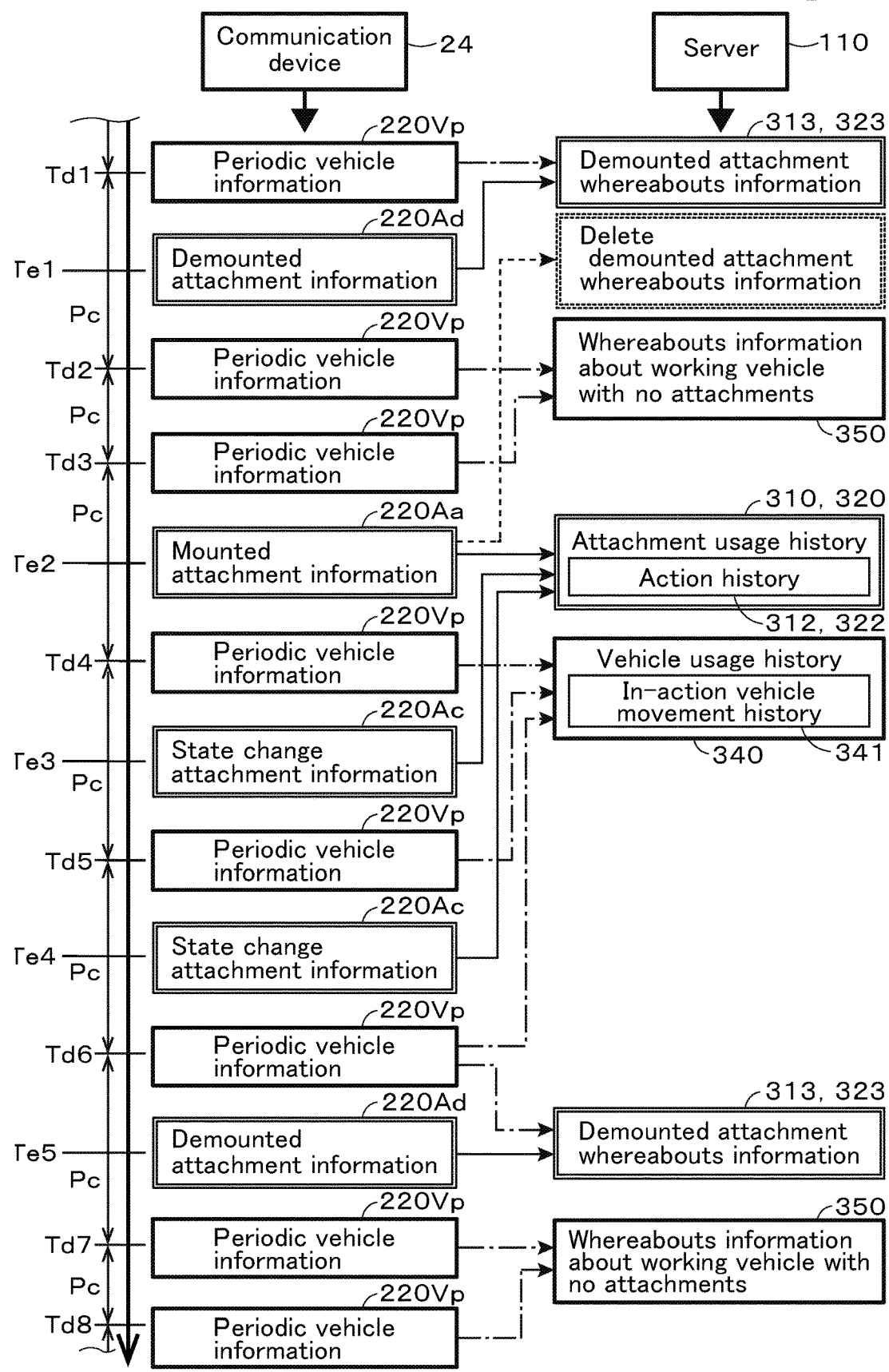
FIG. 19 schematically illustrates the manner in which information is communicated over time between the communicator of the working vehicle and the server in a telematics service system according to a variation of the second preferred embodiment of the present invention.

The following description discusses another preferred embodiment as illustrated in FIG. 19. FIG. 19 schematically illustrates the manner in which information is communicated over time between the communicator 24 of the working vehicle 1 and the server 110 in a TSS 100 according to a variation of the preferred embodiment in FIG. 18.

The elements and the like in FIG. 19 assigned identical reference signs with those in FIGS. 3 and 16 to 18 have the same functions and features as those in FIGS. 3 and 16 to 18, and the descriptions therefor are omitted here.

In the preferred embodiments in FIGS. 16 and 17, the information processor 21b transmits periodic vehicle information 220Vp including no attachment IDs 224 at predetermined intervals Pb during a period during which the working vehicle 1 is provided with no attachments 30, and transmits in-action/not-in-action attachment information 220Aw including an attachment ID 224 at predetermined intervals Pa during a period during which the working vehicle 1 is provided with an attachment 30.

In contrast, in the preferred embodiment in FIG. 19, the information processor 21b transmits periodic vehicle information 220Vp including no attachment IDs 224 to the server 110 constantly at predetermined intervals Pc (at times Td1 to Td8) regardless of whether the working vehicle 1 is provided with an attachment 30. That is, in the preferred embodiment in FIG. 19, the information processor 21b transmits periodic vehicle information 220Vp to the server 110 at predetermined intervals Pc not only during the period during which the working vehicle 1 is provided with no attachments 30 but also during the period during which the working vehicle 1 is provided with an attachment 30.

On the other hand, the information processor 21b transmits mounted attachment information 220Aa, state change attachment information 220Ac, and demounted attachment information 220Ad, which are non-periodic attachment information 220A independent of the predetermined intervals Pc, to the server 110 (at times Te1 to Te4).

After receiving and storing the mounted attachment information 220Aa, as long as the server 110 does not receive demounted attachment information 220Ad, upon each receipt of periodic vehicle information 220Vp, the server 110 determines that the vehicle ID 223 included in the periodic vehicle information 220Vp matches the vehicle ID 223 included in the stored mounted attachment information 220Aa (or determines that both the vehicle ID 223 indicated by the vehicle information 220V and the vehicle ID 223 indicated by the stored mounted attachment information 220Aa correspond to the same vehicle ID included in the registered vehicle ID list 111). With this, the server 110 is capable of associating the vehicle position information 230 included in the received periodic vehicle information 220Vp with the mounted attachment 30a identified by the attachment ID 224 indicated by the mounted attachment information 220Aa to obtain the whereabouts information of the mounted attachment 30a. Furthermore, the server 110 prepares or updates the action history 312, 322 of the mounted attachment 30a upon each receipt of the state change attachment information 220Ac.

Thus, the server 110 receives the periodic vehicle information 220Vp during a period from when the server 110 receives the mounted attachment information 220Aa to when the server 110 receives the demounted attachment information 220Ad, thus managing (preparing, updating, and/or storing) a vehicle usage history 340 about the working vehicle 1 that includes an in-action vehicle movement history 341 and the like prepared, updated, and/or stored based on the vehicle position information 230 and/or the like included in the periodic vehicle information 220Vp. On the other hand, the server 110 receives the mounted attachment information 220Aa, the periodic vehicle information 220Vp, and the state change attachment information 220Ac during the period, thus managing (preparing, updating, and/or storing) the whereabouts information of the mounted attachment 30a and/or the attachment usage history 310, 320 including the action history 312, 322 of the mounted attachment 30a.

Note that there may be cases in which, in the preferred embodiment in FIG. 19, the information processor 21b includes the vehicle position information 230 only into the periodic vehicle information 220Vp and does not include the vehicle position information 230 into the mounted attachment information 220Aa, the demounted attachment information 220Ad, or the state change attachment information Ac.

In such cases, the server 110 associates the non-periodic attachment information 220A with the periodic vehicle position information 200Vp by determining that their vehicle IDs 223 match each other (or by determining that both the vehicle ID 223 indicated by the non-periodic attachment information 220A and the vehicle ID 223 indicated by the periodic vehicle information 220Vp correspond to the same vehicle ID included in the registered vehicle ID list 111). This allows the server 110 to associate the vehicle position information 230 included in each periodic vehicle information 220Vp with the attachment 30 corresponding to the corresponding attachment information 220A.

In particular, the server 110 associates the vehicle position information 230 included in the periodic vehicle information 220Vp received at the time closest to the time of receipt of the demounted attachment information 220Ad with the attachment 30 (demounted attachment 30b) identified by the attachment ID 224 indicated by the demounted attachment information 220Ad, and manages (stores) the vehicle position information 230 as the whereabouts information of the demounted attachment 30b.

Note that, similarly to the preferred embodiment in FIG. 17 in which the information processor 21b transmits another non-periodic attachment information 220A including vehicle position information 230 to the server 110 at substantially the same time as (or slightly before or after) the transmission of the mount notification 226a and non-periodic vehicle information 220V at time Tb4, the information processor 21b in the preferred embodiment in FIG. 19 may transmit vehicle information 220V including vehicle position information 230 to the server 110 at substantially the same time as (or slightly before or after), for example, the demounted attachment information 220Ad including no vehicle position information 230. With this, the server 110 can manage (store), as the whereabouts information of the demounted attachment 30b, the vehicle position information 230 at a point in time desirably close to the point in time at which the attachment 30 was demounted from the working vehicle 1 (at which the attachment 30 reached the state in which the attachment 30 is considered demounted from the working vehicle 1).

Another variation of the preferred embodiment in FIG. 19 would be that the information processor 21b adds only information relating to the state change information 228 (change-to-acting information 228a or change-to-non-acting information 228b) as the status information 225 to the non-periodic vehicle information 220V including no attachment IDs 224 (see the addition of a mount notification 226a or a demount notification 226b to the vehicle information 220V in FIG. 17), and transmits it to the server 110 instead of the state change attachment information 220Ac.

Also in such cases, the server 110 is capable of, by determining that the vehicle ID 223 included in the non-periodic vehicle information 220V with the state change information 228 therein or thereon matches the vehicle ID 223 included in the mounted attachment information 220Aa (or by determining that both the vehicle ID 223 indicated by the state change information 228 and the vehicle ID 223 indicated by the mounted attachment information 220Aa correspond to the same vehicle ID included in the registered vehicle ID list 111), associating the information relating to the state change with the mounted attachment 30a identified by the attachment ID 224 included in the mounted attachment information 220Aa.

Thus, the server 110 prepares and stores various types of telematics information 300 based on vehicle information 220V and attachment information 220A received from the communicator 24 of the working vehicle 1.

Examples of the various types of telematics information 300 include per-attachment telematics information 300A obtained by compiling history information and the like on a per-attachment-30 basis as shown in FIG. 20, and per-working-vehicle telematics information 300B obtained by compiling history information and the like on a per-working-vehicle-1 basis as shown in FIG. 21.

The following description discusses the per-attachment telematics information 300A as shown in FIG. 20 and the per-working-vehicle telematics information 300B as shown in FIG. 21, as specific examples of attachment-related telematics information 300 prepared and managed by the server 110 based on information received from the communicator 24.

Note that the following description relating to telematics information is based on the assumption that the communicator 24 transmits attachment information 220A and/or the like to the server 110 as shown in FIG. 3 (and FIG. 16). Note, however, that cases in which attachment information 220A and/or the like is transmitted in the other preferred embodiments in FIGS. 17 to 19 are also discussed as necessary.

The server 110 classifies the received one or more pieces of attachment information 220A into one or more groups each including piece(s) of attachment information 220A having the same attachment ID 224, and, for example, collects pieces of attachment information 220A that belong to the same group, thus preparing or updating per-attachment telematics information 300A as shown in FIG. 20.

FIG. 20, relating to a bucket 130 which is a typical example of the attachment 30 as illustrated in FIG. 2, shows an example of per-attachment telematics information 300A obtained by collecting pieces of attachment information 220A which are the same as each other in that they include the attachment ID 224 of the bucket 130.

The server 110 classifies the received one or more pieces of attachment information 220A into one or more groups each including piece(s) of attachment information 220A having the same vehicle ID 223, and, for example, collects pieces of attachment information 220A that belong to the same group, thus preparing or updating per-working-vehicle telematics information 300B.

FIG. 21, relating to a compact track loader (CTL in FIG. 2) which is a typical example of the working vehicle 1, shows an example of per-working-vehicle telematics information 300B obtained by collecting pieces of attachment information 220A which are the same as each other in that they include the vehicle ID 223 of the CTL.

Referring to FIGS. 3, 20, and 21 etc., the per-attachment telematics information 300A and the per-working-vehicle telematics information 300B each include an attachment usage history 310 or 320 obtained by collecting piece(s) of mounted attachment information 220Aa and piece(s) of in-action/not-in-action attachment information 220Aw, and each include demounted attachment whereabouts information 313 or 323 which is equivalent to a history of received piece(s) of demounted attachment information 220Ad.

The attachment usage histories 310 and 320 each include mount history (histories) 311 or 321 which is equivalent to a history of received piece(s) of mounted attachment information 220Aa and action history (histories) 312 or 322 which is equivalent to a history of received piece(s) of in-action/not-in-action attachment information 220Aw including in-action information 227a.

The following description discusses, with reference to FIG. 20, the details of the telematics information 300A about the bucket 130 that is an example of the per-attachment telematics information 300A. Note that "Mi/H/D/M/Y" in FIG. 20 and FIG. 21 (discussed later) represents "minute/time/date/month/year".

The telematics information 300A shown in FIG. 20 is obtained by collecting piece(s) of attachment information 220A which are the same as each other in that they include the attachment ID 224 of the bucket 130 in the basic information 221. The "Attachment ID of bucket" in FIG. 20 represents this attachment ID 224.

Note that one or more attachments 30 relating to various type(s) of telematics information are registered in the server 110. When per-attachment telematics information 300A is to be prepared (updated) based on attachment information 220A received by the server 110, for example, a match for the attachment ID 224 included in the attachment information 220A is searched for in the piece(s) of identification information of the attachment(s) 30 registered in the server 110.

The server 110 may store piece(s) of image data 315 of the registered attachment(s) 30, and may include the piece of image data 315 that is associated with the corresponding attachment ID 224 into the per-attachment telematics information 300A. When the telematics information 300A is provided to the SU terminal device 80 or the SP terminal device 90, an image of the attachment 30 (bucket 130) may be displayed by the SU terminal device 80 or the SP terminal device 90 based on the piece of image data 315. The image may be any of various types of images such as, for example, a captured image or an icon.

The server 110, upon receipt of mounted attachment information 220Aa including the attachment ID 224 corresponding to the bucket 130, writes a mount history 311 of the bucket 130 to the attachment usage history 310.

The mount history 311 includes, for example, as shown in FIG. 20, mount date-and-time 311a based on the date-and-time information (see FIG. 6) included in, for example, the header 222 in the mounted attachment information 220Aa, a working vehicle name 311b based on the vehicle ID 223 (see FIG. 6) in the mounted attachment information 220Aa, and/or the like.

Upon receipt of the mounted attachment information 220Aa, the server 110 writes, as a mount location 311c which is the location (position) at which the attachment 30 (bucket 130) was mounted, the vehicle position determined by the vehicle position information 230 about the working vehicle 1 included in the mounted attachment information 220Aa, to the telematics information 300A.

Specifically, the advertise signal 200 from the attachment 30 does not include position information about the attachment 30. However, the mounted attachment 30a is very close to the working vehicle 1. Therefore, the position of the working vehicle 1 determined by the vehicle position information 230 is written, as the mount location 311c at which the attachment 30 was mounted, to the telematics information 300A.

Note that the vehicle position written as the mount location 311c to the telematics information 300A by the server 110 is preferably a vehicle position that was determined by the position detector 25 at a point in time as close as possible to the point in time at which the mount notification 226a was prepared (the mounted attachment information 220Aa was prepared).

Therefore, in the case where the information processor 21b of the controller 21 of the working vehicle 1 includes the vehicle position information 230 into the mounted attachment information 220Aa, the information processor 21b preferably includes, into the mounted attachment information 220Aa, vehicle position information 230 that was acquired from the position detector 25 at a point in time as close as possible to the time of preparation of the mount notification 226a.

Alternatively, in the case where the information processor 21b does not include the vehicle position information 230 into the mounted attachment information 220Aa, the server 110 may write, as the mount location 311c to the telematics information 300A, the position of the working vehicle 1 indicated by the vehicle position information 230 included in another attachment information 220A received at a point in time closest to the point in time at which the server 110 received the mounted attachment information 220Aa (e.g., non-periodic attachment information 220A transmitted at time Tb4 in FIG. 17) or the vehicle information 220V (e.g., vehicle information 220V (periodic vehicle information 220Vp) in FIG. 19).

Alternatively, in the case where the information processor 21b, as shown in FIG. 17, adds the mount notification 226a to the vehicle information 220V including the vehicle ID 223 and the vehicle position information 230 and transmits it to the server 110 instead of the mounted attachment information 220Aa, the server 110 may (i) determine that the vehicle ID 223 included in the attachment information 220A received at the point in time closest to the point in time at which the server 110 received the mount notification 226a (e.g., non-periodic attachment information 220A transmitted at time Tb4 in FIG. 17) matches the vehicle ID 223 included in the vehicle information 220V with the mount notification 226a therein or thereon (or determine that both the vehicle ID 223 indicated by the attachment information 220A and the vehicle ID 223 indicated by the mount notification 226a correspond to the same vehicle ID included in the registered vehicle ID list 111) and then (ii) associate the attachment ID 224 included in the attachment information 220A with the mount notification 226a, and write, as the mount location 311c to the telematics information 300A, the position of the working vehicle 1 indicated by the vehicle position information 230 included in the vehicle information 220V.

Note that each mount history 311 in FIG. 20 includes a total mount time (total time for which an attachment has been mounted) 311d. This field is filled with the time (the number of days) counted from the receipt of the mounted attachment information 220Aa. The total mount time 311d may be updated (increased) upon each receipt of in-action/not-in-action attachment information 220Aw. Upon receipt of demounted attachment information 220Ad about the attachment 30 (the bucket 130 in the present preferred embodiment), the time that has passed up to this point is written as the total mount time 311d to the telematics information. With this, the updating of the total mount time 311d in the mount history 311 ends.

As is apparent from the foregoing description about the periodic transmission of in-action/not-in-action attachment information 220Aw, the server 110, after receiving mounted attachment information 220Aa about the bucket 130 from the working vehicle 1, will continue to receive in-action/not-in-action attachment information 220Aw about the bucket 130 periodically (at predetermined interval(s) Pa) from the working vehicle 1, until the server 110 receives demounted attachment information 220Ad about the bucket 130. The server 110 prepares or updates the action history 312 included in the attachment usage history 310 based on the received in-action/not-in-action attachment information 220Aw.

It is noted here that, in FIG. 20, each action history 312 includes a plurality of rows. The first row of the action history 312 is an action history of the bucket 130 (as a mounted attachment 30a) during a period from (i) when in-action attachment information 220Awa (in-action/not-in-action attachment information 220Aw including in-action information 277a) is received for the first time since the receipt of the mounted attachment information 220Aa (if the mounted attachment information 220Aa includes in-action information 227a, then the mounted attachment information 220Aa may be regarded as the in-action attachment information 220Awa received for the first time) to (ii) when not-in-action attachment information 220Awb (in-action/not-in-action attachment information 220Aw including not-in-action information 227b) is received.

The history in the second row of the action history 312 starts when in-action attachment information 220Awa is received for the first time since the receipt of the not-in-action attachment information 220Awb with which the history in the first row of the action history 312 ended. After that, the following is repeated. The history in this row of the action history 312 ends upon receipt of not-in-action attachment information 220Awb, and then the history in the next row of the action history 312 starts when in-action attachment information 220Wa is received for the first time.

Note that, upon receipt of demounted attachment information 220Ad, the history in the last one of the currently existing rows of the action history 312 ends.

The action history 312 includes, in each row, an action start date-and-time 312a, an action start location 312b, an action end date-and-time 312c, an action end location 312d, and a total time 312e. The server 110 acquires, from the attachment information 220A (in-action/not-in-action attachment information 220Aw), pieces of information corresponding to these items included in each row of the action history 312, and writes the pieces of information to the items.

The action start date-and-time 312a may be the date and time of the receipt of the in-action attachment information 220Awa with which the history in the corresponding row of the action history 312 starts, date-and-time information included in the header 222 or the like of the basic information 221 of the in-action attachment information 220Awa, or the like (hereinafter may be referred to as "date-and-time information etc." for short). Based on the example in FIG. 3, the action start date-and-time 312a may be the date-and-time information etc. in the in-action attachment information 220Awa transmitted at time Ta2.

Note that, if the mounted attachment information 220Aa includes in-action information 227a, the action start date-and-time 312a may be the date-and-time information etc. in the mounted attachment information 220Aa transmitted at time Ta1.

The action start location 312b may be the position of the working vehicle 1 determined based on the vehicle position information 230 that was received at the same date and time as the date and time determined based on the date-and-time information etc. in the in-action attachment information 220Awa received for the first time (transmitted at time Ta1 or time Ta2 in FIG. 3) in the history in the corresponding row of the action history 312, similarly to the mount location 311c.

The action end date-and-time 312c may be the date-and-time information etc. in the (most recent) in-action attachment information 220Awa received immediately prior to (at the point in time preceding the receipt of the not-in-action attachment information 220Awb by a predetermined interval Pa) the not-in-action attachment information 220Awb with which the history in the corresponding row of the action history 312 ends (which was transmitted at time Ta5 in FIG. 3).

Note that, in the case where pieces of in-action attachment information 220Awa are received sequentially at predetermined intervals Pa, the date-and-time information etc. in the in-action attachment information 220Awa that has most recently been received may be written to the action end date-and-time 312c, so that the action end date-and-time 312c may be updated upon each receipt of in-action attachment information 220Awa. In the example in FIG. 3, the server 110 updates the action end date-and-time 312c upon each receipt of in-action attachment information 220Awa transmitted at time Ta3, Ta4.

In the case where the "action end date-and-time 312c" is written to the telematics information in the manner as describe above, the "action end date-and-time 312c" can be regarded as substantially indicating the date and time at which it was most recently determined that the attachment 30 is in the action state.

In such a case, assuming that the updating of the action end date-and-time 312c is stopped upon receipt of the not-in-action attachment information 220Awb, the column of the action end date-and-time 312c has, written therein, the date-and-time information etc. in the (most recent) in-action attachment information 220Awa received immediately prior to the not-in-action attachment information 220Awb (at the point in time preceding the receipt of the not-in-action attachment information 220Awb by a predetermined interval Pa).

Also with regard to the action end location 312d, the position of the working vehicle 1 determined based on the vehicle position information 230 included in the in-action attachment information 220Awa is written to the action end location 312d upon each receipt of the latest in-action attachment information 220Awa.

In such a case, the vehicle position information 230 newly written to the action end location 312d (i.e., the vehicle position information 230 associated with the attachment ID 224 of the attachment 30 in use (mounted attachment 30a)) may be included, as the current (most recent) position information of the attachment 30 in use (mounted attachment 30a), in the telematics information 300.

Assuming that the updating of the action end location 312d is stopped upon receipt of the not-in-action attachment information 220Awb, the column of the action end location 312d has, written therein, the vehicle position based on the vehicle position information 230 included in the (most recent) in-action attachment information 220Awa received immediately prior to the not-in-action attachment information 220Awb (at the point in time preceding the receipt of the not-in-action attachment information 220Wb by a predetermined interval Pa).

With regard to the total time 312e, a period of time from when in-action attachment information 220Awa is received for the first time in the corresponding row of the action history 312 to when latest in-action attachment information 220Awa is received may be written to the total time 312e. The total time 312e may be updated upon each receipt of in-action attachment information 220Awa received at predetermined intervals Pa, and the updating of the total time 312e is stopped upon receipt of not-in-action attachment information 220Awb.

Since the action start location 312*b* and the action end location 312*d* are included in the action history 312 as described above, for example, in the case where the SU terminal device 80 or the SP terminal device 90 displays the action history 312 included in the telematics information 300 from the server 110, it is possible to allow the person who looks at the displayed action history 312 to know the history of movement of the attachment 30 in use (more specifically, the history of movement of the working vehicle 1 having the attachment 30 mounted thereto). Since the total time 312*e* is included in the action history 312, it is possible to allow the person to know how long the attachment 30 has been in action.

As described earlier, one mount history 311 and its associated action history 312 associated with that mount history 311 are not updated anymore after the receipt of the demounted attachment information 220Ad, and are completed as a single piece of attachment usage history. The server 110 prepares a demount history 314 as shown in FIG. 20 based on the received demounted attachment information 220Ad.

The demount history 314 includes a demount date-and-time 314*a* and a demount location 314*b*. The date-and-time information etc. in the demounted attachment information 220Ad is written to the demount date-and-time 314*a*. The position of the working vehicle 1 determined based on the vehicle position information 230 included in the demounted attachment information 220Ad is written to the demount location 314*b*, similarly to the mount location 311*c* and the like. Specifically, as shown in FIG. 3, the vehicle position information 230 relating to the vehicle position of the working vehicle 1 at the point in time at which the attachment 30 was determined as being in the demounted state (at time Ta6 in FIG. 3) is associated with the attachment ID 224 included in the demounted attachment information 220Ad.

The demount history 314, as whereabouts information 313 of the attachment 30 not in use (demounted attachment 30*b*), is stored "as-is" in the server 110. For example, when the user wishes to check the location of the demounted attachment 30*b*, the demount history 314 is transmitted to the SU terminal device 80 and provided (outputted) as telematics information to the user.

Note that the vehicle position information 230 indicates the position of the working vehicle 1, and does not actually indicate the position of the demounted attachment 30*b* itself. However, the position (location) of the attachment 30 at the point in time at which the attachment 30 was determined as being in the demounted state is substantially the same as the position of the working vehicle 1. Furthermore, the demounted attachment 30*b* does not move from the position at which the demounted attachment 30*b* was demounted from the working vehicle 1 until the next time the demounted attachment 30*b* is mounted to a working vehicle 1 (which may be the same as or different from the working vehicle 1 to which the attachment 30 was mounted previously) and is movable with the working vehicle 1.

In view of the above, the server 110 stores the vehicle position information 230, indicating the position of the working vehicle 1 at the point in time at which the attachment 30 was determined as being in the demounted state in response to the demounting operation (turning ON the demounting switch 27*b*), and the attachment ID 224 of the attachment 30 (demounted attachment 30*b*) such that the vehicle position information 230 is associated with the attachment ID 224 of the attachment 30 (demounted attachment 30*b*), and stores the vehicle position information 230 as the whereabouts information 313 of the demounted attachment 30*b* until the next time the demounted attachment 30*b* is mounted to a working vehicle, making it possible to provide the per-attachment telematics information 300A including the stored whereabouts information 313 of the demounted attachment 30*b*.

As described earlier, in the attachment usage history 310 shown in FIG. 20, once one mount history 311 (e.g., "mount history 1" in FIG. 20) and its associated action history 312 associated with that mount history 311 have been prepared by the server 110, the mount history 311 and the action history 312 are updated upon each receipt of in-action/not-in-action attachment information 220Aw and, upon the receipt of demounted attachment information 220Ad by the server 110, the update ends, thus completing a mount history 311 ("mount history 1") and its associated action history 312.

The server 110 prepares a demount history 314 ("demount history 1" in FIG. 20) based on the demounted attachment information 220Ad with which the mount history 311 ("mount history 1" in FIG. 20) and the associated action history 312 were completed, and includes the prepared demount history 314, as whereabouts information 313 of the attachment 30 not in use (demounted attachment 30*b*), into telematics information 300A such that the telematics information 300A including the demount history 314 can be provided to a telematics service user and/or the like.

When the demounted attachment 30*b* relating to the demount history 314 ("demount history 1") is mounted to a working vehicle 1 (which may be the same as or different from the working vehicle 1 to which the attachment 30 was previously mounted) (i.e., when the demounted attachment 30*b* changes to the mounted attachment 30*a*), another mount history 311 as an attachment usage history 310 of that attachment 30 is prepared (e.g., "mount history 2" as shown in FIG. 20 is prepared).

To the mount location 311*c* of the other mount history 311 ("mount history 2"), vehicle position information 230 of the working vehicle 1 at the point in time at which the attachment 30 was determined as being in the mounted state in response to the mounting operation (turning ON the mounting switch 27*a*) is written. Upon the preparation (start of preparation) of the other mount history 311 (once the mount date-and-time 311*a* and the mount location 311*c* have been written to the history), the server 110 stops providing, as the whereabouts information 313 of the attachment not in use (demounted attachment 30*b*), the vehicle position information 230 based on the demount history 314 obtained when the mounted attachment 30*a* was the demounted attachment 30*b* (based on "demount history 1").

In other words, the vehicle position information 230 as the whereabouts information 313 of the attachment not in use (demounted attachment 30*b*) is dissociated from the attachment ID 224 of the attachment 30 and, instead, vehicle position information 230 as another mount location 311*c* is associated with the attachment ID 224.

The other attachment usage history including the other mount history 311 ("mount history 2") and its associated action history 312 is no longer undated after the receipt of another demounted attachment information 220Ad, and is completed. The server 110 prepares another demount history 314 ("demount history 2" in FIG. 20) based on the received other demounted attachment information 220Ad. The vehicle position information 230 written to the demount location 314*b* of the demount history 314 ("demount history 2") is included, as the current whereabouts information 313 of the demounted attachment 30*b*, into the per-attachment telematics information 300A such that the telematics information 300A including the vehicle position information 230 can be provided by the server 110 to the SU terminal device 80, the SP terminal device 90, or the like.

The telematics service user or the like is provided with per-attachment telematics information 300A including an attachment usage history 310 prepared (updated) by updating a mount history 311 and an action history 312 or prepared by preparing different mounted histories 311 and action histories 312 as the time for which the attachment 30 is used and the number of times the attachment 30 is used increase. This allows the user or the like to, for example, predict the time of maintenance and the remaining service life of the attachment 30.

The following description discusses telematics information 300B about a compact track loader (CTL) as an example of per-working-vehicle telematics information 300B, with reference to FIG. 21.

The telematics information 300B as shown in FIG. 21 obtained by collecting pieces of attachment information 220 which are the same as each other in that they include the vehicle ID 223 of the CTL in basic information 221. The "Vehicle ID of CTL" in FIG. 21 represents the vehicle ID 223.

Note that, as described earlier, vehicle ID(s) of one or more working vehicles 1 relating to various type(s) of telematics information are registered in the server 110, and the vehicle ID(s) are included in the registered vehicle ID list 2111 stored in the server 110. When the per-working-vehicle telematics information 300B is to be prepared (updated) based on attachment information 220 received by the server 110, for example, a match for the vehicle ID 223 included in the attachment information 220A or the vehicle information 220V is searched for in the piece(s) of identification information of the working vehicle(s) 1 included in the registered vehicle ID list 111 stored in the server 110.

The server 110 may store piece(s) of image data 325 of the registered working vehicle(s) 1, and may include the piece of image data 325 that is associated with the corresponding vehicle ID 223 into the per-working-vehicle telematics information 300B. When the telematics information 300B is provided to the SU terminal device 80 or the SP terminal device 90, an image of the working vehicle 1 (CTL) may be displayed by the SU terminal device 80 or the SP terminal device 90 based on the piece of image data 325. The image may be any of various types of images such as, for example, a captured image or an icon.

The server 110, upon receipt of the mounted attachment information 220Aa including the vehicle ID 223 corresponding to the CTL, writes, to the attachment usage history 320, a mount date-and-time 321a of the mount history 321 of the attachment 30 (e.g., bucket 130), an attachment name 321b based on the attachment ID 224 (see FIG. 6) in the mounted attachment information 220Aa, and a mount location 321c indicating the vehicle position information 230 at the point in time at which the attachment 30 was determined as being in the mounted state in response to the mounting operation (turning ON the mounting switch 27a).

After the receipt of the mounted attachment information 220A, the server 110 writes (or updates), upon each receipt of in-action/not-in-action attachment information 220W received at predetermined intervals Pa, a mount time 321d (which is the time that has passed since the mount date-and-time) to the mount history 321 and an action start date-and-time 322a, an action start location 322b, an action end date-and-time 322c, an action end location 322d, and a total action time 322e to the action history 322 associated with the mount history 321.

For details of the writing (updating) of the mount history 321 and the action history 322 and the like, reference should be made to the details of the mount history 311 and the action history 312 of the per-attachment foregoing telematics information 300A.

The server 110, upon receipt of demounted attachment information 220Ad transmitted after the attachment 30 is demounted from the working vehicle 1 (CLT) (specifically, after the attachment 30 is considered demounted), completes the mount history 321 which is information obtained when the attachment 30 was mounted and its associated action history 322, and prepares a demount history 324 of the attachment 30 which is now a demounted attachment 30b. For details of the writing of the demount date-and-time 324a and the demount location 324b of the demount history 324 and the like, reference should be made to the details of the preparation (writing) of the demount history 324 of the per-attachment telematics information 300A.

The telematics service user or the like is provided with per-working-vehicle telematics information 300B including an attachment usage history 320 prepared (updated) by updating a mount history 321 and its action history 322 or prepared by preparing different mounted histories 321 and action histories 322 as the time for which the attachment 30 is used and the number of times the attachment 30 is used increase. This allows the user or the like to, for example, predict the time of maintenance and the remaining service life of the working vehicle 1.

The telematics information 300 may be prepared by a telematics service user, a telematics service provider, and/or the like using the user interface 26, the SU terminal device 80, the SP terminal device 90, and/or the like. In such a case, the server 110, upon receipt of each piece of attachment information 220A, may store the piece of attachment information 220A to collect pieces of attachment information 220A, and, in response to the operation by the telematics service user, the telematics service provider, or the like of the user interface 26, the SU terminal device 80, the SP terminal device 90 or the like to prepare telematics information 300, transmit one of the collected pieces of attachment information 220A that corresponds to the request to the user interface 26, the SU terminal device 80, the SP terminal device 90, or the like.

Note that, if a user wishes to obtain whereabouts information about each attachment 30 not in use, it is only necessary for the user to receive per-attachment telematics information 300A including not-in-use (demounted) attachment whereabouts information 313. With regard to the per-working vehicle telematics information 300B, by obtaining not-in-use (demounted) attachment whereabouts information 323 which is a collection of one or more demount histories 324 of one or more demounted attachments 30b in the vicinity of the working vehicle 1, it is possible to provide the user or the like with the telematics information 300B as piece(s) of whereabouts information of one or more attachments 30 which are stored at different locations and which are mountable to the working vehicle 1.

The controller 21 (information processor 21b), for example, causes the communicator 24 to transmit vehicle information 220V including vehicle position information 230 (periodic vehicle information 220Vp) to the server 110 at predetermined interval(s) Pb during a period during which no attachments 30 are mounted on the working vehicle 1 (a period from when a demount notification 226b is transmitted to when a mount notification 226a is transmitted, described earlier). The server 110 stores the periodic vehicle information 220Vp received during this period as the whereabouts information 350 of the working vehicle 1 with no attachments mounted thereon (see FIG. 16 etc.), independently of the attachment-related telematics information 300 shown in FIGS. 20 and 21.

In a first aspect, a telematics service system (TSS) 100 includes a working vehicle 1, an attachment 30 mountable to and demountable from the working vehicle 1, a beacon transmitter 33 (transmitter) provided in or on the attachment 30 to transmit an advertise signal 200 which is a wireless signal compliant with a near field communication standard, a beacon scanner 23 (first communicator) and/or a receiver (or beacon scanner) 82 (first communicator) to receive the advertise signal 200 transmitted from the beacon transmitter 33, a communicator 24 (second communicator) and/or a communicator 85 (second communicator) to transmit attachment information 220A including an attachment ID 224 which is identification information about the attachment 30, a server 110 to receive the attachment information 220A transmitted from the communicator 24 and/or the communicator 85 and manage the attachment information 220A as telematics information 300, and a controller 21 (information processor 21b) and/or CPU 81 to acquire the attachment ID 224 from the advertise signal 200 received by the beacon scanner 23 or the receiver 82, include the attachment ID 224 into the attachment information 220A, and cause the communicator 24 and/or the communicator 85 to transmit the attachment information 220A to the server 110. The controller 21 (information processor 21b) and/or the CPU 81 is configured or programmed to, in response to an operation to mount the attachment 30 to the working vehicle 1, determine whether or not the attachment 30 is in a mounted state in which the attachment 30 is considered mounted to the working vehicle 1, and, upon determining that the attachment 30 is in the mounted state, prepare a mount notification 226a indicating that the attachment 30 is in the mounted state and cause the communicator 24 and/or the communicator 85 to transmit the mount notification 226a to the server 110. The controller 21 (information processor 21b) and/or the CPU 81 is configured or programmed to, in response to an operation to demount the attachment 30 from the working vehicle 1, determine whether or not the attachment 30 is in a demounted state in which the attachment 30 is considered demounted from the working vehicle 1, and, upon determining that the attachment 30 is in the demounted state, prepare a demount notification 226b indicating that the attachment 30 is in the demounted state and cause the communicator 24 and/or the communicator 85 to transmit the demount notification 226b to the server 110.

With the TSS 100 having the above configuration, under the circumstances in which one or more attachments 30 in the vicinity (within the range that can be reached by wireless signals compliant with a near field communication standard) of the working vehicle 1 include respective beacon transmitters 33 (transmitters) to transmit advertise signals 200, the server 110 can easily and efficiently manage telematics information 300 (such as one or more action histories and whereabouts information of attachment(s) not in use) based on piece(s) of attachment information 220A including attachment ID(s) 224 of attachment(s) 30 that has/have been prepared by the controller 21 (information processor 21b) and/or the CPU 81 based on the advertise signal(s) 200 and transmitted from the communicator 24 and/or communicator 85. The server 110 can widely provide the telematics information 300 to consumers such as users and service providers remote from the working vehicle 1 and the attachment(s) 30 etc., which is very advantageous. Furthermore, the server 110 can, when an operation to mount the attachment 30 to the working vehicle 1 or demount the attachment 30 from the working vehicle 1 is performed, acquire information about the state of the attachment 30 that has changed due to the operation (mount/demount information 226). This allows the server 110 to efficiently and reliably manage the mount history (histories) 311 and/or 321 and/or the demount history (histories) 314 and/or 324 of attachment(s) 30 as the telematics information 300. Furthermore, since the server 110 can acquire a mount notification 226a when an attachment 30 is mounted to the working vehicle 1, the server 110 can efficiently and reliably manage the mount history (histories) 311 and/or 321 of the attachment(s) 30 as the telematics information 300. Furthermore, since the server 110 can acquire a demount notification 226b when the attachment 30 is demounted from the working vehicle 1, the server 110 can efficiently and reliably manage the demount history (histories) 314 and/or 324 of the attachment(s) 30 as the telematics information 300.

The controller 21 (information processor 21b) and/or the CPU 81 may be configured or programmed to cause the communicator 24 and/or the communicator 85 to transmit the attachment information 220A to the server 110 at one or more predetermined intervals Pa or at one or more predetermined intervals Pb. The controller 21 (information processor 21b) and/or the CPU 81 may be configured or programmed to, upon preparing the mount notification 226a or the demount notification 226b, cause the communicator 24 and/or the communicator 85 to transmit the mount notification 226a or the demount notification 226b to the server 110 independently of the one or more predetermined intervals Pa or the one or more predetermined intervals Pb.

With the above configuration, for example, during a period during which the working vehicle 1 is provided with an attachment 30 (a period during which the attachment 30 is in the mounted state), the server 110 can recognize the attachment 30 as being mounted on the working vehicle 1 based on the attachment information 220A received at predetermined interval(s) Pa, and, if the attachment information 220A includes vehicle position information 230, the server 110 can include, into the telematics information, the record of movement of the mounted attachment 30a and of the working vehicle 1 provided with the attachment 30 etc. On the other hand, the server 110 can acquire a mount notification 226a when an attachment 30 is mounted to the working vehicle 1, and acquire a demount notification 226b when the attachment 30 is demounted from the working vehicle 1. This makes it possible to efficiently and reliably manage the mount history (histories) 311 and/or 321 of attachment(s) 30 as the telematics information 300.

The server 110 may be operable to, upon receipt of (i) the mount notification 226a or the demount notification 226b not indicating the attachment ID 224 and (ii) the attachment information 220A not including the mount notification or the demount notification, associate the mount notification 226a or the demount notification 226b with the attachment ID 224 included in the attachment information 220A if a vehicle ID 223 indicated by the mount notification 226a or the demount notification 226b is determined to match a vehicle ID 223 indicated by the attachment information 220A, and include the mount notification 226a or the demount notification 226b into the telematics information 300 and manage the telematics information 300 including the mount notification 226a or the demount notification 226b.

With the above configuration, even under the circumstances in which the server 110 receives the mount notification 226a (or the demount notification 226b) and the attachment information 220A including the attachment ID 224 separately from each other, the server 110 can store the received attachment ID 224 and the mount notification 226a such that they are associated with each other, by determining that the vehicle ID 223 indicated by the mount notification 226a (or the demount notification 226b) is the same as the vehicle ID 223 indicated by the attachment information 220A. With this, it is possible to update the action history (histories) 312 and/or 322 etc. upon each receipt of the in-action/not-in-action attachment information 220Aw. Furthermore, the server 110 can, by associating the demount notification 226b with the stored attachment ID 224 instead of the mount notification 226a upon receipt of the demount notification 226b and storing the demount notification 226b associated with the stored attachment ID 224, provide the whereabouts information of the attachment 30 not in use that corresponds to the attachment ID 224 associated with the demount notification 226b.

The controller 21 (information processor 21b) and/or the CPU 81 may be configured or programmed to, upon determining that the attachment 30 is in the mounted state, cause the communicator 24 and/or the communicator 85 to transmit mounted attachment information 220Aa to the server 110, the mounted attachment information 220Aa being the attachment information that includes the mount notification 226a and the attachment ID 224 about the attachment 30 (mounted attachment 30a) determined as being in the mounted state. The controller 21 (information processor 21b) and/or the CPU 81 may be configured or programmed to, upon determining that the attachment 30 is in the demounted state, cause the communicator 24 and/or the communicator 85 to transmit demounted attachment information 220Ad to the server 110, the demounted attachment information 220Ad being the attachment information that includes the demount notification 226b and the attachment ID 224 about the attachment 30 (demounted attachment 30b) determined as being in the demounted state.

With the above configuration, since the server 110 can acquire mounted attachment information 220Aa including both the mount notification 226a and the attachment ID 224 when the attachment 30 is mounted to the working vehicle 1, the server 110 can efficiently and reliably associate the mount notification 226a with the attachment ID 224 about the mounted attachment 30a and manage the mount history (histories) 311, 321 of the attachment 30 as the telematics information 300. Furthermore, since the server 110 can acquire demounted attachment information 220Ad including both the demount notification 226b and the attachment ID 224 when the attachment 30 is demounted from the working vehicle 1, the server 110 can efficiently and reliably associate the demount notification 226b with the attachment ID 224 about the demounted attachment 30b and manage the demount history (histories) 314, 324 of the attachment 30 as the telematics information 300.

The controller 21 (information processor 21b) and/or the CPU 81 may be configured or programmed to periodically determine, during a period from when the mount notification 226a is prepared to when the demount notification 226b is prepared, whether or not the mounted attachment 30a is in action to perform work, prepare in-action/not-in-action information 227 indicating that the mounted attachment 30a is in action or not in action, and cause the communicator 24 and/or the communicator 85 to transmit in-action/not-in-action attachment information 220Aw to the server 110, the in-action/not-in-action attachment information 220Aw being the attachment information that includes the in-action/not-in-action information 227 and the attachment ID 224 about the mounted attachment 30a.

With the above configuration, the server 110 acquires in-action/not-in-action attachment information 220Aw including in-action/not-in-action information 227 during a period from when the server 110 acquires a mount notification 226a (mounted attachment information 220Aa) to when the server 110 acquires a demount notification 226b (demounted attachment information 220Ad), thus managing the action history (histories) 312 and/or 322 of the attachment 30 mounted on the working vehicle 1 (mounted attachment 30a) as the telematics information 300.

The attachment 30 may include a vibration sensor (vibration detector) 34. The beacon transmitter 33 may be operable to transmit the advertise signal 200 including vibration information 205 which is information about vibration of the attachment 30 detected by the vibration sensor 34. The controller 21 (information processor 21b) and/or the CPU 81 may be configured or programmed to determine whether or not the attachment 30 is in action to perform work based on the vibration information 205 included in the advertise signal 200 received by the beacon scanner 23.

With the above configuration, the controller 21 (information processor 21b) and/or the CPU 81 determines whether or not the attachment 30 is in action using vibration information 205 based on the result of detection by the vibration sensor 34 of the vibration of the mounted attachment 30a itself, instead of the vibration of the working vehicle 1. This makes it possible to more accurately recognize the action state of the mounted attachment 30a than, for example, estimating the action state of the mounted attachment 30a by detecting the action state of the working vehicle 1, and prepare in-action/not-in-action information 227 or in-action/not-in-action attachment information 220Aw. This makes it possible to improve the reliability of the telematics information 300 including the action history (histories) 312, 322 prepared and managed by the server 110.

The attachment 30 may include an AUX actuator 36. The TSS 100 may further include an AUX mode switch 28 or an AUX drive switch 29 which is an actuator operator to be operated to control a drive state of the AUX actuator 36 when the attachment 30 is in the mounted state. The controller 21 (information processor 21b) and/or the CPU 81 may be configured or programmed to determine whether or not the attachment 30 (i.e., AUX actuator 36) is action to perform work, based on an operation state of the AUX mode switch 28 or the AUX drive switch 29.

With the above configuration, in the case where the mounted attachment 30a is an AUX attachment 30X including an AUX actuator 36, the controller 21 (information processor 21b) and/or the CPU 81 detects the operation state of the AUX mode switch 28 or the AUX drive switch 29 for control of the drive state of the AUX actuator 36, and determines whether the attachment 30 is in action. This makes it possible to more accurately recognize the action state of the mounted attachment 30a than, for example, estimating the action state of the mounted attachment 30a by detecting the action state of the working vehicle 1, and prepare in-action/not-in-action information 227 or in-action/not-in-action attachment information 220Aw. This makes it possible to improve the reliability of the telematics information 300 including the action history (histories) 312, 322 prepared and managed by the server 110.

The server 110 may be operable to prepare and/or update an action history 312 and/or action history 322 relating to one or more acting points in time and/or one or more acting periods at and/or during which the attachment 30 was acting, by collecting one or more pieces of the in-action/not-in-action attachment information 220W received from the communicator 24 and/or the communicator 85, and include the action history 312 and/or the action history 322 into the telematics information 300 (300A and/or 300B).

With the above configuration, the TSS 100 can provide consumers such as telematics service users and telematics service providers with the telematics information 300 including action history (histories) 312 and/or 322. The consumers can, for example, predict the remaining service life and the time of maintenance of the attachment 30 based on the provided telematics information 300.

The server 110 may be operable to manage one or more of the action histories 312 and/or action histories 322 of respective one or more of the attachments 30. The server 110 may store one or more pieces of working vehicle information (one or more vehicle IDs included in a registered vehicle ID list 111) relating to one or more registered working vehicles 1, and manage the one or more action histories 312 and/or one or more action histories 322 of the one or more attachments 30 on a per piece of working vehicle information basis.

With the above configuration, for example, under the circumstances in which there are one or more attachments 30 in the vicinity (defined as described earlier) of the working vehicle 1, the action history (histories) 312 and/or 322 of the one or more attachments 30 is/are managed such that, for example, action history (histories) 312 and/or 322 is/are updated every time one of the one or more attachments 30 is mounted to the working vehicle 1 and actuated for work. This makes it possible for the TSS 100 to provide consumers such as telematics service users and telematics service providers with the telematics information 300 including action history (histories) 312 and/or 322 about each attachment 30. This also makes it possible for the consumers to, for example, predict the remaining service life and the time of maintenance of each attachment 30 based on the provided telematics information 300. Furthermore, with the above configuration, in the case where, for example, one or more working vehicles 1 owned by a telematics service user are registered, the user acquires the action history (histories) 312 and/or 322 of one or more attachments 30 about each of the one or more working vehicles 1 managed by the server 110. With this, the user can check the record of action of each attachment 30 mounted to the one or more working vehicles 1 and the record of action of each working vehicle 1 having the one or more attachments 30 mounted thereon. The user can, for example, predict not only the remaining service life and the time of maintenance etc. of each attachment 30, but also the remaining service life and the time of maintenance etc. of each working vehicle 1, based on the records.

In a second aspect, a telematics service system (TSS) 100 includes a working vehicle 1 including a position detector 25 to detect a position of the working vehicle 1, an attachment 30 mountable and demountable to and from the working vehicle 1, a beacon transmitter 33 (transmitter) provided in or on the attachment 30 to transmit an advertise signal 200 which is a wireless signal compliant with a near field communication standard, a beacon scanner 23 (first communicator) and/or a receiver 82 (first communicator) to receive the advertise signal 200 from the beacon transmitter 33, a communicator 24 (second communicator) and/or a communicator 85 (second communicator) to transmit attachment information 220A including an attachment ID 224 which is identification information about the attachment 30, a server 110 to receive the attachment information 220A from the communicator 24 and/or the communicator 85 and manage the attachment information 220A as telematics information 300, and a controller 21 (information processor 21b) and/or a CPU 81 to acquire the attachment ID 224 from the advertise signal 200 received by the beacon scanner 23 and/or the receiver 82, include the attachment ID 224 into the attachment information 220A, and cause the communicator 24 and/or the communicator 85 to transmit the attachment information 220A to the server 110. The controller 21 (information processor 21b) and/or the CPU 81 is configured or programmed to, in response to an operation to demount the attachment 30 from the working vehicle 1, determine whether or not the attachment 30 is in a demounted state in which the attachment 30 is considered demounted from the working vehicle 1, and, upon determining that the attachment 30 is in the demounted state, prepare a demount notification 226b indicating that the attachment 30 is in the demounted state, and cause the communicator 24 and/or the communicator 85 to transmit, to the server 110, (i) demounted attachment information 220Ad which is the attachment information that includes the demount notification 226b and the attachment ID 224 about the attachment 30 (demounted attachment 30b) determined as being in the demounted state and (ii) vehicle position information 230 relating to a position of the working vehicle 1 that was determined by the position detector 25 at a first point in time at which the attachment 30 was determined as being in the demounted state or a second point in time near the first point in time. The server 110 is operable to, upon receipt of the demounted attachment information 220Ad and the vehicle position information 230, associate the vehicle position information 230 with the attachment ID 224 included in the demounted attachment information 220Ad, and include the vehicle position information 230, as whereabouts information 313 and/or 323 of the demounted attachment 30b, into the telematics information 300.

With the configuration, under the circumstances in which the current position of the attachment 30 detached from the working vehicle 1 cannot be determined based on the advertise signal 200 from the attachment 30, the server 110 can include, into the telematics information 300, the vehicle position information 230 acquired together with the demounted attachment information 220Ad, as the whereabouts information 313 and/or 323 of the demounted attachment 30b. Furthermore, the server 110 can provide consumers such as telematics service users and telematics service providers with such telematics information 300 including the whereabouts information 313 and/or 323. Therefore, the consumer can know, for example, where the attachment 30 not in use is stored, and to where the consumer should move the working vehicle 1 when mounting the attachment 30 to the working vehicle 1, based on the provided telematics information 300.

The server 110 may be operable to manage one or more demount histories 314 and/or 324 of respective one or more of the attachments 30 based on the demounted attachment information 220Ad and the vehicle position information 230 received from the communicator 24 and/or the communicator 85, each of the one or more demount histories 314 and/or 324 including demount date-and-time 314a or 324a which is a point in time at which a corresponding one of the one or more attachments 30 was placed in the demounted state and/or a demount location 314b or 324b which is the whereabouts information of the corresponding one of the one or more attachments 30. The server 110 may be operable to manage the one or more demount histories 314 and/or 324 of the respective one or more attachments 30 on a per piece of working vehicle information (vehicle ID included in a registered vehicle ID list 111) basis, the piece of working vehicle information relating to a registered working vehicle 1.

With the configuration, the server 110 can manage, as the demount history (histories) 314 and/or 324 of each attachment 30, the point in time (demount date-and-time) 314*a* or 324*a* and/or the demount location 314*b*, 324*b* obtained upon each receipt of the demounted attachment information 220Ad. This makes it possible for the server 110 to provide, for example, the whereabouts information 313 and/or 323 of one or more attachments 30 currently in the demounted state. In addition, for example, it is possible for the server 110 to provide the user etc. who wishes to know the past storage conditions etc. of the attachment 30 with the telematics information 300 including the whereabouts information etc. of the attachment 30 that was obtained when the attachment 30 was in the demounted state. Furthermore, with the above configuration, for example, the user acquires one or more demount histories 324 of one or more attachments 30 about each of the one or more working vehicles 1 managed by the server 110. With this, the user can also know where currently are the one or more attachments 30 in the demounted state mountable to the working vehicle 1, and where the one or more attachments 30 were stored when not mounted on any of the one or more working vehicles 1, regarding each working vehicle 1.

The controller 21 (information processor 21*b*) and/or the CPU 81 may be configured or programmed to, in response to an operation to mount the attachment 30 to the working vehicle 1, determine whether or not the attachment 30 is in a mounted state in which the attachment 30 is considered mounted to the working vehicle 1, and, upon determining that the attachment 30 is in the mounted state, prepare a mount notification 226*a* indicating that the attachment 30 is in the mounted state and cause the communicator 24 and/or the communicator 85 to transmit mounted attachment information 220Aa to the server 110, the mounted attachment information 220Aa being the attachment information that includes the mount notification 226*a* and the attachment ID 224 about the attachment 30 (mounted attachment 30*a*) determined as being in the mounted state. The server 110 may be operable to, upon receipt of mounted attachment information 220Aa about a certain attachment 30 which is the same as the demounted attachment 30*b* identified by the attachment ID 224 included in the demounted attachment information 220Ad associated with the vehicle position information 230 which is the whereabouts information 313 and/or 323 of the demounted attachment 30*b*, dissociate the vehicle position information 230 from the attachment ID 224 of the demounted attachment 30*b* in the telematics information.

The above configuration achieves the following. The attachment 30, once mounted to the working vehicle 1, moves as the working vehicle 1 moves. In this regard, the vehicle position information 230, as the whereabouts information 313 and/or 323 of the attachment 30 that was in the demounted state, is dissociated from the attachment ID 224. Therefore, for example, when the working vehicle 1 having the attachment 30 mounted thereon moves, the server 110 can associate vehicle position information 230 relating to the actual vehicle position determined by the currently moving position detector 25 with the attachment ID 224, making it possible to improve the reliability etc. of the action history 312, 322 etc. including the position information of the currently moving working vehicle 1.

In a third aspect, a telematics service system (TSS) 100 includes a working vehicle 1, an attachment 30 mountable to and demountable from the working vehicle 1, a beacon transmitter 33 (transmitter) provided in or on the attachment 30 to transmit an advertise signal 200 which is a wireless signal compliant with a near field communication standard, a beacon scanner 23 (first communicator) and/or a receiver 82 (first communicator) to receive the advertise signal 200 transmitted from the transmitter 33, a communicator 24 (second communicator) and/or a communicator 85 (second communicator) to transmit attachment information 220A including an attachment ID 224 which is identification information about the attachment 30, a server 110 to receive the attachment information 220A transmitted from the communicator 24 and/or the communicator 85 and manage the attachment information 220A as telematics information 300, and a controller 21 (information processor 21*b*) and/or a CPU 81 to acquire the attachment ID 224 from the advertise signal 200 received by the beacon scanner 23 and/or the receiver 82, include the attachment ID 224 into the attachment information 220A, and cause the communicator 24 and/or the communicator 85 to transmit the attachment information 220A to the server 110. The controller 21 (information processor 21*b*) and/or the CPU 81 is configured or programmed to, in response to an operation to mount the attachment 30 to the working vehicle 1, determine whether or not the attachment 30 is in a mounted state in which the attachment 30 is considered mounted to the working vehicle 1, and, upon determining that the attachment 30 is in the mounted state, cause the communicator 24 and/or the communicator 85 to transmit, to the server 110, a mount notification 226*a* indicating that the attachment 30 is in the mounted state. The controller 21 (information processor 21*b*) and/or the CPU 81 is configured or programmed to, in response to an operation to demount the attachment 30 from the working vehicle 1, determine whether or not the attachment 30 is in a demounted state in which the attachment 30 is considered demounted from the working vehicle 1, and, upon determining that the attachment 30 is in the demounted state, cause the communicator 24 and/or the communicator 85 to transmit, to the server 110, a demount notification 226*b* indicating that the attachment 30 is in the demounted state. The controller 21 (information processor 21*b*) and/or the CPU 81 is configured or programmed to, during a period from when the mount notification 226*a* is transmitted to when the demount notification 226*b* is transmitted, cause the communicator 24 and/or the communicator 85 to transmit, to the server 110, the attachment information 220A including the attachment ID 224 of the attachment 30 (mounted attachment 30*a*) determined as being in the mounted state. The server 110 is operable to, upon receipt of the mount notification 226*a*, prepare an action history 312 and/or an action history 322 about the mounted attachment 30*a*, and update the action history 312 and/or the action history 322 based on the attachment information 220A received during a period from when the mount notification 226*a* is received to when the demount notification 226*b* is received.

With the above configuration, the server 110 can, after receiving the mount notification 226*a*, recognize that the attachment 30 is mounted on the working vehicle 1 by receiving the attachment information 220A, as long as the server 110 does not receive the demount notification 226*b*. The attachment 30 mounted on the working vehicle 1 can be basically regarded as being in action to perform work. The server 110 can update the action history (histories) 312 and/or 322 by a simple method such as updating the total time 312*e* and/or 322*e* upon each receipt of attachment information 220A to provide, as information relating to the latest state of the attachment 30, the telematics information 300 (300A and/or 300B) including the updated action history (histories) 312 and/or 322. Furthermore, the controller 21 (information processor 21b) and/or the CPU 81 do/does not need to, before the transmission of the attachment information 220A, perform the process of determining whether the attachment 30 is in action and including information relating to the result of the determination into the attachment information 220A to be transmitted. The controller 21 (information processor 21b) and/or the CPU 81 may simply provide the server 110 with information for update of the action history (histories) 312 and/or 322 without performing the above process.

The controller 21 (information processor 21b) and/or the CPU 81 may be configured or programmed to cause the communicator 24 and/or the communicator 85 to transmit, to the server 110 at one or more predetermined intervals Pa, the attachment information 220A including the attachment ID 224 of the mounted attachment 30a, during the period from when the mount notification 226a is transmitted from the communicator 24 and/or the communicator 85 to the server 110 to when the demount notification 226b is transmitted from the communicator 24 and/or the communicator 85 to the server 110.

With the above configuration, the server 110 can periodically receive the attachment information 220A about the mounted attachment 30a and regularly update the action history (histories) 312 and/or 322.

The controller 21 (information processor 21b) and/or the CPU 81 may be configured or programmed to, during the period from when the mount notification 226a is transmitted from the communicator 24 and/or the communicator 85 to the server 110 to when the demount notification 226b is transmitted from the communicator 24 and/or the communicator 85 to the server 110, check an action state of the mounted attachment 30a, and, upon recognizing a change in a state of the attachment 30, prepare change-to-acting information 228a or change-to-non-acting information 228b which is state change information 228 relating to the change in the state and cause the communicator 24 and/or the communicator 85 to transmit the state change information 228 to the server 110 independently of the one or more predetermined intervals Pa, the change in the state being a change in which the attachment 30 in action stopped acting or the attachment 30 not in action started acting. The server 110 may be operable to update the action history 312 and/or the action history 322 based on the attachment information 220A and the state change information 228 received from the communicator 24 and/or the communicator 85.

With the above configuration, the controller 21 (information processor 21b) and/or the CPU 81 do/does not need to, before the transmission of each attachment information 220A, perform the process of determining whether the mounted attachment 30a is in action and including the result of the determination (in-action/not-in-action information 227) into the attachment information 220A. The controller 21 (information processor 21b) and/or the CPU 81 may simply provide the server 110 periodically with attachment information 220A for update of the action history (histories) 312 and/or 322. The controller 21 (information processor 21b) and/or the CPU 81 determines whether the mounted attachment 30a is in action, during the period from when the mount notification 226a is transmitted to when the demount notification 226b is transmitted. However, with regard to the result of the determination, the controller 21 (information processor 21b) and/or the CPU 81 may prepare state change information 228 (change-to-acting information 228a or change-to-non-acting information 228b) only when it is determined that the action state has changed, and transmit the state change information 228 to the server 110 separately from the attachment information 220A. Therefore, the server 110 can reflect information relating to the change in the state on the action history (histories) 312 and/or 322 included in the telematics information 300 (300A and/or 300B) without delay from the occurrence of the change in the action state of the mounted attachment 30a.

In each of the first to third aspects, the TSS 100 may further include a user interface 26 and/or an input/output interface 84 to be operated by an operator to change an attachment ID 203 included in the advertise signal 200 received by the beacon scanner 23 and/or the receiver 82. The controller 21 (information processor 21b) and/or the CPU 81 may be configured or programmed to, in response to an operation to change the attachment ID 203 via the user interface 26 and/or the input/output interface 84, modify the attachment ID 203 included in the advertise signal 200 so that an attachment ID 203a which is the modified identification information is used as the attachment ID 224 which is identification information included in the attachment information 220A.

With the configuration, for example, in the case where the user wishes to assign some information such as a nickname to each of one or more of attachments 30 indicated by the telematics information 300 to easily identify each of the one or more attachments 30, the user can operate the user interface 26 and/or the input/output interface 84 to change the attachment ID 203, thus causing the controller 21 (information processor 21b) and/or the CPU 81 to regard the changed attachment ID 203 as the attachment ID 224 and cause the communicator 24 and/or the communicator 85 to transmit, to the server 110, the attachment information 220A including the attachment ID 224. The server 110 can provide telematics information 300 that includes the information intended by the user.

In each of the first to third aspects, the TSS 100 may further include a memory and/or storage 83, 22 to store an attachment list 210 of one or more of the attachments 30 and one or more attachment IDs 211 which are one or more pieces of the identification information about the one or more attachments 30 included in the attachment list 210, and a user interface 26 and/or an input/output interface 84 which is an input interface (selector) to be operated to select one of the one or more attachments 30 and a corresponding one of the one or more attachment IDs 211 from the attachment list 210 stored in the memory and/or storage 83, 22. The controller 21 (information processor 21b) and/or the CPU 81 may be configured or programmed to, if the beacon scanner 23 and/or the receiver 82 has not received any advertise signals 200 including an attachment ID 203, cause the communicator 24 and/or the communicator 85 to transmit, to the server 110, the attachment information 220A including an attachment ID 211 (as the attachment ID 224) about one of the one or more attachments 30 selected from the attachment list 210 by an operation via the user interface 26 and/or the input/output interface 84.

With the above configuration, the controller 21 (information processor 21b) and/or the CPU 81 can prepare the attachment ID 224 using either the advertise signal 200 received from the attachment 30 or the content (input information) selected by the operator's operation on the user interface 26 and/or the input/output interface 84 from the attachment list 210. Therefore, it is possible for the communicator 24 and/or the communicator 85 to more reliably transmit attachment information 220A which is to be included in the telematics information 300 to the server 110.

Furthermore, even in cases where the beacon transmitter 33 does not transmit advertise signals 200 due to, for example, a failure or dead battery, the controller 21 (information processor 21*b*) and/or the CPU 81 can acquire the attachment ID 211 (224) which is selected by the operator's operation on the user interface 26 and/or the input/output interface 84 from the attachment list 210 and cause the communicator 24 and/or the communicator 85 to reliably provide the server 110 with the attachment information 220A.

The TSS 100 may further include a user interface 26 and/or an input/output interface 84 as a display. The controller 21 (selection prompter 21*c*) and/or the CPU 81 may be configured or programmed to, if the beacon scanner 23 and/or the receiver 82 has not received any advertise signals 200 including an attachment ID 203, cause the user interface 26 and/or the input/output interface 84 to output a prompt asking for an operation of the user interface 26 and/or the input/output interface 84 as the input interface and a selection of one of the one or more attachments 30 from the attachment list 210.

With the above configuration, in cases where the beacon transmitter 33 does not transmit advertise signals 200 due to, for example, a failure or dead battery, the controller 21 (selection prompter 21*c*) and/or the CPU 81 can output a prompt asking for the operation of the user interface 26 and/or the input/output interface 84 to select one of the one or more attachments 30. This makes it possible to more reliably allow the operator, who sees the prompt, to select one attachment 30 using the user interface 26 and/or the input/output interface 84.

The TSS 100 may further include a user interface 26 and/or an input/output interface 84 as a display. The memory and/or storage 83, 22 may store pieces of image data 212 of a plurality of the attachments 30. The controller 21 (information processor 21*b*) and/or the CPU 81 may be configured or programmed to read a piece of image data 212 of the attachment 30 corresponding to the attachment ID 224 included in the attachment information 220A from the storage 22, and cause the user interface 26 to display an image based on the read piece of image data 212.

With the above configuration, once the attachment ID 224 to be included into the attachment information 220A has been determined based on, for example, the attachment ID 203 included in the advertise signal 200, the image of the attachment 30 corresponding to the attachment ID 224 can be displayed by the user interface 26 and/or the input/output interface 84. This makes it possible for the operator, who sees the image of the attachment 30 displayed by the interface 26 and/or the input/output interface 84 and knows the type and/or the like of the attachment 30 mounted on the working vehicle 1, to appropriately operate the working vehicle 1 and/or the mounted attachment 30*a* for work and/or the like.

In each of the first to third aspects, the TSS 100 may further include a terminal device (SU terminal device 80 and/or SP terminal device 90) to receive the telematics information 300 transmitted from the server 110. The working vehicle 1 may include the beacon scanner 23 (first communicator) and the communicator 24 (second communicator). The server 110 may be operable to store pieces of image data 315 of a plurality of the attachments 30, select, from the pieces of image data 315 of the plurality of attachments 30, a piece of image data 315 of the attachment 30 corresponding to the attachment ID 224 included in the attachment information 220A received from the communicator 24, and include the selected piece of image data 315 into the telematics information 300. The terminal device (SU terminal device 80 and/or SP terminal device 90) may be operable to display an image based on the piece of image data 315 included in the telematics information 300 transmitted from the server 110.

With the above configuration, the user of the terminal device (SU terminal device 80 and/or SP terminal device 90) can see the telematics information 300 displayed on the terminal device in association with the image of the attachment 30 displayed on the same terminal device. Furthermore, even when the terminal device is remote from the working vehicle 1 and the attachment 30, the user can easily and clearly know the telematics information 300 about the attachment 30 mounted on the working vehicle 1 or the attachment 30 not mounted on the working vehicle 1.

In a fourth aspect, a telematics service system (TSS) 100 includes a working vehicle 1, an attachment 30 mountable to and demountable from the working vehicle 1, a beacon transmitter 33 (transmitter) provided in or on the attachment 30 to transmit an advertise signal 200 which is a wireless signal compliant with a near field communication standard, a beacon scanner 23 (first communicator) and/or a receiver 82 (first communicator) to receive the advertise signal 200 transmitted from the beacon transmitter 33, a communicator 24 (second communicator) and/or a communicator 85 (second communicator) to transmit vehicle information 220V (first information) and/or attachment information 220A (first information) including a vehicle ID 223 about the working vehicle 1, a server 110 to receive the vehicle information 220V and/or attachment information 220A transmitted from the communicator 24 and/or the communicator 85 and manage the vehicle information 220V and/or attachment information 220A as telematics information 300, and a controller 21 (information processor 21*b*) and/or a CPU 81 to cause the communicator 24 and/or the communicator 85 to transmit the vehicle information 220V and/or attachment information 220A to the server 110. The controller 21 (information processor 21*b*) and/or the CPU 81 is configured or programmed to prepare a mount notification 226*a* or a demount notification 226*b* in response to an operation to mount the attachment 30 to the working vehicle 1 or an operation to demount the attachment 30 from the working vehicle 1, and cause the communicator 24 and/or the communicator 85 to transmit, to the server 110, (i) the vehicle information 220V and/or the attachment information 220A with the mount notification 226*a* or the demount notification 226*b* therein or thereon and (ii) an attachment ID 224 about the attachment 30 acquired from the advertise signal 200 received by the beacon scanner 23 and/or the receiver 82. The server 110 is operable to associate the mount notification 226*a* or the demount notification 226*b* in or on the received vehicle information 220V and/or attachment information 220A with the vehicle ID 223 and the attachment ID 224, and include the mount notification 226*a* or the demount notification 226*b* into the telematics information 300.

With the above configuration, the server 110 associates the mount notification 226*a* or the demount notification 226*b*, which is in or on the vehicle information 220V and/or the attachment information 220A received from the communicator 24 and/or the communicator 85, with the vehicle ID 223 and the attachment ID 224, and include it into the telematics information 300. This makes it possible to reliably identify working vehicle(s) 1 provided with an attachment 30, working vehicle(s) 1 provided with no attachments 30, attachment(s) 30 mounted on working vehicle(s) 1, and attachment(s) 30 not mounted on any working vehicle 1, and provide them as telematics information 300 to the user.

The controller 21 (information processor 21*b*) and/or the CPU 81 may be configured or programmed to cause the communicator 24 and/or the communicator 85 to transmit, to the server 110 at one or more predetermined intervals Pa or one or more predetermined intervals Pb, the vehicle information 220V and/or attachment information 220A with no mount notifications 226*a* or demount notifications 226*b*. The controller 21 (information processor 21*b*) and/or the CPU 81 may be configured or programmed to, upon preparing the mount notification 226*a* or the demount notification 226*b*, cause the communicator 24 and/or the communicator 85 to transmit the vehicle information 220V or the attachment information 220A with the mount notification 226*a* or the demount notification 226*b* therein or thereon to the server 110 independently of the one or more predetermined intervals Pa or the one or more predetermined intervals Pb.

With the above configuration, the server 110 can recognize changes over time in the state (e.g., position) of the working vehicle(s) 1 provided with an attachment 30, the working vehicle(s) 1 with no attachments 30, and the attachment(s) 30 mounted on the working vehicle(s) 1 based on the vehicle information 220V and/or the attachment information 220A received at predetermined interval(s) Pa or predetermined interval(s) Pb, and provide them to the user as the telematics information 300. On the other hand, the controller 21 (information processor 21*b*) and/or the CPU 81 can prepare the mount notification 226*a* or the demount notification 226*b* without delay from when it was determined that the attachment 30 was in the mounted state or the demounted state (described later) upon an operation to mount or demount the attachment 30 to or from the working vehicle 1, and transmit the mount notification 226*a* or the demount notification 226*b* to the server 110 without delay from the preparation independently of the predetermined interval(s) Pa. The server 110 therefore can include, into the telematics information 300, accurate temporal information and/or position information (vehicle position information 230 of the working vehicle 1 that can be regarded as the position information of the attachment 30*a*) that was obtained at the point in time at which the attachment 30 was mounted to the working vehicle 1 or the attachment 30 was demounted from the working vehicle 1.

The controller 21 (information processor 21*b*) and/or the CPU 81 may be configured or programmed to, in response to an operation to mount the attachment 30 to the working vehicle 1, determine whether or not the attachment 30 is in a mounted state in which the attachment 30 is considered mounted to the working vehicle 1, and, upon determining that the attachment 30 is in the mounted state, prepare the mount notification 226*a* indicating that the attachment 30 is in the mounted state and cause the communicator 24 and/or the communicator 85 to transmit the vehicle information 220V or the attachment information 220A with the mount notification 226*a* therein or thereon to the server 110.

With the above configuration, the controller 21 (information processor 21*b*) and/or the CPU 81 can prepare the mount notification 226*a* upon determining that the attachment 30 is in the mounted state in response to the operation to mount the attachment 30 to the working vehicle 1, and transmit it to the server 110. This allows the server 110 to reliably associate the temporal information relating to the point in time at which the attachment 30 was mounted to the working vehicle 1 and the position information (vehicle position information 230 of the working vehicle 1 that can be regarded as the position information of the attachment 30*a*) at that point in time etc. with the attachment ID 224 of the attachment 30 in the mounted state and the vehicle ID 223 of the working vehicle 1 having the attachment 30 mounted thereon, and include them into the telematics information 300 and manage them.

The controller 21 (information processor 21*b*) and/or the CPU 81 may be configured or programmed to, upon preparing the mount notification 226*a* in response to the operation to mount the attachment 30 to the working vehicle 1, cause the communicator 24 and/or the communicator 85 to transmit, to the server 110, the attachment information 220A (mounted attachment information Aa) with the mount notification 226*a* and the attachment ID 224 therein or thereon.

With the above configuration, since both the mount notification 226*a* and the attachment ID 224 accompany or are included in a piece of attachment information 220A (mounted attachment information 220Aa), the server 110, upon receiving the attachment information 220A (mounted attachment information 220Aa), can quickly and reliably associate the mount notification 226*a* with the vehicle ID 223 and the attachment ID 224 without having to perform the process of identifying the attachment 30 corresponding to the mount notification 226*a* using information received separately from the mount notification 226*a*, and include the mount notification 226*a* into the telematics information 300.

The controller 21 (information processor 21*b*) and/or the CPU 81 may be configured or programmed to, in response to an operation to demount the attachment 30 from the working vehicle 1, determine whether or not the attachment 30 is in a demounted state in which the attachment 30 is considered demounted from the working vehicle 1, and, upon determining that the attachment 30 is in the demounted state, prepare the demount notification 226*b* indicating that the attachment 30 is in the demounted state and cause the communicator 24 and/or the communicator 85 to transmit the vehicle information 220V or the attachment information 220A with the demount notification 226*b* therein or thereon to the server 110.

With the above configuration, the controller 21 (information processor 21*b*) and/or the CPU 81 can prepare the demount notification 226*b* upon determining that the attachment 30 is in the demounted state in response to the operation to demount the attachment 30 from the working vehicle 1, and transmit it to the server 110. This allows the server 110 to reliably associate the temporal information relating to the point in time at which the attachment 30 was demounted from the working vehicle 1 and the position information (vehicle position information 230 of the working vehicle 1 that can be regarded as the position information of the attachment 30) at that point in time etc. with the attachment ID 224 of the attachment 30 in the demounted state and the vehicle ID 223 of the working vehicle 1 from which the attachment 30 has been demounted, and include them into the telematics information 300 and manage them.

The controller 21 (information processor 21*b*) and/or the CPU 81 may be configured or programmed to, upon preparing the demount notification 226*b* in response to the operation to demount the attachment 30 from the working vehicle 1, cause the communicator 24 and/or the communicator 85 to transmit, to the server 110, the attachment information 220A (demounted attachment information 220Ad) with the demount notification 226*b* and the attachment ID 224 therein or thereon.

With the above configuration, since both the demount notification 226*b* and the attachment ID 224 accompany or are included in a piece of attachment information 220A (demounted attachment information Ad), the server 110, upon receiving the attachment information 220A (demounted attachment information Ad), can quickly and reliably associate the demount notification 226b with the vehicle ID 223 and the attachment ID 224 without having to perform the process of identifying the attachment 30 corresponding to the demount notification 226b using information received separately from the demount notification 226b, and include the demount notification 226b into the telematics information 300.

The controller 21 (information processor 21b) and/or the CPU 81 may be configured or programmed to cause the communicator 24 and/or the communicator 85 to transmit the vehicle information 220V or the attachment information 220A with the demount notification 226b therein or thereon to the server 110, the vehicle information 220V or the attachment information 220A including vehicle position information 230 relating to a position of the working vehicle 1 that was determined at a first point in time at which the attachment 30 was determined as being in the demounted state or a second point in time near the first point in time. The server 110 may be operable to associate the vehicle position information 230 included in the received vehicle information 220V or the attachment information 220A with the attachment ID 224 associated with the demount notification 226b, and include the vehicle position information 230 as whereabouts information of the attachment 30 (demounted attachment 30b) in the demounted state into the telematics information 300 and manage the telematics information 300 including the vehicle position information 230.

With the above configuration, the vehicle position information 230 relating to the position of the working vehicle 1 at the point in time at which the attachment 30 was demounted is used as the whereabouts information of the attachment 30 in the demounted state. The user can be provided, by the server 110, with the whereabouts information of the attachment 30 (demounted attachment 30b) which is, for example, stored and not mounted on any working vehicles 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A telematics service system comprising:
    a working vehicle;
    an attachment mountable to and demountable from the working vehicle;
    a transmitter provided in or on the attachment to transmit a wireless signal compliant with a near field communication standard;
    a first communicator to receive the wireless signal transmitted from the transmitter;
    a second communicator to transmit attachment information including identification information about the attachment;
    a server to receive the attachment information transmitted from the second communicator and manage the attachment information as telematics information; and
    a controller to acquire the identification information from the wireless signal received by the first communicator, include the identification information into the attachment information, and cause the second communicator to transmit the attachment information to the server, wherein
    the controller is configured or programmed to:
        in response to an operation to mount the attachment to the working vehicle, determine whether or not the attachment is in a mounted state in which the attachment is considered mounted to the working vehicle, and, upon determining that the attachment is in the mounted state, prepare a mount notification indicating that the attachment is in the mounted state and cause the second communicator to transmit the mount notification to the server; and
        in response to an operation to demount the attachment from the working vehicle, determine whether or not the attachment is in a demounted state in which the attachment is considered demounted from the working vehicle, and, upon determining that the attachment is in the demounted state, prepare a demount notification indicating that the attachment is in the demounted state and cause the second communicator to transmit the demount notification to the server.

2. The telematics service system according to claim 1, wherein
    the controller is configured or programmed to:
        cause the second communicator to transmit the attachment information to the server at one or more predetermined intervals; and
        upon preparing the mount notification or the demount notification, cause the second communicator to transmit the mount notification or the demount notification to the server independently of the one or more predetermined intervals.

3. The telematics service system according to claim 1, wherein
    the server is operable to:
        upon receipt of (i) the mount notification or the demount notification not indicating the identification information about the attachment and (ii) the attachment information not including the mount notification or the demount notification, associate the mount notification or the demount notification with the identification information about the attachment included in the attachment information if identification information about a working vehicle indicated by the mount notification or the demount notification is determined to match identification information about a working vehicle indicated by the attachment information; and
        include the mount notification or the demount notification into the telematics information and manage the telematics information including the mount notification or the demount notification.

4. The telematics service system according to claim 1, wherein
    the controller is configured or programmed to:
        upon determining that the attachment is in the mounted state, cause the second communicator to transmit mounted attachment information to the server, the mounted attachment information being the attachment information that includes the mount notification and the identification information about the attachment determined as being in the mounted state; and
        upon determining that the attachment is in the demounted state, cause the second communicator to transmit demounted attachment information to the server, the demounted attachment information being the attachment information that includes the demount notification and the identification information about the attachment determined as being in the demounted state.

5. The telematics service system according to claim 1, wherein
the controller is configured or programmed to:
periodically determine, during a period from when the mount notification is prepared to when the demount notification is prepared, whether or not the attachment determined as being in the mounted state is in action to perform work;
prepare in-action/not-in-action information indicating that the attachment determined as being in the mounted state is in action or not in action; and
cause the second communicator to transmit in-action/not-in-action attachment information to the server, the in-action/not-in-action attachment information being the attachment information that includes the in-action/not-in-action information and the identification information about the attachment determined as being in the mounted state.

6. The telematics service system according to claim 5, wherein
the attachment includes a vibration detector,
the transmitter is operable to transmit the wireless signal including vibration information which is information about vibration of the attachment detected by the vibration detector, and
the controller is configured or programmed to determine whether or not the attachment is in action to perform work based on the vibration information included in the wireless signal received by the first communicator.

7. The telematics service system according to claim 5, wherein
the attachment includes an actuator;
the telematics service system further comprises an actuator operator to be operated to control a drive state of the actuator when the attachment is in the mounted state; and
the controller is configured or programmed to determine whether or not the attachment is action to perform work, based on an operation state of the actuator operator.

8. The telematics service system according to claim 6, wherein
the server is operable to:
prepare and/or update an action history relating to one or more acting points in time and/or one or more acting periods at and/or during which the attachment was acting, by collecting one or more pieces of the in-action/not-in-action attachment information received from the second communicator; and
include the action history into the telematics information.

9. The telematics service system according to claim 8, wherein
the server is operable to:
manage one or more of the action histories of respective one or more of the attachments; and
store one or more pieces of working vehicle information relating to one or more registered working vehicles, and manage the one or more action histories of the one or more attachments on a per piece of working vehicle information basis.

10. The telematics service system according to claim 1, further comprising:
an input interface to be operated by an operator to change identification information about the attachment included in the wireless signal received by the first communicator; wherein
the controller is configured or programmed to, in response to an operation to change the identification information via the input interface, modify the identification information about the attachment included in the wireless signal so that the modified identification information is included in the attachment information.

11. The telematics service system according to claim 1, further comprising:
a memory and/or a storage to store a list of one or more of the attachments and one or more pieces of the identification information about the one or more attachments included in the list; and
an input interface to be operated to select one of the one or more attachments and a corresponding one of the one or more pieces of identification information from the list stored in the memory and/or the storage; wherein
the controller is configured or programmed to, if the first communicator has not received any wireless signals including identification information about an attachment, cause the second communicator to transmit, to the server, attachment information including identification information about one of the one or more attachments selected from the list by an operation via the input interface.

12. The telematics service system according to claim 11, further comprising a display, wherein
the controller is configured or programmed to, if the first communicator has not received any wireless signals including identification information about an attachment, cause the display to output a prompt asking for an operation of the input interface and a selection of one of the one or more attachments from the list.

13. The telematics service system according to claim 11, further comprising a display, wherein
the memory and/or the storage stores pieces of image data of a plurality of the attachments; and
the controller is configured or programmed to read a piece of image data of the attachment corresponding to the identification information included in the attachment information from the memory and/or the storage, and cause the display to display an image based on the read piece of image data.

14. The telematics service system according to claim 1, further comprising:
a terminal device to receive the telematics information transmitted from the server; wherein
the working vehicle includes the first communicator and the second communicator;
the server is operable to:
store pieces of image data of a plurality of the attachments;
select, from the pieces of image data of the plurality of attachments, a piece of image data of the attachment corresponding to the identification information included in the attachment information received from the second communicator; and
include the selected piece of image data into the telematics information; and
the terminal device is operable to display an image based on the piece of image data included in the telematics information transmitted from the server.

15. A telematics service system comprising:
a working vehicle including a position detector to detect a position of the working vehicle;
an attachment mountable and demountable to and from the working vehicle;
a transmitter provided in or on the attachment to transmit a wireless signal compliant with a near field communication standard;
a first communicator to receive the wireless signal from the transmitter;
a second communicator to transmit attachment information including identification information about the attachment;
a server to receive the attachment information from the second communicator and manage the attachment information as telematics information; and
a controller to acquire the identification information from the wireless signal received by the first communicator, include the identification information into the attachment information, and cause the second communicator to transmit the attachment information to the server, wherein
the controller is configured or programmed to:
  in response to an operation to demount the attachment from the working vehicle, determine whether or not the attachment is in a demounted state in which the attachment is considered demounted from the working vehicle, and, upon determining that the attachment is in the demounted state, prepare a demount notification indicating that the attachment is in the demounted state; and
  cause the second communicator to transmit, to the server, (i) demounted attachment information which is the attachment information that includes the demount notification and the identification information about the attachment determined as being in the demounted state and (ii) vehicle position information relating to a position of the working vehicle that was determined by the position detector at a first point in time at which the attachment was determined as being in the demounted state or a second point in time near the first point in time; and
the server is operable to, upon receipt of the demounted attachment information and the vehicle position information, associate the vehicle position information with the identification information about the attachment included in the demounted attachment information, and include the vehicle position information, as whereabouts information of the attachment determined as being in the demounted state, into the telematics information.

16. The telematics service system according to claim 15, wherein
the server is operable to:
  manage one or more demount histories of respective one or more of the attachments based on the demounted attachment information and the vehicle position information received from the second communicator, each of the one or more demount histories including a point in time at which a corresponding one of the one or more attachments was placed in the demounted state and/or the whereabouts information of the corresponding one of the one or more attachments; and
  manage the one or more demount histories of the respective one or more attachments on a per piece of working vehicle information basis, the piece of working vehicle information relating to a registered working vehicle.

17. The telematics service system according to claim 15, wherein
the controller is configured or programmed to, in response to an operation to mount the attachment to the working vehicle, determine whether or not the attachment is in a mounted state in which the attachment is considered mounted to the working vehicle, and, upon determining that the attachment is in the mounted state, prepare a mount notification indicating that the attachment is in the mounted state and cause the second communicator to transmit mounted attachment information to the server, the mounted attachment information being the attachment information that includes the mount notification and the identification information about the attachment determined as being in the mounted state; and
the server is operable to, upon receipt of mounted attachment information about a certain attachment which is the same as the attachment determined as being in the demounted state and identified by the identification information included in the demounted attachment information associated with the vehicle position information as the whereabouts information of the attachment determined as being in the demounted state, dissociate the vehicle position information from the identification information of the attachment determined as being in the demounted state in the telematics information.

18. A telematics service system comprising:
a working vehicle;
an attachment mountable to and demountable from the working vehicle;
a transmitter provided in or on the attachment to transmit a wireless signal compliant with a near field communication standard;
a first communicator to receive the wireless signal transmitted from the transmitter;
a second communicator to transmit attachment information including identification information about the attachment;
a server to receive the attachment information transmitted from the second communicator and manage the attachment information as telematics information; and
a controller to acquire the identification information from the wireless signal received by the first communicator, include the identification information into the attachment information, and cause the second communicator to transmit the attachment information to the server, wherein
the controller is configured or programmed to:
  in response to an operation to mount the attachment to the working vehicle, determine whether or not the attachment is in a mounted state in which the attachment is considered mounted to the working vehicle, and, upon determining that the attachment is in the mounted state, cause the second communicator to transmit a mount notification indicating that the attachment is in the mounted state to the server;
  in response to an operation to demount the attachment from the working vehicle, determine whether or not the attachment is in a demounted state in which the attachment is considered demounted from the working vehicle, and, upon determining that the attachment is in the demounted state, cause the second communicator to transmit a demount notification indicating that the attachment is in the demounted state to the server; and during a period from when the mount notification is transmitted to when the demount notification is transmitted, cause the second communicator to transmit, to the server, the attachment information including the identification information of the attachment determined as being in the mounted state; and the server is operable to, upon receipt of the mount notification, prepare an action history about the attachment in the mounted state, and update the action history based on the attachment information received during a period from when the mount notification is received to when the demount notification is received.

19. The telematics service system according to claim 18, wherein the controller is configured or programmed to cause the second communicator to transmit, to the server at one or more predetermined intervals, the attachment information including the identification information of the attachment determined as being in the mounted state, during the period from when the mount notification is transmitted from the second communicator to the server to when the demount notification is transmitted from the second communicator to the server.

20. The telematics service system according to claim 19, wherein the controller is configured or programmed to, during the period from when the mount notification is transmitted from the second communicator to the server to when the demount notification is transmitted from the second communicator to the server, check an action state of the attachment determined as being in the mounted state, and, upon recognizing a change in a state of the attachment, prepare state change information relating to the change in the state and cause the second communicator to transmit the state change information to the server independently of the one or more predetermined intervals, the change in the state being a change in which the attachment in action stopped acting or the attachment not in action started acting; and the server is operable to update the action history based on the attachment information and the state change information received from the second communicator.

21. A telematics service system comprising:

a working vehicle;

an attachment mountable to and demountable from the working vehicle;

a transmitter provided in or on the attachment to transmit a wireless signal compliant with a near field communication standard;

a first communicator to receive the wireless signal transmitted from the transmitter;

a second communicator to transmit first information including vehicle identification information about the working vehicle;

a server to receive the first information transmitted from the second communicator and manage the first information as telematics information; and a controller to cause the second communicator to transmit the first information to the server, wherein the controller is configured or programmed to:

prepare a mount notification or a demount notification in response to an operation to mount the attachment to the working vehicle or an operation to demount the attachment from the working vehicle; and cause the second communicator to transmit, to the server, (i) the first information with the mount notification or the demount notification therein or thereon and (ii) attachment identification information about the attachment acquired from the wireless signal received by the first communicator; and the server is operable to associate the mount notification or the demount notification in or on the received first information with the vehicle identification information and the attachment identification information, and include the mount notification or the demount notification into the telematics information.

22. The telematics service system according to claim 21, wherein the controller is configured or programmed to:

cause the second communicator to transmit, to the server at one or more predetermined intervals, the first information with no mount notifications or demount notifications; and upon preparing the mount notification or the demount notification, cause the second communicator to transmit the first information with the mount notification or the demount notification therein or thereon to the server independently of the one or more predetermined intervals.

23. The telematics service system according to claim 21, wherein the controller is configured or programmed to, in response to an operation to mount the attachment to the working vehicle, determine whether or not the attachment is in a mounted state in which the attachment is considered mounted to the working vehicle, and, upon determining that the attachment is in the mounted state, prepare the mount notification indicating that the attachment is in the mounted state and cause the second communicator to transmit the first information with the mount notification therein or thereon to the server.

24. The telematics service system according to claim 23, wherein the controller is configured or programmed to, upon preparing the mount notification in response to the operation to mount the attachment to the working vehicle, cause the second communicator to transmit, to the server, the first information with the mount notification and the attachment identification information therein or thereon.

25. The telematics service system according to claim 21, wherein the controller is configured or programmed to, in response to an operation to demount the attachment from the working vehicle, determine whether or not the attachment is in a demounted state in which the attachment is considered demounted from the working vehicle, and, upon determining that the attachment is in the demounted state, prepare the demount notification indicating that the attachment is in the demounted state and cause the second communicator to transmit the first information with the demount notification therein or thereon to the server.

26. The telematics service system according to claim 25, wherein the controller is configured or programmed to, upon preparing the demount notification in response to the operation to demount the attachment from the working vehicle, cause the second communicator to transmit, to the server, the first information with the demount notification and the attachment identification information therein or thereon.

27. The telematics service system according to claim 25, wherein
- the controller is configured or programmed to:
  - cause the second communicator to transmit the first information with the demount notification therein or thereon to the server, the first information including vehicle position information relating to a position of the working vehicle that was determined at a first point in time at which the attachment was determined as being in the demounted state or a second point in time near the first point in time; and
- the server is operable to associate the vehicle position information included in the received first information with the attachment identification information associated with the demount notification, and include the vehicle position information as whereabouts information of the attachment in the demounted state into the telematics information and manage the telematics information including the vehicle position information.

* * * * *